July 1, 1958     G. F. BLAND ET AL     2,841,740

CONVERTIBLE STORAGE SYSTEMS

Filed Nov. 21, 1955     62 Sheets-Sheet 1

INVENTORS: GEORGE F. BLAND
WILLIAM J. DEERHAKE
JOACHIM JEENEL

BY John A. Hall

ATTORNEY

July 1, 1958  G. F. BLAND ET AL  2,841,740
CONVERTIBLE STORAGE SYSTEMS
Filed Nov. 21, 1955  62 Sheets-Sheet 2
FIG. 14
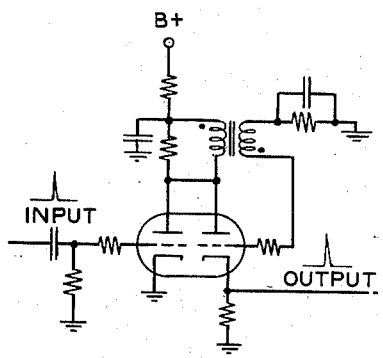
FIG. 16
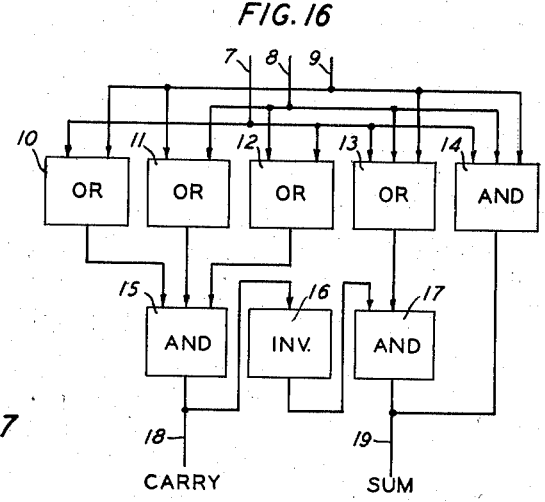
FIG. 15
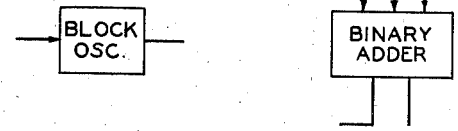
FIG. 17
FIG. 18
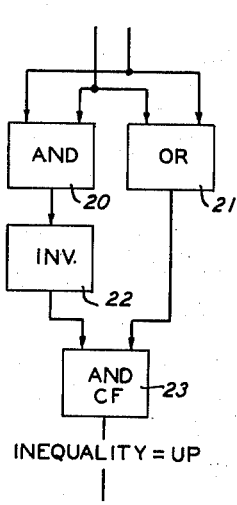
INEQUALITY = UP
FIG. 19
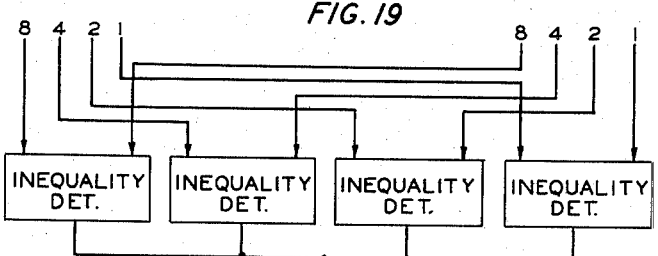
FIG. 20
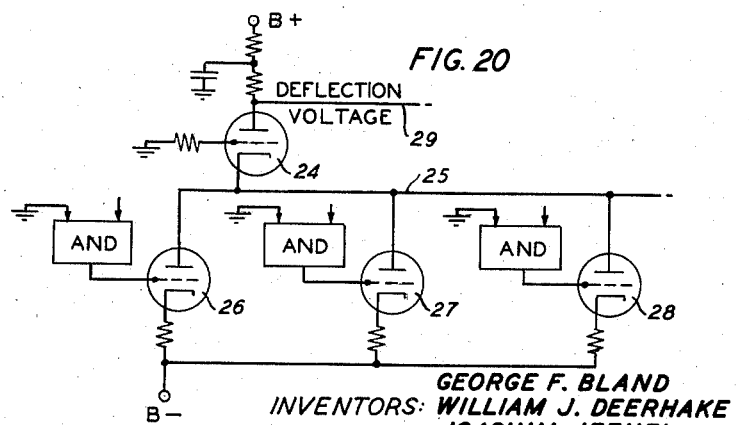
INVENTORS: GEORGE F. BLAND
WILLIAM J. DEERHAKE
JOACHIM JEENEL
BY 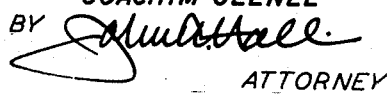
ATTORNEY

INVENTORS: GEORGE F. BLAND
WILLIAM J. DEERHAKE
JOACHIM JEENEL

BY

ATTORNEY

July 1, 1958 — G. F. BLAND ET AL — 2,841,740
CONVERTIBLE STORAGE SYSTEMS
Filed Nov. 21, 1955 — 62 Sheets-Sheet 6

| TIME | INC. PULSE | BINARY ADDER IN | BINARY ADDER IN | BINARY ADDER IN | SUM | CARRY | DLY 1 (A) IN | DLY 1 (A) OUT | DLY 2 IN | DLY 2 OUT | DLY 3 (B) IN | DLY 3 (B) OUT | DLY 4 IN | DLY 4 OUT | DLY 5 IN | DLY 5 OUT | D-1 BITS UNITS ORDER 1 | D-2 BITS UNITS ORDER 2 | D-4 BITS UNITS ORDER 4 | D-8 BITS UNITS ORDER 8 | READ OUT DECIMAL DIGIT |
|---|---|---|---|---|---|---|---|---|---|---|---|---|---|---|---|---|---|---|---|---|---|
| 0.1 | 1 | 1 | | | | | 1 | | 1 | | | | | | | | | | | | |
| .2 | | | | | | | | | 1 | 1 | | | | | | | | 1 | | | |
| .3 | | | | | | | | | | | 1 | 1 | | | | | 1 | | | | |
| .4 | | | | | | | | | | | | | 1 | 1 | | | 1 | | | | |
| .5 | | | 1 | | 1 | | | 1 | | | | | | | 1 | | | | | 1 | |
| .6 | | | | | | | | | 1 | 1 | | | | | | | | | 1 | | |
| .7 | | | | | | | | | | | 1 | 1 | | | | | 1 | | | | |
| 1.0 | | | | | | | | | | | | | 1 | 1 | | | 1 | | | | 0001 |
| .1 | 1 | 1 | 1 | | | 1 | 1 | | | | | | | | 1 | | | | | 1 | |
| .2 | | | 1 | 1 | | | | 1 | 1 | | | | | | | | | | | | |
| .3 | | | | | | | | | | | 1 | 1 | | | | | | 1 | | | |
| .4 | | | | | | | | | | | | | 1 | 1 | | | 1 | | | | |
| .5 | | | | | | | | | | | | | | | 1 | 1 | | | | | |
| .6 | | | 1 | | 1 | | | 1 | | | | | | | 1 | | | | | 1 | |
| .7 | | | | | | | | | 1 | 1 | | | | | | | | | 1 | | |
| 2.0 | | | | | | | | | | | 1 | 1 | | | | | 1 | | | | 0002 |
| .1 | 1 | 1 | | | 1 | | | 1 | | | | | 1 | 1 | | | 1 | | | | |
| .2 | | | 1 | | 1 | | | | 1 | 1 | 1 | | | | 1 | | | 1 | 1 | | |
| .3 | | | | | | | | | 1 | 1 | 1 | 1 | | | | | 1 | 1 | | | |
| .4 | | | | | | | | | | | 1 | 1 | 1 | 1 | | | 1 | 1 | | | |
| .5 | | | 1 | | 1 | | | 1 | | | | | 1 | 1 | 1 | | 1 | | | 1 | |
| .6 | | | 1 | | 1 | | | | 1 | 1 | 1 | | | | 1 | | | | 1 | 1 | |
| .7 | | | | | | | | | 1 | 1 | 1 | 1 | | | | | 1 | 1 | | | |
| 3.0 | | | | | | | | | | | 1 | 1 | 1 | 1 | | | 1 | 1 | | | 0003 |
| .1 | 1 | 1 | 1 | | | 1 | 1 | | | | | 1 | 1 | 1 | 1 | | | | | 1 | |
| .2 | | | 1 | 1 | | | 1 | 1 | 1 | | | | | | 1 | | | | | 1 | |
| .3 | | | 1 | | 1 | | | 1 | 1 | | | | | | | | | | | | |
| .4 | | | | | | | | | 1 | 1 | | | | | | | | 1 | | | |
| .5 | | | | | | | | | | | 1 | 1 | | | | | 1 | | | | |
| .6 | | | | | | | | | | | | | 1 | 1 | | | 1 | | | | |
| .7 | | | 1 | | 1 | | | 1 | | | | | | | 1 | | | | | 1 | |
| 4.0 | | | | | | | | | 1 | 1 | | | | | | | | | | 1 | 0004 |
| .1 | 1 | 1 | | | 1 | | | 1 | | | 1 | 1 | | | | | 1 | | | | |
| .2 | | | | | | | | | 1 | 1 | | | 1 | 1 | | | 1 | | | | |
| .3 | | | | | | | | | | | 1 | 1 | | | 1 | | | | | 1 | |

FIG. 24

REGULAR SUCCESSION
OF
INCOMING PULSES

INVENTORS: GEORGE F. BLAND
WILLIAM J. DEERHAKE
JOACHIM JEENEL

BY *[signature]*

ATTORNEY

July 1, 1958

G. F. BLAND ET AL 2,841,740

CONVERTIBLE STORAGE SYSTEMS

Filed Nov. 21, 1955

REGULAR SUCCESSION
INTERRUPTED

INVENTORS: GEORGE F. BLAND
WILLIAM J. DEERHAKE
JOACHIM JEENEL

BY

ATTORNEY

July 1, 1958 — G. F. BLAND ET AL — 2,841,740
CONVERTIBLE STORAGE SYSTEMS
Filed Nov. 21, 1955 — 62 Sheets-Sheet 8

| TIME | INC. PULSE | BINARY ADDER IN / IN / IN | | | | DLY 1 (A) | | DLY 2 | | DLY 3 (B) | | DLY 4 | | DLY 5 | | D-1 | D-2 | D-4 | D-8 | READ OUT DECIMAL DIGIT |
|---|---|---|---|---|---|---|---|---|---|---|---|---|---|---|---|---|---|---|---|---|
| | | | | | SUM | CARRY | IN | OUT | IN | OUT | IN | OUT | IN | OUT | IN | OUT | BITS UNITS ORDER 1 | 2 | 4 | 8 | |
| 57.6 | | 1 | | 1 | | | 1 | 1 | 1 | | | | | | | | | | 1 | | |
| .7 | | | | | | | | 1 | 1 | 1 | 1 | | | | | | | 1 | 1 | | |
| 58.0 | | | | | | | | | | 1 | 1 | 1 | 1 | 1 | 1 | | 1 | | | | |
| .1 | 1 | 1 | 1 | | | 1 | 1 | | | | | 1 | 1 | 1 | | 1 | | | | 1 | |
| .2 | | 1 | 1 | | | 1 | 1 | 1 | | | | | | 1 | | | | | | 1 | |
| .3 | | | 1 | 1 | | | | 1 | 1 | | | | | | | | | | | | |
| .4 | | | | | | | | 1 | 1 | | | | | | | | | 1 | | | |
| .5 | | | | | | | | | | 1 | 1 | | | | | | 1 | | | | |
| .6 | | | | | | | | | | | | 1 | 1 | | | 1 | | | | | |
| .7 | | 1 | | 1 | | | | 1 | | | | | | 1 | | | | | | 1 | |
| 59.0 | | | | | | | | 1 | 1 | | | | | | | | | | 1 | | 0004 |
| .1 | 1 | 1 | | 1 | | | 1 | | 1 | 1 | | | | | | 1 | | | 1 | | |
| .2 | | | | | | | | 1 | 1 | | | 1 | 1 | | | 1 | | | 1 | | |
| .3 | | 1 | | 1 | | | 1 | | | 1 | 1 | | | 1 | | | | | | 1 | |
| .4 | | | | | | | | 1 | 1 | | | 1 | 1 | | | 1 | | | 1 | | |
| .5 | | 1 | | 1 | | | 1 | | | 1 | 1 | | | 1 | | | | | 1 | | |
| .6 | | | | | | | | 1 | 1 | | | 1 | 1 | | | 1 | | | 1 | | |
| .7 | | 1 | | 1 | | | 1 | | | 1 | 1 | | | 1 | | | | | | 1 | |
| 60.0 | | | | | | | | 1 | 1 | | | 1 | 1 | | | 1 | | | 1 | | 0005 |
| .1 | 1 | 1 | | 1 | | | 1 | 1 | | 1 | 1 | | | 1 | | | 1 | | | 1 | |
| .2 | | | 1 | 1 | | | 1 | 1 | | | | 1 | 1 | | | 1 | | | | | |
| .3 | | 1 | | 1 | | | 1 | 1 | 1 | | | | | 1 | | | | | 1 | 1 | |
| .4 | | | | | | | | 1 | 1 | 1 | | | | | | | 1 | 1 | | | |
| .5 | | | | | | | | | 1 | 1 | 1 | | | | | 1 | 1 | | | | |
| .6 | | 1 | | 1 | | | 1 | | | | | 1 | 1 | 1 | | 1 | | | | 1 | |
| .7 | | 1 | | 1 | | | | 1 | 1 | 1 | | | | 1 | | | | | 1 | 1 | |
| 61.0 | | | | | | | | 1 | 1 | 1 | 1 | | | | | | 1 | | 1 | | 0006 |
| .1 | 1 | 1 | | 1 | | | 1 | | | 1 | 1 | 1 | | 1 | | 1 | 1 | | | | |
| .2 | | 1 | | 1 | | | | 1 | 1 | | | 1 | 1 | 1 | | 1 | | | 1 | | |
| .3 | | 1 | | 1 | | | | 1 | 1 | 1 | 1 | | | 1 | 1 | 1 | | | 1 | | |
| .4 | | | | | | | | 1 | 1 | 1 | 1 | | | | | 1 | 1 | 1 | | | |
| .5 | | 1 | | 1 | | | 1 | | | 1 | 1 | 1 | 1 | 1 | | 1 | 1 | | | 1 | |
| .6 | | 1 | | 1 | | | 1 | 1 | | | | 1 | 1 | 1 | | 1 | | | 1 | 1 | |
| .7 | | 1 | | 1 | | | 1 | 1 | 1 | 1 | | | | 1 | | | | | 1 | 1 | |
| 62.0 | | | | | | | | 1 | 1 | 1 | 1 | 1 | | | | 1 | | 1 | | | 0007 |

REGULAR SUCCESSION RESTARTED

INVENTORS: GEORGE F. BLAND
WILLIAM J. DEERHAKE
JOACHIM JEENEL
BY 
ATTORNEY

July 1, 1958          G. F. BLAND ET AL          2,841,740

CONVERTIBLE STORAGE SYSTEMS

Filed Nov. 21, 1955          62 Sheets-Sheet 9

| TIME | INC. PULSE | BINARY ADDER IN / IN / IN | | | DLY 1 Ⓐ | | DLY 2 | | DLY 3 Ⓑ | | DLY 4 | | DLY 5 | | D-1 / D-2 / D-4 / D-8 BITS UNITS ORDER | | | | READ OUT DECIMAL DIGIT |
|---|---|---|---|---|---|---|---|---|---|---|---|---|---|---|---|---|---|---|---|
| | | SUM | CARRY | | IN | OUT | IN | OUT | IN | OUT | IN | OUT | IN | OUT | 1 | 2 | 4 | 8 | |
| 62.3 | | | | | | | | | | | I | I | | | I | | | | |
| .4 | | I | I | | I | | | | | | | I | | | | | | I | |
| .5 | | | | | | | I | I | | | | | | | | I | | | |
| .6 | | | | | | | | | I | I | | | | | | | I | | |
| .7 | | | | | | | | | | | I | I | | | I | | | | |
| 63.0 | | I | I | | I | | | | | | | I | | | | | | I | 0008 |
| .1 | I | I | | | I | | I | I | I | | | | | | | I | | | |
| .2 | | | | | | | I | | I | I | I | | | | I | I | | | |
| .3 | | | | | | | | | I | I | I | I | | | I | I | | | |
| .4 | | I | I | | I | | | | | | I | I | I | | I | | | I | |
| .5 | | I | I | | I | | I | I | I | | | I | | | | I | | I | |
| .6 | | | | | | | I | I | I | I | | | | | I | I | | | |
| .7 | | | | | | | | | I | I | I | I | | | I | I | | | |
| 64.0 | | I | | I | | I | | | | | I | I | I | | I | | | I | 0009 |
| .1 | I | I | I | | | I | I | | I | I | | | I | | | | I | I | |
| .2 | | | I | I | →I | I | | →I | I | | | | | | | I | | | |
| .3 | | Ⓐ & Ⓑ COUNTER CLEARED IN FOLLOWING INTERVAL AND CARRY TRANSMITTED TO TENS COUNTER SEE FIG. 28 | | | | | | | | | | | | | | | | | |
| .4 | | | | | | | | | | | | | | | | | | | |
| .5 | | | | | | | | | | | | | | | | | | | |
| .6 | | | | | | | | | | | | | | | | | | | |
| .7 | | | | | | | | | | | | | | | | | | | |
| 65.0 | | | | | | | | | | | | | | | | | | | 0000 |
| .1 | I | I | | | I | | I | | | | | | | | | | | | |
| .2 | | | | | | | I | I | | | | | | | | I | | | |
| .3 | | | | | | | | | I | I | | | | | | | I | | |
| .4 | | | | | | | | | | | I | I | | | I | | | | |
| .5 | | I | I | | I | | | | | | | I | | | | | | I | |
| .6 | | | | | | | I | I | | | | | | | | I | | | |
| .7 | | | | | | | | | I | I | | | | | | | I | | |
| 66.0 | | | | | | | | | | | I | I | | | I | | | | 0001 |
| .1 | I | I | I | | I | I | I | | | | | I | | | | | | I | |
| .2 | | | I | | I | | I | I | | | | | | | | I | | | |
| .3 | | | | | | | | | I | I | | | | | | | I | | |
| .4 | | | | | | | | | | | I | I | | | I | | | | |
| .5 | | | | | | | | | | | I | I | I | | | | | | |

REGULAR SUCCESSION THROUGH CARRY

INVENTORS: GEORGE F. BLAND
WILLIAM J. DEERHAKE
JOACHIM JEENEL

BY *[signature]*
ATTORNEY

FIG. 27

July 1, 1958  G. F. BLAND ET AL  2,841,740
CONVERTIBLE STORAGE SYSTEMS
Filed Nov. 21, 1955  62 Sheets-Sheet 10

| TIME | INC. PULSE | IN BINARY ADDER | | | | DLY 1 Ⓐ | | DLY 2 | | DLY 3 Ⓑ | | DLY 4 | | DLY 5 | | D-1 D-2 D-4 D-8 BITS TENS ORDER | | | | READ OUT DECIMAL DIGIT |
|---|---|---|---|---|---|---|---|---|---|---|---|---|---|---|---|---|---|---|---|---|
| | | IN | IN | SUM | CARRY | IN | OUT | IN | OUT | IN | OUT | IN | OUT | IN | OUT | 8 | 1 | 2 | 4 | |
| 64.1 | | | | | | | | | | | | | | | | | | | | |
| .2 | I | I | | | | I | | I | | | | | | | | | I | | | |
| .3 | | | | | | | | I | I | | | | | | | | | | | |
| .4 | | | | | | | | | | I | I | | | | | I | | | | |
| .5 | | | | | | | | | | | | I | I | | | | | | | |
| .6 | | I | I | | | I | | | | | | | | I | | | | | I | |
| .7 | | | | | | | | I | I | | | | | | | | | I | | |
| 65.0 | | | | | | | | | | I | I | | | | | I | | | | 0010 |
| .1 | | | | | | | | | | | | I | I | | | I | | | | |
| .2 | | I | I | | | I | | | | | | | | I | | | I | | | |
| .3 | | | | | | | | I | I | | | | | | | | | I | | |
| .4 | | | | | | | | | | I | I | | | | | I | | | | |
| .5 | | | | | | | | | | | | I | I | | | I | | | | |
| .6 | | I | I | | | I | | | | | | | | I | | | | | I | |
| .7 | | | | | | | | I | I | | | | | | | | | I | | |
| 66.0 | | | | | | | | | | I | I | | | | | I | | | | 0011 |
| .1 | | | | | | | | | | | | I | I | | | I | | | | |
| .2 | | I | I | | | I | | | | | | | | I | | | | | I | |
| .3 | | | | | | | | I | I | | | | | | | | | I | | |
| .4 | | | | | | | | | | I | I | | | | | I | | | | |
| .5 | | | | | | | | | | | | I | I | | | I | | | | |
| .6 | | I | I | | | I | | | | | | | | I | | | | | I | |
| .7 | | | | | | | | I | I | | | | | | | | | I | | |
| 67.0 | | | | | | | | | | I | I | | | | | I | | | | 0012 |
| 74.1 | | | | | | | | | | | | I | I | | | I | | | | |
| .2 | I | I | I | | | I | I | | | | | | | | | | | | I | |
| .3 | | | | I | I | | | I | I | | | | | | | | | | | |
| .4 | | | | | | | | | | I | I | | | | | | | | I | |
| .5 | | | | | | | | | | | | I | I | | | I | | | | |
| .6 | | | | | | | | | | | | | | I | I | I | | | | |
| .7 | | | I | I | | | I | | | | | | | I | | | | | I | |
| 75.0 | | | | | | | | I | I | | | | | | | | | I | | 0020 |
| .1 | | | | | | | | | | I | I | | | | | I | | | | |
| .2 | | | | | | | | | | | | I | I | | | I | | | | |

OPERATION OF TENS COUNTER

FIG. 28

INVENTORS: GEORGE F. BLAND
WILLIAM J. DEERHAKE
JOACHIM JEENEL

BY *(signature)*
ATTORNEY

July 1, 1958 — G. F. BLAND ET AL — 2,841,740
CONVERTIBLE STORAGE SYSTEMS
Filed Nov. 21, 1955 — 62 Sheets-Sheet 11

| TIME | INC. PULSE | BINARY ADDER (IN, IN, IN) | | BINARY ADDER | | DLY 1 Ⓐ | | DLY 2 | | DLY 3 Ⓑ | | DLY 4 | | DLY 5 | | D-1 | D-2 | D-4 | D-8 | READ OUT DECIMAL DIGIT |
|---|---|---|---|---|---|---|---|---|---|---|---|---|---|---|---|---|---|---|---|---|
| | | | | SUM | CARRY | IN | OUT | IN | OUT | IN | OUT | IN | OUT | IN | OUT | BITS THOUSANDS ORDER 2 | 4 | 8 | 1 | |
| 1998.0 | | I | I | | | I | | | | | | | | I | | | | | I | 1998 |
| .1 | | | | | | | I | I | | | | | | | | | | I | | |
| .2 | | | | | | | | | I | I | | | | | | I | | | | |
| .3 | | | | | | | | | | | I | I | | | I | | | | | |
| .4 | | I | I | | | I | | | | | | | | I | | | | | I | |
| .5 | | | | | | | I | I | | | | | | | | | | I | | |
| .6 | | | | | | | | | I | I | | | | | | I | | | | |
| .7 | | | | | | | | | | | I | I | | | I | | | | | |
| 1999.0 | | I | I | | | I | | | | | | | | I | | | | | I | 1999 |
| .1 | | | | | | | I | I | | | | | | | | | | | | |
| .2 | | | | | | | | | I | I | | | | | | | | | | |
| .3 | | | | | | | | | | | I | I | | | | | | | | |
| .4 | I | I | I | | | I | I | | | | | | | I | | | | | | |
| .5 | | | I | I | | | | I | I | | | | | | | | | | | |

OUTPUT OF *DELAY* 1 INTO *AND* 5141
TERMINAL 661.41 UP
ALL COUNTERS CLEARED

| .6 | | | | | | | | | | | | | | | | | | | | |
| .7 | | | | | | | | | | | | | | | | | | | | |
| 0000.0 | | | UNITS COUNTER | | | | | | | | | | | | 1 | 2 | 4 | 8 | 0000 |
| .1 | I | I | | I | | | I | | | | | | | | | | | | | |
| .2 | | | | | | | I | I | | | | | | | | I | | | | |
| .3 | | | | | | | | | I | I | | | | | | | I | | | |
| .4 | | | | | | | | | | | I | I | I | | | | | | | |
| .5 | | I | I | | | I | | | | | | | | I | | | | | I | |
| .6 | | | | | | | I | I | | | | | | | | | | I | | |
| .7 | | | | | | | | | I | I | | | | | | | I | | | |
| 0001.0 | | | | | | | | | | | I | I | I | | | | | | | 0001 |
| .1 | I | I | I | | | I | I | | | | | | | I | | | | | I | |
| .2 | | | I | I | | I | I | | | | | | | | | | | | | |
| .3 | | | | | | | | I | I | | | | | | | I | | | | |
| .4 | | | | | | | | | | | I | I | I | | | | | | | |
| .5 | | | | | | | | | | | | I | I | I | | | | | | |
| .6 | | I | I | | | I | | | | | | | I | | | | | | I | |
| .7 | | | | | | | | I | I | | | | | | | I | | | | |
| 0002.0 | | | | | | | | I | I | | | | | | | I | | | | 0002 |
| .1 | I | I | | I | | I | | | | I | I | I | | | | | | | |
| .2 | | I | I | | | I | I | | | | | I | | | | | | | I | |

RECYCLE—THOUSANDS COUNTER PASSES 1999

FIG. 29

INVENTORS: GEORGE F. BLAND
WILLIAM J. DEERHAKE
JOACHIM JEENEL
BY [signature]
ATTORNEY July 1, 1958

G. F. BLAND ET AL 2,841,740

CONVERTIBLE STORAGE SYSTEMS

Filed Nov. 21, 1955

| TIME | INC. PULSE | BINARY ADDER | | | | DLY 1 | | DLY 2 | | DLY 3 | | DLY 4 | | DLY 5 | | D-1 D-2 D-4 D-8 BITS THOUSANDS ORDER | | | | READ OUT DECIMAL DIGIT |
|---|---|---|---|---|---|---|---|---|---|---|---|---|---|---|---|---|---|---|---|---|
| | | IN | IN | IN SUM | CARRY | IN | Ⓐ OUT | IN | OUT | IN | Ⓑ OUT | IN | OUT | IN | OUT | 2 | 4 | 8 | 1 | |
| 3598.0 | | I | I | | | I | | | | | | I | | | | | | I | | 3598 |
| .1 | | I | I | | | I | I | I | | | | I | | | | | I | | I | |
| .2 | | | | | | | I | I | I | I | | | | | | I | I | | | |
| .3 | | | | | | | | | I | I | I | I | | | I | I | | | | |
| .4 | | I | I | | | I | | | | I | I | I | | I | | | | | I | |
| .5 | | I | I | | | I | I | I | | | | I | | | | | I | | I | |
| .6 | | | | | | | I | I | I | I | | | | | | I | I | | | |
| .7 | | | | | | | | | I | I | I | I | | I | | I | | | | 3599 |
| 3599.0 | | I | I | | | I | | | | I | I | I | | I | | | | | I | |
| .1 | | I | I | | | I | I | I | | | | I | | | | | I | | I | |
| .2 | | | | | | | I | I | I | I | | | | | | I | I | | | |
| .3 | | | | | | | | | I | I | I | I | | I | | I | | | | |
| .4 | | I | I | | | I | | | | I | I | I | | | | | | | I | |
| .5 | | | | ALL COUNTERS CLEARED | | | | | | | | | | | | | | | | |
| .6 | | | | | | | | | | | | | | | | | | | | |
| .7 | | | | UNITS COUNTER | | | | | | | | | | | | I | 2 | 4 | 8 | |
| 0000.0 | | | | | | | | | | | | | | | | | | | | 0000 |
| .1 | I | I | | I | | I | | | | | | I | | | | | | | I | |
| .2 | | | | | | | I | I | | | | | | | | | I | | | |
| .3 | | | | | | | | | I | I | | | | | | I | | | | |
| .4 | | | | | | | | | | I | I | I | | | | I | | | | |
| .5 | | I | I | | | I | | | | | | I | | | | | | | I | |
| .6 | | | | | | | I | I | | | | | | | | | I | | | |
| .7 | | | | | | | | | I | I | | | | | | I | | | | |
| 0001.0 | | | | | | | | | | | I | I | | I | | | | | | 0001 |
| .1 | I | I | I | | | I | I | | | | | I | | | | | | | I | |
| .2 | | | I | I | | I | I | | | | | | | | | | I | | | |
| .3 | | | | | | | I | I | | | | | | | | | I | | | |
| .4 | | | | | | | | I | I | | | | | I | | | | | | |
| .5 | | | | | | | | | I | I | | | I | | | | | | | |
| .6 | | I | I | | | I | | | | | | I | | | | | | | I | |
| .7 | | | | | | | I | I | | | | | | | | | I | | | |
| 0002.0 | | | | | | | | | I | I | | | | I | | | | | | 0002 |
| .1 | I | I | | I | | I | | | | | I | I | | I | | | | | I | |
| .2 | | I | I | | | I | I | I | | | | I | | | | | | | I | |

RECYCLE—THOUSANDS
COUNTER PASSES 3599

FIG. 30

INVENTORS: GEORGE F. BLAND
WILLIAM J. DEERHAKE
JOACHIM JEENEL

BY 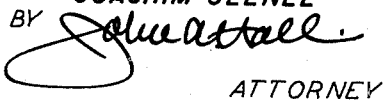

ATTORNEY

July 1, 1958                G. F. BLAND ET AL                2,841,740
                        CONVERTIBLE STORAGE SYSTEMS
Filed Nov. 21, 1955                                    62 Sheets-Sheet 13

| TIME | INC. PULSE | IN IN IN BINARY ADDER | | DLY 1 (A) | | DLY 2 | | DLY 3 (B) | | DLY 4 | | DLY 5 | | D-1 | D-2 | D-4 | D-8 | READ OUT DECIMAL DIGIT |
|------|------------|-----|-----|----|-----|----|-----|----|-----|----|-----|----|-----|-----|-----|-----|-----|
|      |            | SUM | CARRY | IN | OUT | IN | OUT | IN | OUT | IN | OUT | IN | OUT | BITS HUNDREDS ORDER 4 | 8 | 1 | 2 | |
| 3598.0 |   |   |   |   | 1 | 1 |   |   |   |   |   |   |   | 1 |   | 1 |   | 3598 |
| .1 |   | 1 | 1 |   | 1 |   |   | 1 | 1 |   |   |   |   |   | 1 |   | 1 |   |
| .2 |   |   |   |   |   | 1 | 1 |   |   | 1 | 1 |   |   | 1 |   | 1 |   |   |
| .3 |   | 1 | 1 |   | 1 |   |   | 1 | 1 |   |   | 1 |   |   | 1 |   | 1 |   |
| .4 |   |   |   |   |   | 1 | 1 |   |   | 1 | 1 |   |   | 1 |   | 1 |   |   |
| .5 |   | 1 | 1 |   | 1 |   |   | 1 | 1 |   |   | 1 |   |   | 1 |   | 1 |   |
| .6 |   |   |   |   |   | 1 | 1 |   |   | 1 | 1 |   |   | 1 |   | 1 |   |   |
| .7 |   | 1 | 1 |   | 1 |   |   | 1 | 1 |   |   | 1 |   |   | 1 |   |   |   |
| 3599.0 |   |   |   |   |   | 1 | 1 |   |   | 1 | 1 |   |   | 1 |   | 1 |   | 3599 |
| .1 |   | 1 | 1 |   | 1 |   |   | 1 | 1 |   |   | 1 |   |   | 1 |   | 1 |   |
| .2 |   |   |   |   |   | 1 | 1 |   |   | 1 | 1 |   |   |   |   | 1 |   |   |
| .3 | 1 | 1 | 1 |   | 1 | 1 |   |   |   | 1 | 1 |   |   | 1 |   | 1 |   | 1 |   |
| .4 |   |   | 1 | 1 |   | 1 | 1 |   |   |   | 1 | 1 |   | 1 |   | 1 |   |   |
| .5 |   |   |   |   |   |   |   |   |   |   |   |   |   |   |   |   |   |   |
| .6 |   |   |   |   |   |   |   |   |   |   |   |   |   |   |   |   |   |   |
| .7 |   |   |   |   |   |   |   |   |   |   |   |   |   |   |   |   |   |   |
| 0000.0 |   |   |   |   |   |   |   |   |   |   |   |   |   |   |   |   |   | 0000 |
| .1 |   |   |   |   |   |   |   |   |   |   |   |   |   |   |   |   |   |   |
| .2 |   |   |   |   |   |   |   |   |   |   |   |   |   |   |   |   |   |   |
| .3 |   |   |   |   |   |   |   |   |   |   |   |   |   |   |   |   |   |   |
| .4 |   |   |   |   |   |   |   |   |   |   |   |   |   |   |   |   |   |   |
| .5 |   |   |   |   |   |   |   |   |   |   |   |   |   |   |   |   |   |   |
| .6 |   |   |   |   |   |   |   |   |   |   |   |   |   |   |   |   |   |   |
| .7 |   |   |   |   |   |   |   |   |   |   |   |   |   |   |   |   |   |   |
| 0001.0 |   |   |   |   |   |   |   |   |   |   |   |   |   |   |   |   |   | 0001 |
| .1 |   |   |   |   |   |   |   |   |   |   |   |   |   |   |   |   |   |   |
| .2 |   |   |   |   |   |   |   |   |   |   |   |   |   |   |   |   |   |   |
| .3 |   |   |   |   |   |   |   |   |   |   |   |   |   |   |   |   |   |   |
| .4 |   |   |   |   |   |   |   |   |   |   |   |   |   |   |   |   |   |   |
| .5 |   |   |   |   |   |   |   |   |   |   |   |   |   |   |   |   |   |   |
| .6 |   |   |   |   |   |   |   |   |   |   |   |   |   |   |   |   |   |   |
| .7 |   |   |   |   |   |   |   |   |   |   |   |   |   |   |   |   |   |   |
| 0002.0 |   |   |   |   |   |   |   |   |   |   |   |   |   |   |   |   |   | 0002 |
| .1 |   |   |   |   |   |   |   |   |   |   |   |   |   |   |   |   |   |   |
| .2 |   |   |   |   |   |   |   |   |   |   |   |   |   |   |   |   |   |   |

HUNDREDS COUNTER
PASSES 599

INVENTORS: GEORGE F. BLAND
WILLIAM J. DEERHAKE
JOACHIM JEENEL

BY *[signature]*

ATTORNEY

G. F. BLAND ET AL 2,841,740

CONVERTIBLE STORAGE SYSTEMS

Filed Nov. 21, 1955

| TIME | INC. PULSE | BINARY ADDER | | | DLY 1 Ⓐ | | DLY 2 | | DLY 3 Ⓑ | | DLY 4 | | DLY 5 | | D-1 D-2 D-4 D-8 BITS THOUSANDS ORDER | | | | READ OUT DECIMAL DIGIT |
|---|---|---|---|---|---|---|---|---|---|---|---|---|---|---|---|---|---|---|---|
| | | IN | IN | IN SUM CARRY | IN | OUT | IN | OUT | IN | OUT | IN | OUT | IN | OUT | 2 | 4 | 8 | 1 | |
| 0398.0 | | | | | | | | | | | | | | | | | | | 0398 |
| .1 | | | | | | | | | | | | | | | | | | | |
| .2 | | | | | | | | | | | | | | | | | | | |
| .3 | | | | | | | | | | | | | | | | | | | |
| .4 | | | | | | | | | | | | | | | | | | | |
| .5 | | | | | | | | | | | | | | | | | | | |
| .6 | | | | | | | | | | | | | | | | | | | |
| .7 | | | | | | | | | | | | | | | | | | | |
| 0399.0 | | | | | | | | | | | | | | | | | | | 0399 |
| .1 | | | | | | | | | | | | | | | | | | | |
| .2 | | | | | | OUTPUT OF CF 5173 FIG. 36 | | | | | | | | | | | | |
| .3 | | | | | | PROVIDES THIS BIT | | | | | | | | | | | | |
| .4 | | | | | | | | | | | | | | | | | | | |
| .5 | | 1 | 1 | | 1 | | | | 1 | | | | | | | | | 1 | |
| .6 | | | | | | | 1 | 1 | | | | | | | | | 1 | | |
| .7 | | | | | | | | | 1 | 1 | | | | | | 1 | | | |
| 2000.0 | | | | | | | | | | | 1 | 1 | 1 | | | | | | 2000 |
| .1 | | 1 | 1 | | 1 | | | | | | | | 1 | | | | | 1 | |
| .2 | | | | | | | 1 | 1 | | | | | | | | | 1 | | |
| .3 | | | | | | | | | 1 | 1 | | | | | | 1 | | | |
| .4 | | | | | | | | | | | 1 | 1 | 1 | | | | | | |
| .5 | | 1 | 1 | | 1 | | | | | | | | 1 | | | | | 1 | |
| .6 | | | | | | | 1 | 1 | | | | | | | | | 1 | | |
| .7 | | | | | | | | | 1 | 1 | | | | | | 1 | | | |
| 2001.0 | | | | | | | | | | | 1 | 1 | 1 | | | | | | 2001 |
| .1 | | 1 | 1 | | 1 | | | | | | | | 1 | | | | | 1 | |
| .2 | | | | | | | 1 | 1 | | | | | | | | | 1 | | |
| .3 | | | | | | | | | 1 | 1 | | | | | 1 | | | | |
| .4 | | | | | | | | | | | 1 | 1 | 1 | | | | | | |
| .5 | | 1 | 1 | | 1 | | | | | | | | 1 | | | | | 1 | |
| .6 | | | | | | | 1 | 1 | | | | | | | | | 1 | | |
| .7 | | | | | | | | | 1 | 1 | | | | | 1 | | | | |
| 2002.0 | | | | | | | | | | | 1 | 1 | 1 | | | | | | 2002 |
| .1 | | 1 | 1 | | 1 | | | | | | | | 1 | | | | | 1 | |
| .2 | | | | | | | 1 | 1 | | | | | | | | | | | |

SETTING THOUSANDS
COUNTER TO 2 AT
TIME 399.5

INVENTORS: GEORGE F. BLAND
WILLIAM J. DEERHAKE
JOACHIM JEENEL

BY

ATTORNEY

July 1, 1958

G. F. BLAND ET AL 2,841,740

CONVERTIBLE STORAGE SYSTEMS

Filed Nov. 21, 1955

| TIME | INC. PULSE | IN IN IN BINARY ADDER | | | DLY 1 Ⓐ | | DLY 2 | | DLY 3 Ⓑ | | DLY 4 | | DLY 5 | | D-1 D-2 D-4 D-8 BITS HUNDREDS ORDER | | | | READ OUT DECIMAL DIGIT |
|---|---|---|---|---|---|---|---|---|---|---|---|---|---|---|---|---|---|---|---|
| | | | SUM | CARRY | IN | OUT | IN | OUT | IN | OUT | IN | OUT | IN | OUT | 4 | 8 | 1 | 2 | |
| 0398.0 | | 1 | | 1 | | 1 | 1 | 1 | | | | | | | | | 1 | 1 | 0398 |
| .1 | | | | | | | 1 | 1 | 1 | 1 | | | | | 1 | | 1 | | |
| .2 | | | | | | | | | 1 | 1 | 1 | 1 | | | 1 | | 1 | | |
| .3 | | 1 | | 1 | | 1 | | | | | 1 | 1 | 1 | | 1 | | | 1 | |
| .4 | | 1 | | 1 | | 1 | 1 | 1 | | | | 1 | | | | | 1 | 1 | |
| .5 | | | | | | | 1 | 1 | 1 | 1 | | | | | 1 | | 1 | | |
| .6 | | | | | | | | 1 | 1 | 1 | 1 | | | | 1 | | 1 | | |
| .7 | | 1 | | 1 | | 1 | | | | 1 | 1 | 1 | 1 | | | | | 1 | |
| 0399.0 | | 1 | | 1 | | 1 | 1 | 1 | | | | 1 | | | | | 1 | 1 | 0399 |
| .1 | | | | | | | 1 | 1 | 1 | 1 | | | | | 1 | | 1 | | |
| .2 | | | | | | | | | 1 | 1 | 1 | 1 | | | 1 | | 1 | | |
| .3 | 1 | 1 | 1 | 1 | | 1 | 1 | | | | 1 | 1 | 1 | | 1 | | | 1 | |
| .4 | | 1 | 1 | | | 1 | 1 | | | | | 1 | | | | | | 1 | |
| .5 | | | | | | | | | | | | | | | | | | | |
| .6 | | | | | | | | | | | | | | | | | | | |
| .7 | | | | | | | | | | | | | | | | | | | |
| 2000.0 | | | | | | | | | | | | | | | | | | | 2000 |
| .1 | | | | | | | | | | | | | | | | | | | |
| .2 | | | | | | | | | | | | | | | | | | | |
| .3 | | | | | | | | | | | | | | | | | | | |
| .4 | | | | | | | | | | | | | | | | | | | |
| .5 | | | | | | | | | | | | | | | | | | | |
| .6 | | | | | | | | | | | | | | | | | | | |
| .7 | | | | | | | | | | | | | | | | | | | |
| 2001.0 | | | | | | | | | | | | | | | | | | | 2001 |
| .1 | | | | | | | | | | | | | | | | | | | |
| .2 | | | | | | | | | | | | | | | | | | | |
| .3 | | | | | | | | | | | | | | | | | | | |
| .4 | | | | | | | | | | | | | | | | | | | |
| .5 | | | | | | | | | | | | | | | | | | | |
| .6 | | | | | | | | | | | | | | | | | | | |
| .7 | | | | | | | | | | | | | | | | | | | |
| 2002.0 | | | | | | | | | | | | | | | | | | | 2002 |
| .1 | | | | | | | | | | | | | | | | | | | |
| .2 | | | | | | | | | | | | | | | | | | | |

HUNDREDS COUNTER
3 TO 0 AT TIME 399.5

FIG. 33

INVENTORS: GEORGE F. BLAND
WILLIAM J. DEERHAKE
JOACHIM JEENEL

BY *John A. Hall*

ATTORNEY

July 1, 1958 G. F. BLAND ET AL 2,841,740
CONVERTIBLE STORAGE SYSTEMS
Filed Nov. 21, 1955 62 Sheets-Sheet 16
FIG. 34
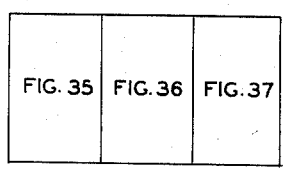
FIG. 36
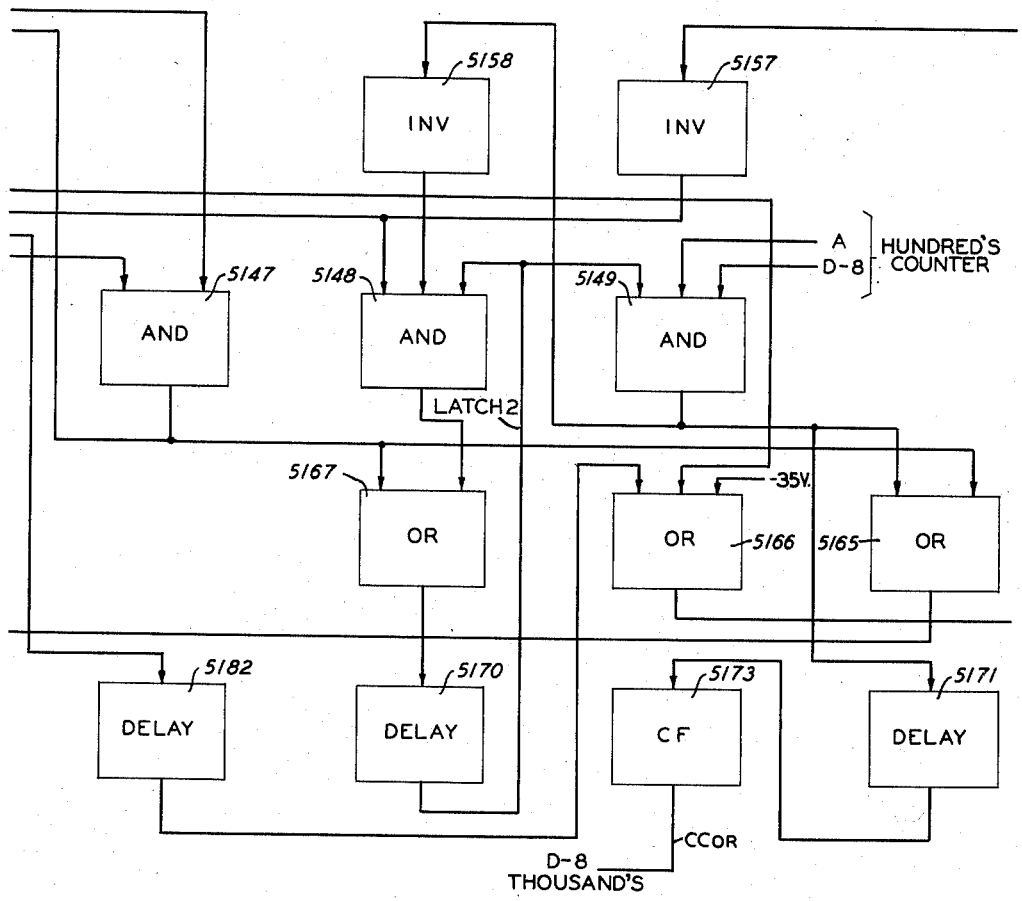
FIG. 38
INVENTORS: GEORGE F. BLAND
WILLIAM J. DEERHAKE
JOACHIM JEENEL
BY
ATTORNEY

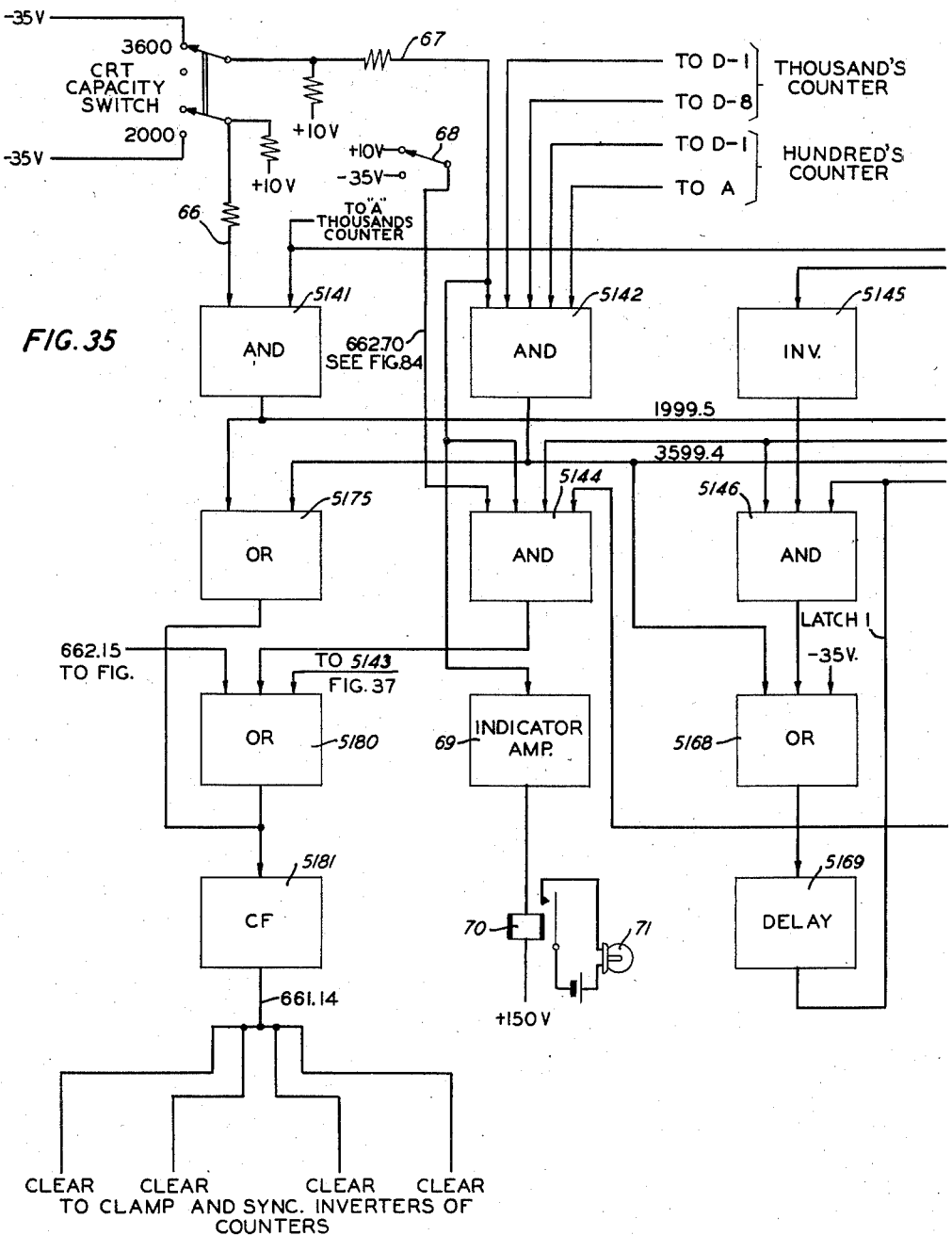

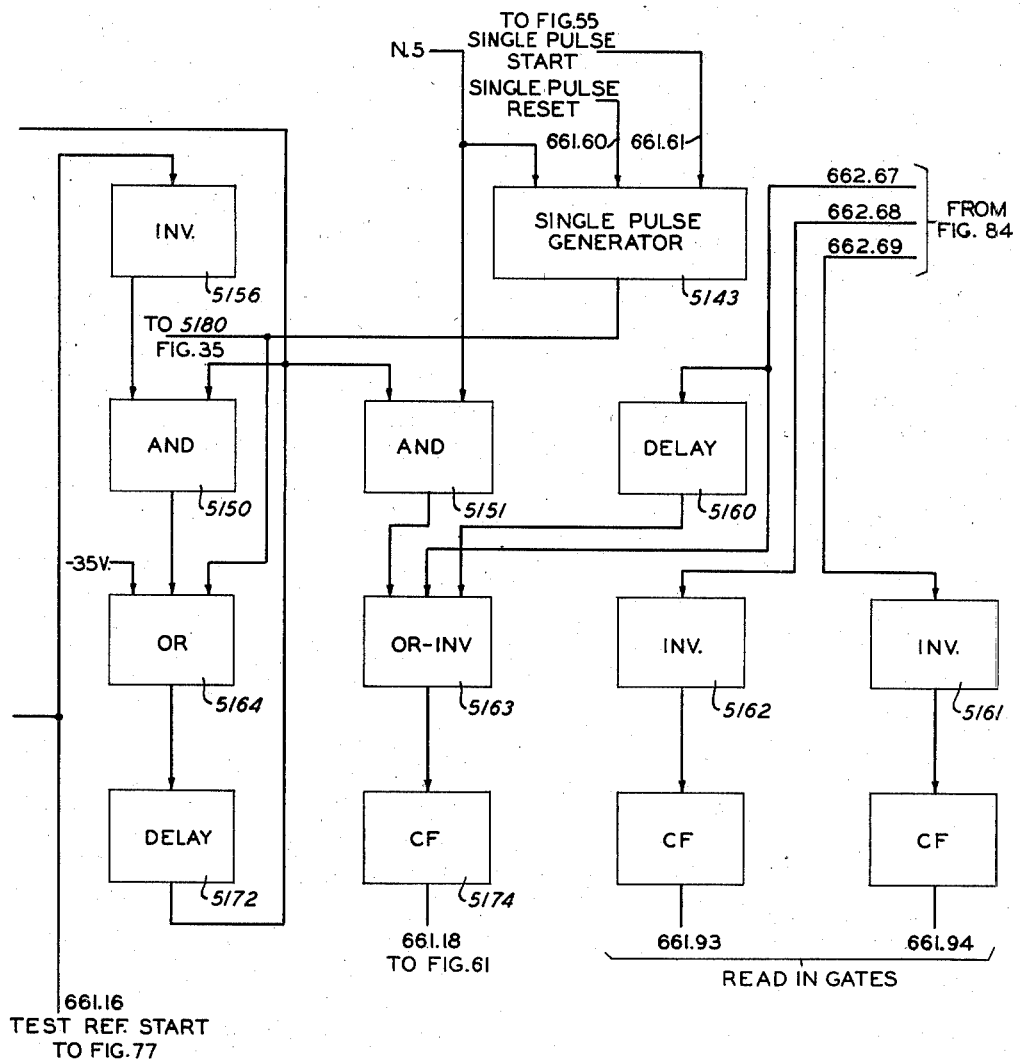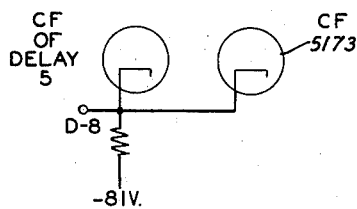

July 1, 1958

G. F. BLAND ET AL 2,841,740

CONVERTIBLE STORAGE SYSTEMS

Filed Nov. 21, 1955

CRT RASTER
500 SPOTS/TUBE FOR
2000 ADDRESSES

INVENTORS: GEORGE F. BLAND
WILLIAM J. DEERHAKE
JOACHIM JEENEL

BY

ATTORNEY

July 1, 1958 — G. F. BLAND ET AL — 2,841,740
CONVERTIBLE STORAGE SYSTEMS
Filed Nov. 21, 1955 — 62 Sheets-Sheet 20

CRT RASTER
900 SPOTS/TUBE FOR
3600 ADDRESSES

INVENTORS: GEORGE F. BLAND
WILLIAM J. DEERHAKE
JOACHIM JEENEL

BY ATTORNEY

July 1, 1958

G. F. BLAND ET AL 2,841,740

CONVERTIBLE STORAGE SYSTEMS

Filed Nov. 21, 1955

CRT RASTER
500 SPOTS/TUBE FOR
2000 ADDRESSES

FIRST HALF OF RASTER FOR
900 SPOTS/TUBE FOR
3600 ADDRESSES

INVENTORS: GEORGE F. BLAND
WILLIAM J. DEERHAKE
JOACHIM JEENEL

BY

ATTORNEY

July 1, 1958

G. F. BLAND ET AL 2,841,740

CONVERTIBLE STORAGE SYSTEMS

Filed Nov. 21, 1955

CRT RASTER
SECOND HALF OF RASTER FOR
900 SPOTS/TUBE FOR
3600 ADDRESSES

INVENTORS: GEORGE F. BLAND
WILLIAM J. DEERHAKE
JOACHIM JEENEL

BY

ATTORNEY

July 1, 1958 — G. F. BLAND ET AL — 2,841,740
CONVERTIBLE STORAGE SYSTEMS
Filed Nov. 21, 1955 — 62 Sheets-Sheet 23

INVENTORS: GEORGE F. BLAND
WILLIAM J. DEERHAKE
JOACHIM JEENEL
BY
ATTORNEY

July 1, 1958 G. F. BLAND ET AL 2,841,740
CONVERTIBLE STORAGE SYSTEMS
Filed Nov. 21, 1955 62 Sheets-Sheet 24

INVENTORS: GEORGE F. BLAND
WILLIAM J. DEERHAKE
JOACHIM JEENEL
BY 
ATTORNEY

July 1, 1958 G. F. BLAND ET AL 2,841,740
CONVERTIBLE STORAGE SYSTEMS
Filed Nov. 21, 1955 62 Sheets-Sheet 25

INVENTORS: GEORGE F. BLAND
WILLIAM J. DEERHAKE
JOACHIM JEENEL
BY
ATTORNEY

FIG. 48

INVENTORS: GEORGE F. BLAND
WILLIAM J. DEERHAKE
JOACHIM JEENEL

BY
ATTORNEY

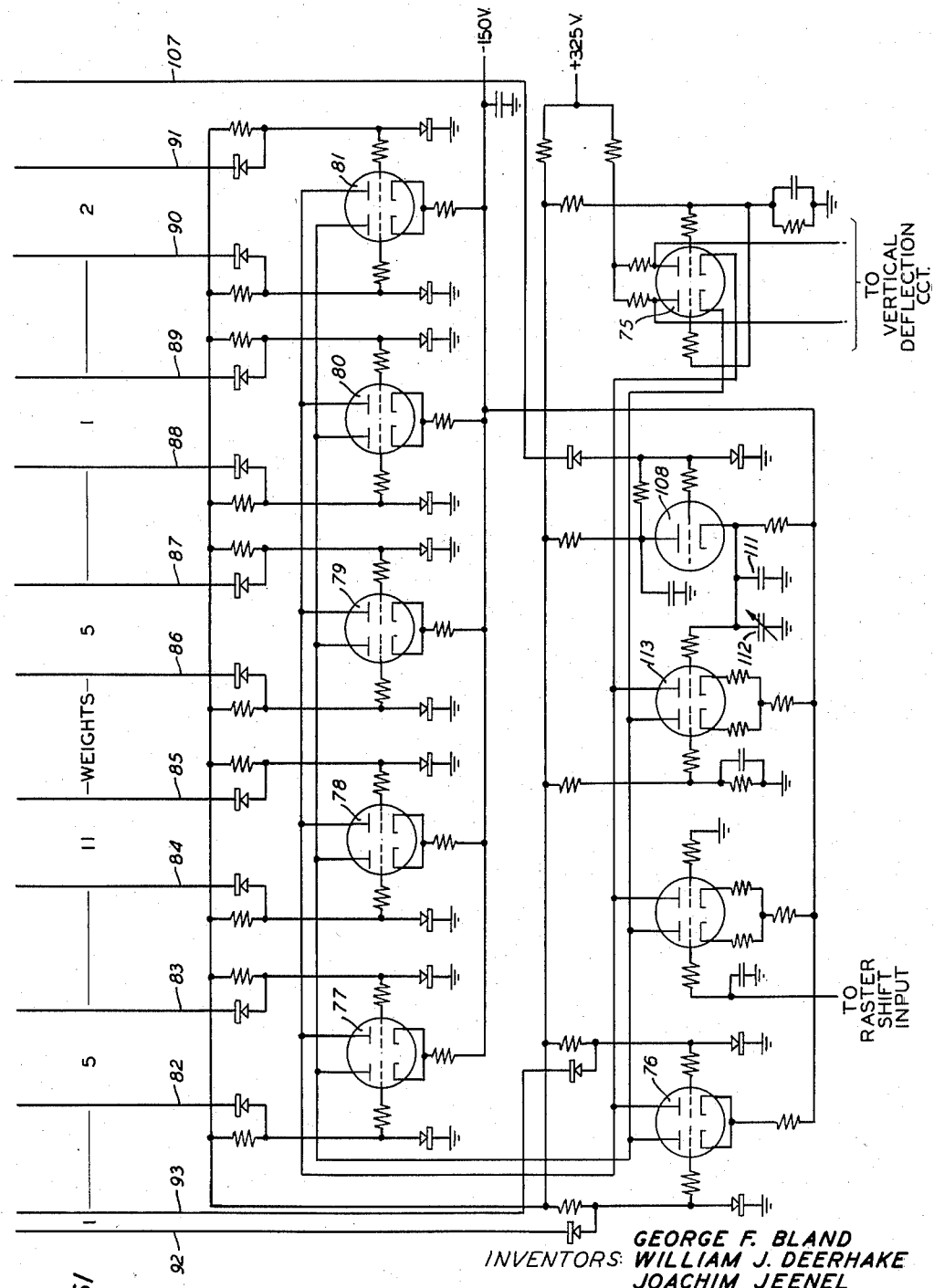

July 1, 1958   G. F. BLAND ET AL   2,841,740
CONVERTIBLE STORAGE SYSTEMS
Filed Nov. 21, 1955   62 Sheets-Sheet 31

ENLARGED VIEW OF SCREEN AT AREA OF DISPLAY

INVENTORS
GEORGE F. BLAND
WILLIAM J. DEERHAKE
JOACHIM JEENEL
BY
ATTORNEY

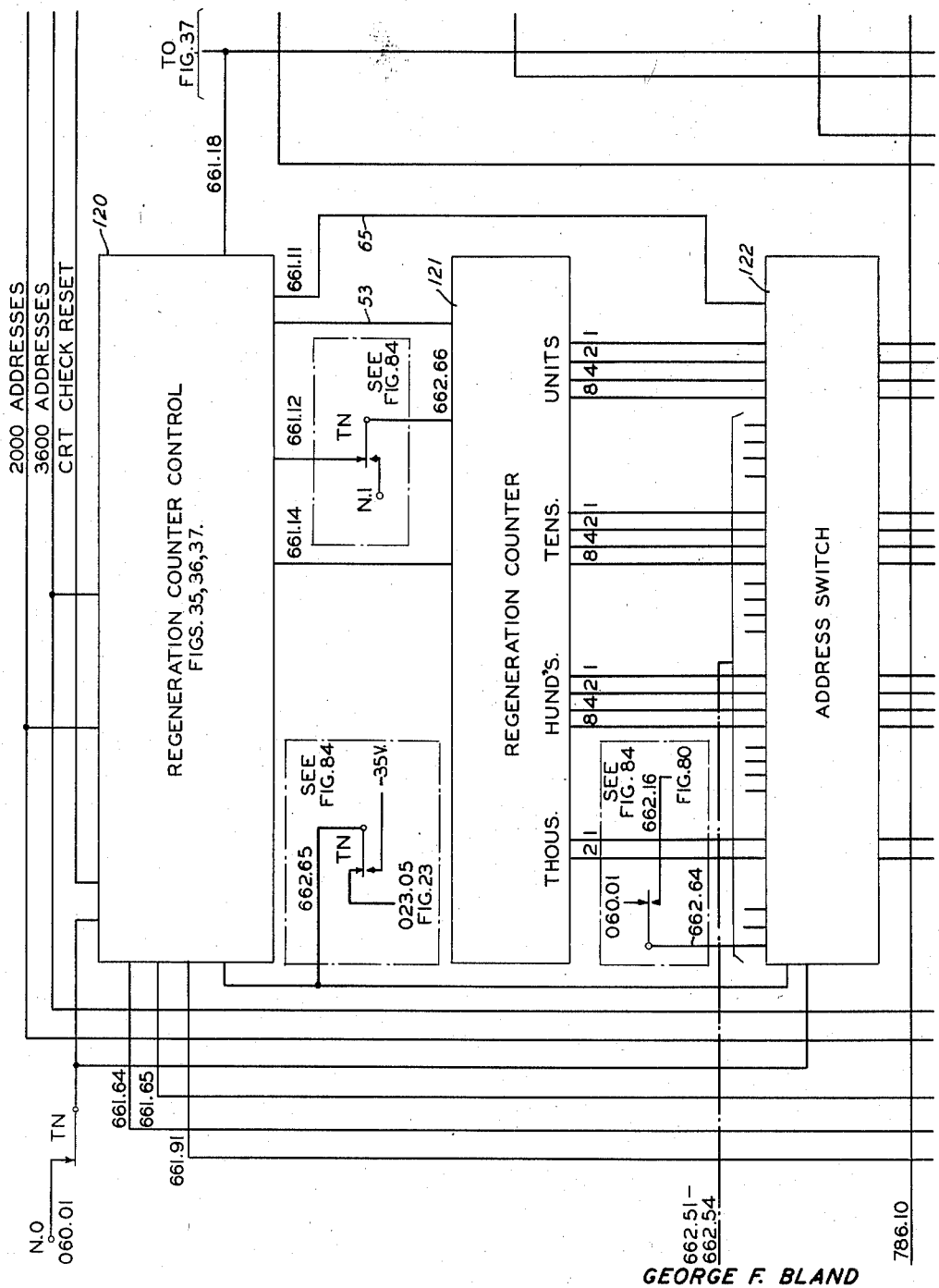

INVENTORS: GEORGE F. BLAND
WILLIAM J. DEERHAKE
JOACHIM JEENEL
BY
ATTORNEY

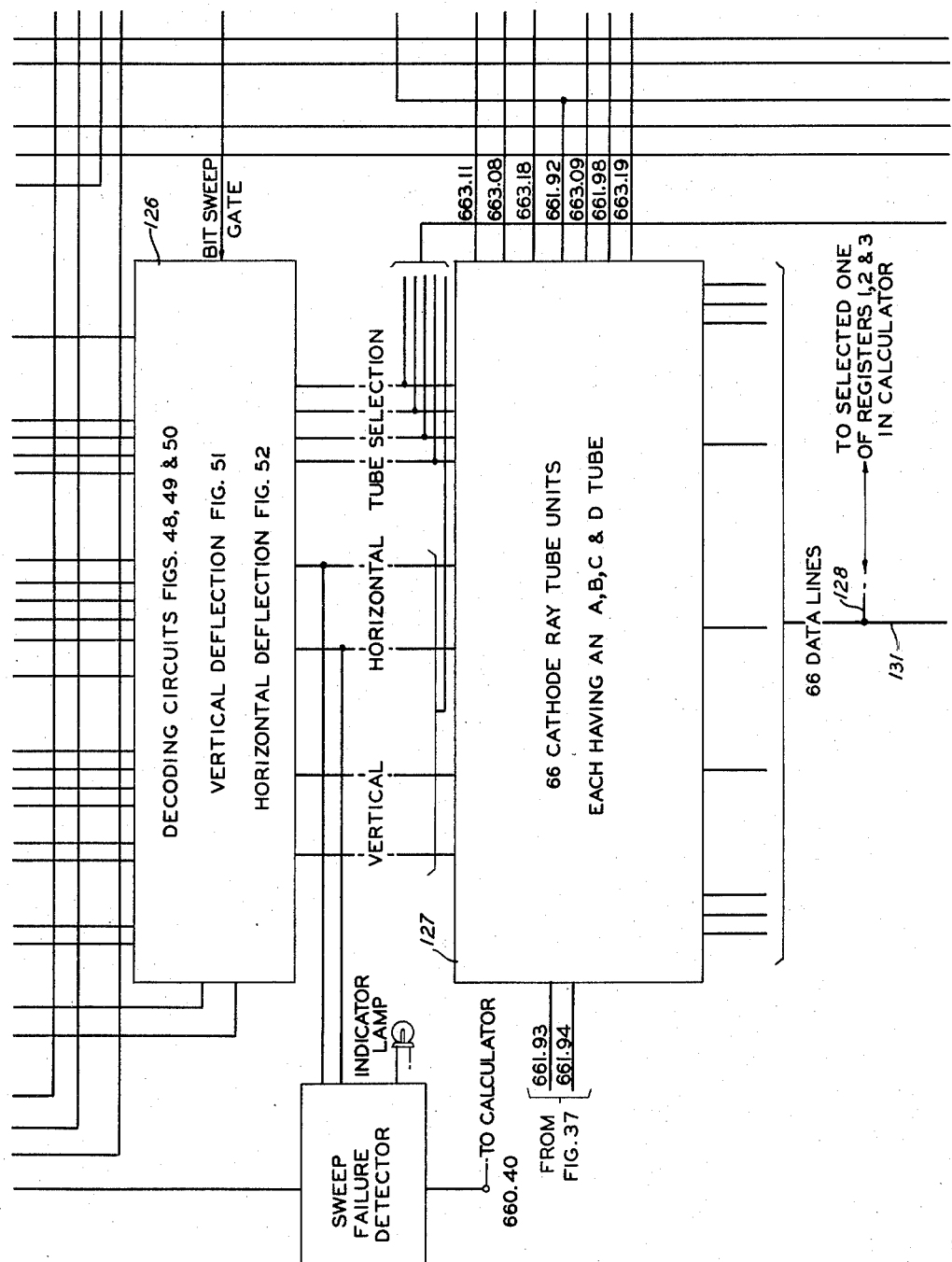

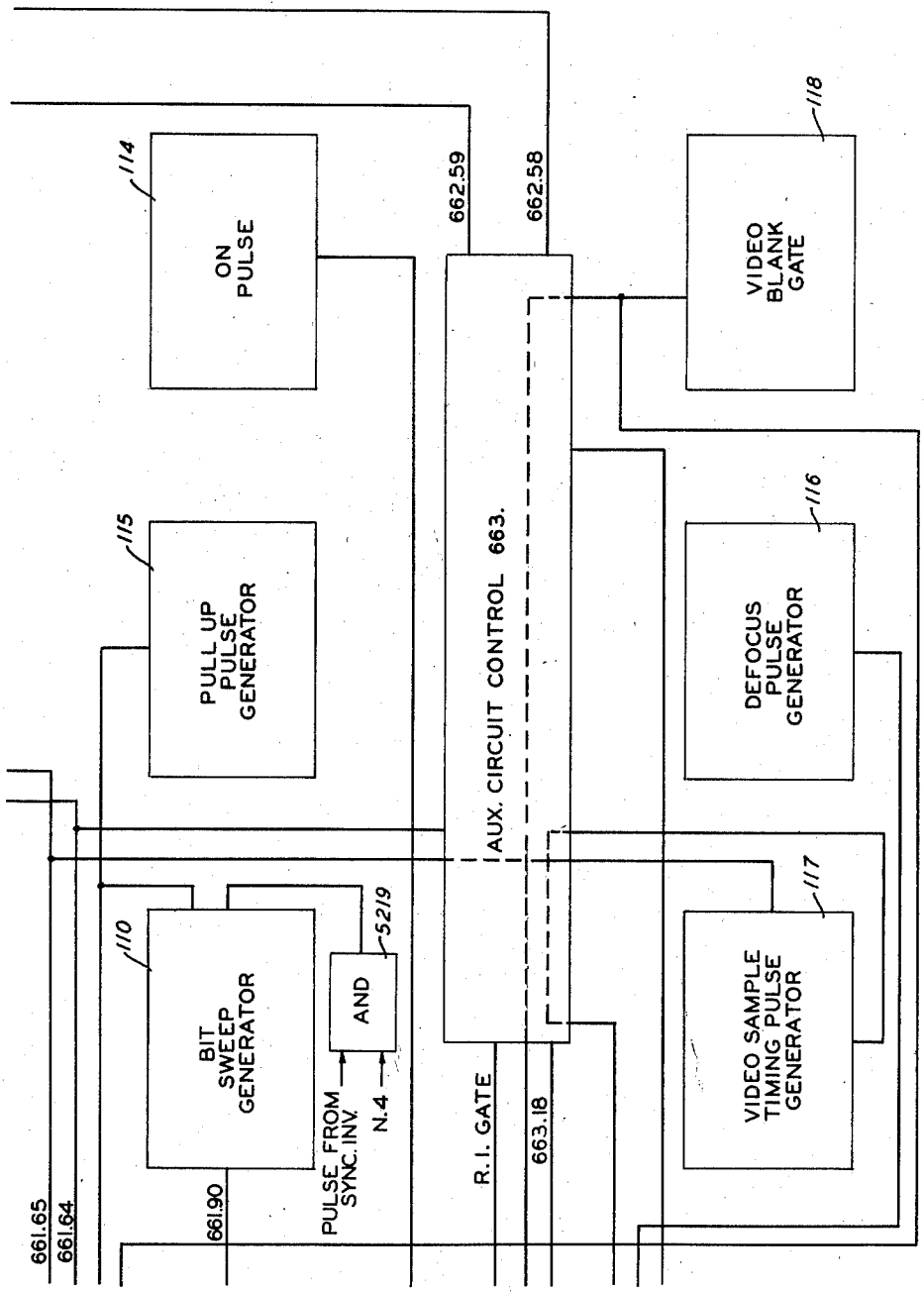

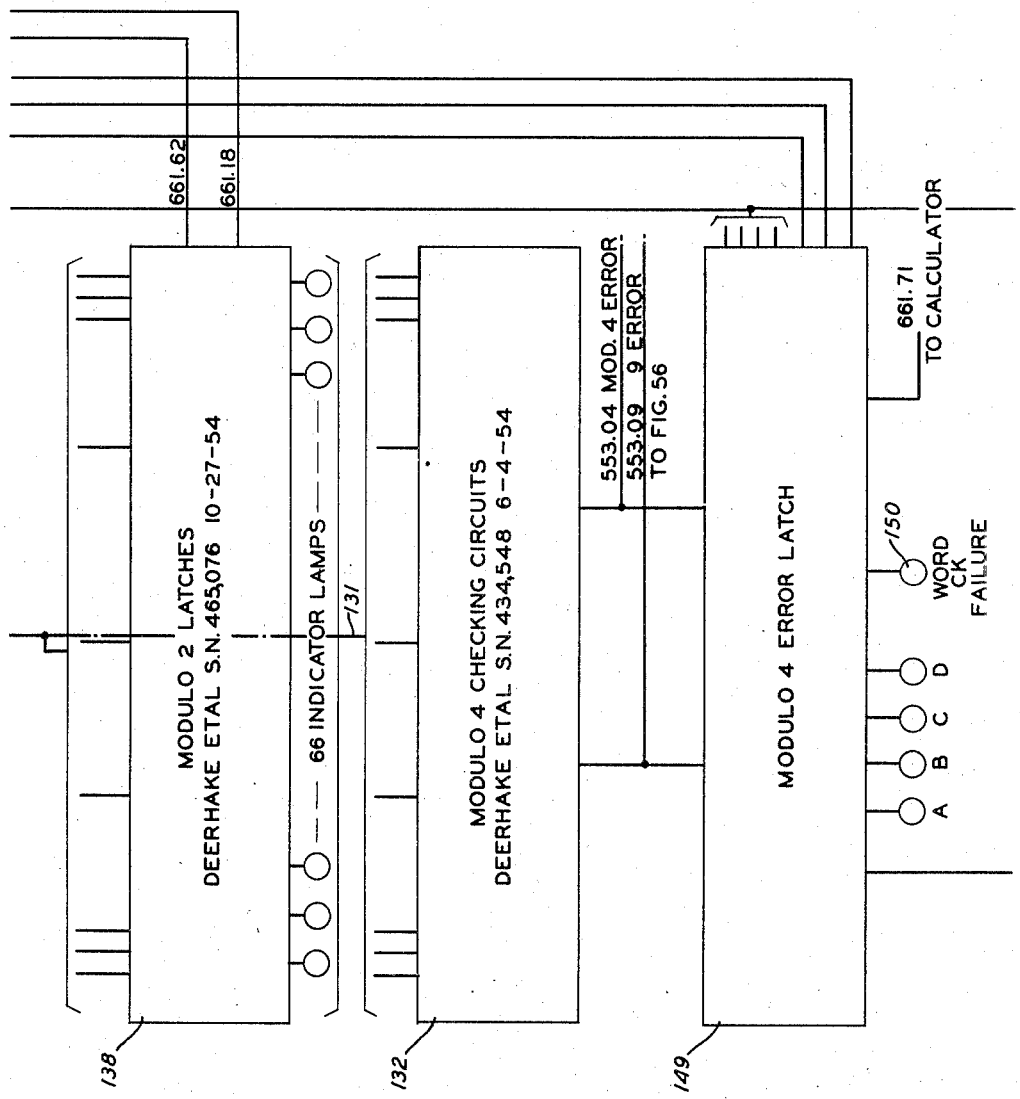

July 1, 1958

G. F. BLAND ET AL 2,841,740

CONVERTIBLE STORAGE SYSTEMS

Filed Nov. 21, 1955

INVENTORS: GEORGE F. BLAND
WILLIAM J. DEERHAKE
JOACHIM JEENEL

BY

ATTORNEY

July 1, 1958
G. F. BLAND ET AL
2,841,740
CONVERTIBLE STORAGE SYSTEMS
Filed Nov. 21, 1955
62 Sheets-Sheet 42
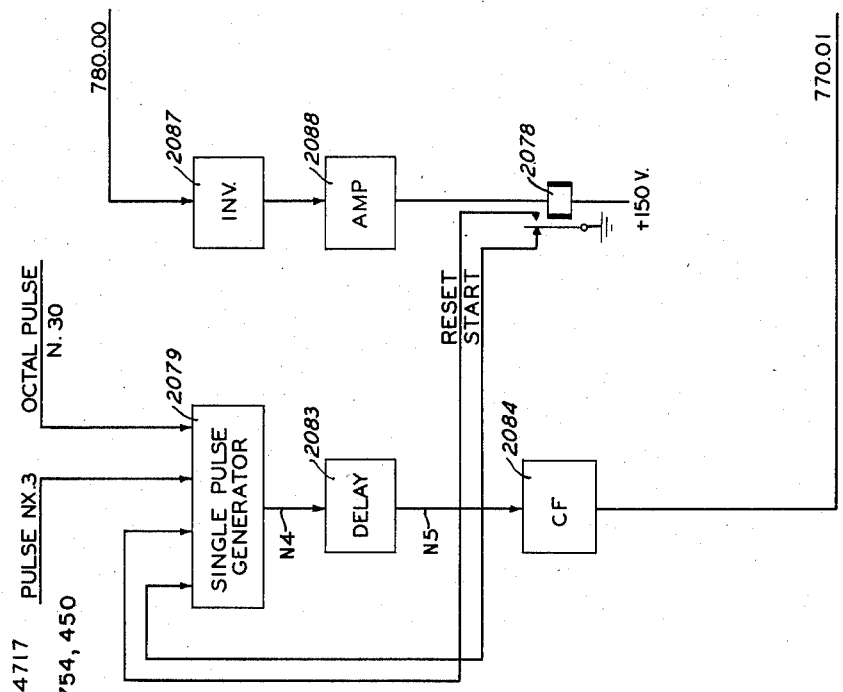
INVENTORS: GEORGE F. BLAND
WILLIAM J. DEERHAKE
JOACHIM JEENEL
BY
ATTORNEY

INVENTORS: GEORGE F. BLAND
WILLIAM J. DEERHAKE
JOACHIM JEENEL
BY
ATTORNEY

July 1, 1958        G. F. BLAND ET AL        2,841,740

CONVERTIBLE STORAGE SYSTEMS

Filed Nov. 21, 1955        62 Sheets-Sheet 44

INVENTORS: GEORGE F. BLAND
WILLIAM J. DEERHAKE
JOACHIM JEENEL

BY

ATTORNEY

July 1, 1958     G. F. BLAND ET AL     2,841,740
CONVERTIBLE STORAGE SYSTEMS
Filed Nov. 21, 1955     62 Sheets-Sheet 45
FIG. 72
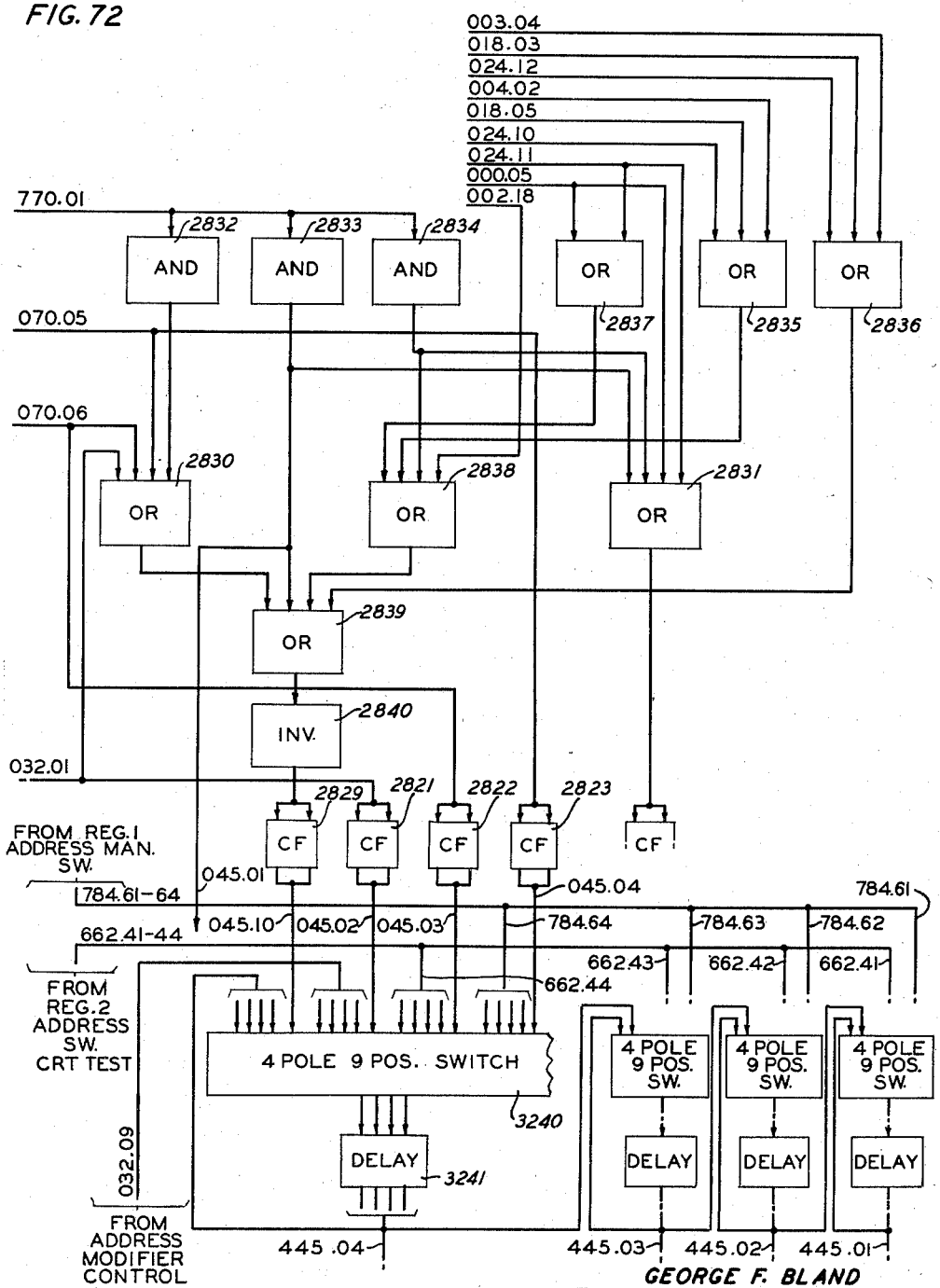
GEORGE F. BLAND
INVENTORS: WILLIAM J. DEERHAKE
JOACHIM JEENEL
BY
ATTORNEY July 1, 1958

G. F. BLAND ET AL 2,841,740

CONVERTIBLE STORAGE SYSTEMS

Filed Nov. 21, 1955

INVENTORS: GEORGE F. BLAND
WILLIAM J. DEERHAKE
JOACHIM JEENEL

BY

ATTORNEY

July 1, 1958 G. F. BLAND ET AL 2,841,740
CONVERTIBLE STORAGE SYSTEMS
Filed Nov. 21, 1955 62 Sheets-Sheet 47
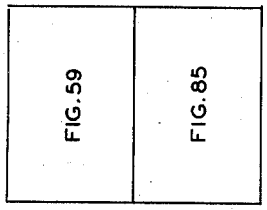
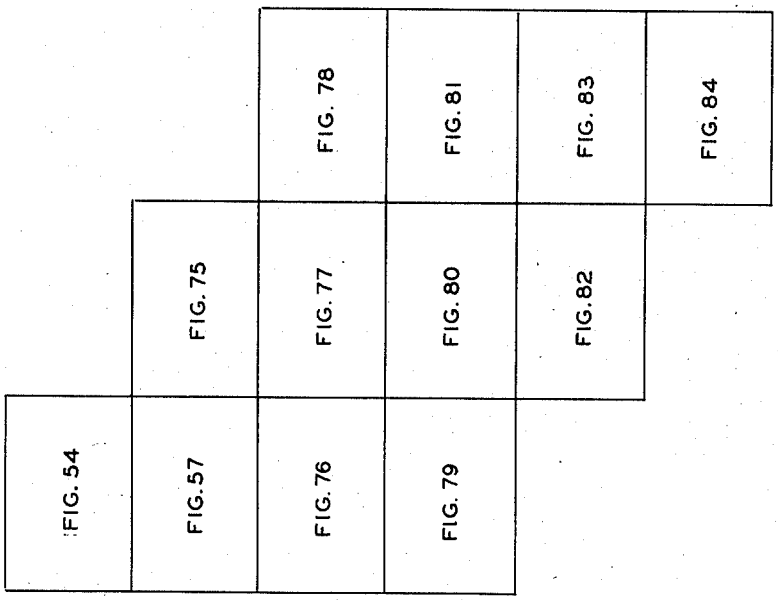
INVENTORS: GEORGE F. BLAND
WILLIAM J. DEERHAKE
JOACHIM JEENEL
BY
ATTORNEY

INVENTORS: GEORGE F. BLAND
WILLIAM J. DEERHAKE
JOACHIM JEENEL

BY

ATTORNEY

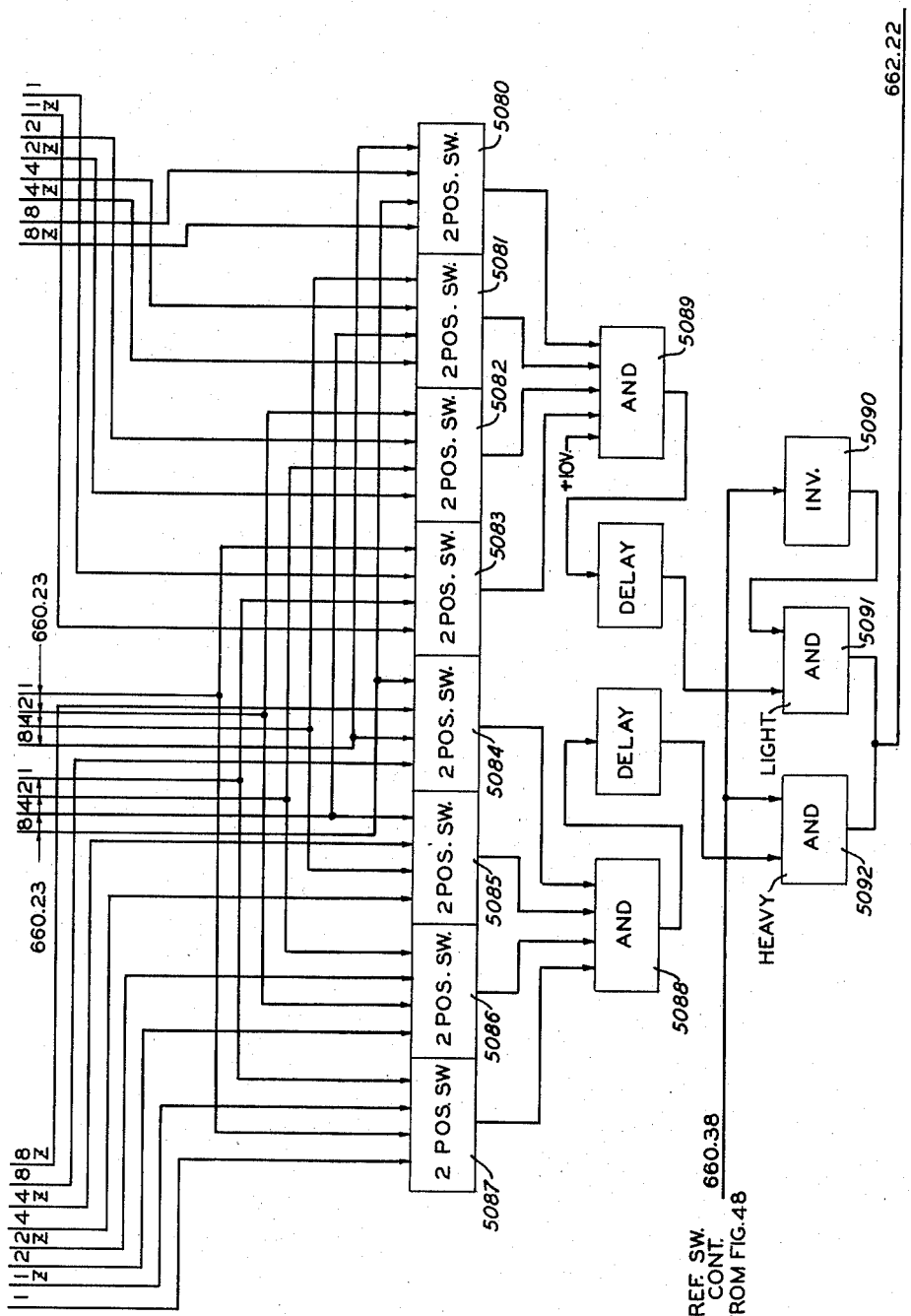
FIG. 79
INVENTORS: GEORGE F. BLAND
WILLIAM J. DEERHAKE
JOACHIM JEENEL
BY 
ATTORNEY July 1, 1958  G. F. BLAND ET AL  2,841,740
CONVERTIBLE STORAGE SYSTEMS
Filed Nov. 21, 1955  62 Sheets-Sheet 58

INVENTORS: GEORGE F. BLAND
WILLIAM J. DEERHAKE
JOACHIM JEENEL
BY
ATTORNEY

INVENTORS
GEORGE F. BLAND
WILLIAM J. DEERHAKE
JOACHIM JEENEL
BY
ATTORNEY

July 1, 1958    G. F. BLAND ET AL    2,841,740
CONVERTIBLE STORAGE SYSTEMS
Filed Nov. 21, 1955    62 Sheets-Sheet 62

INVENTORS: GEORGE F. BLAND
WILLIAM J. DEERHAKE
JOACHIM JEENEL
BY
ATTORNEY

United States Patent Office 2,841,740
Patented July 1, 1958

2,841,740

CONVERTIBLE STORAGE SYSTEMS

George F. Bland, New York, N. Y., William J. Deerhake, Dumont, N. J., and Joachim Jeenel, New York, N. Y., assignors to International Business Machines Corporation, New York, N. Y., a corporation of New York Application November 21, 1955, Serial No. 547,982

34 Claims. (Cl. 315—8.6)

This invention relates to electronic systems useful for the storage over indefinite periods of information expressed in binary notation, and particularly to large capacity systems where both the items and the number of items of information are large.

The object of the invention is to arrange a given storage device so that the capacity thereof may be increased by simple switching means, whereby the storage device may be worked in a manner commensurate with the complexity of the problem posed to the device of which the storage device constitutes a part. By way of example, and as disclosed herein a storage device, normally providing means for memorizing two thousands items of information, may, by a simple switching operation, be rearranged or converted to means for memorizing three thousand six hundred items of information. If, within the knowledge of the worker programming the operation of the device, something less than two thousand storage registers or addresses will be necessary, then a switching to that capacity will be made, but if the operation is to be more complex, then a simple switching operation will convert the same device to such greater capacity.

The storage system of the present invention is an adaptation of the electrostatic storage system disclosed in application Serial Number 444,253, filed by Havens and Deerhake on July 19, 1954, the novel features of the present invention residing in the convertible aspects of the cathode ray tube electrostatic storage means, from one capacity to another.

In both systems a regeneration counter is employed to count and to control the aiming of the beams of the cathode ray tubes to the spots on the faces thereof constituting the storage areas. Each output digit or number defines a different spot and hence each different output digit or number actually defines a different address of a storage register in which a "word" may be stored. In general a "word" consists of 16 digits 0 to 9 and one digit 0 to 3, and since each digit is expressed in pure binary notation there are 16×4 or 64 plus 1×2 or 2, making a total of 66 places provided. Since there are 4 CRT tubes for each place, there are a total of 66×4 or 264 tubes provided. In accordance with the principles of the invention this number may be changed to suit the capacity of the calculator of which the present device is a part.

The conversion of the capacity of the storage system is under the control of a simple switch mounted on the control console of the calculator. In one position thereof a capacity of two thousand addresses will be provided whereas in the alternative position a capacity of three thousand six hundred addresses will be provided.

A feature of the invention is a means for controlling the counter to perform different cycles, one a straight count of 2000 addresses from 0 to 1999 inclusive and another count of 4000 addresses in which 400 are counted twice. In this second cycle addresses 0 to 1999 inclusive are first counted, then addresses 0 to 399 are counted a second time and lastly addresses 2000 to 3599 are counted. In time the second cycle is twice the duration of the first. Those addresses which are counted twice in the second cycle are counted and recounted at the same rate at which they are counted in the first cycle. The remaining addresses, that is addresses 400 to 1999 inclusive and 2000 to 3599 inclusive are counted in the second cycle at half the rate which the addresses 400 to 1999 inclusive are counted in the first cycle.

It will appear hereinafter that the rate at which any address is counted and recounted is related to the spacing between the spots defined by their addresses so that the ratio of the frequency of counting to the distance between adjacent spots is constant. It will appear that this ratio is set so that the condition of each spot lies between a frequency of regeneration below which the condition at a spot cannot be maintained with certainty and above which the condition of adjacent spots will be adversely affected by "spill over."

A feature of the invention may therefore be stated as a means for converting the operation of a counter from a simple repetition of a given number of counts from zero to said given number to a complex arrangement of a larger number of counts in a plurality of unevenly sized groups at least one of which groups starts at a value other than zero.

Stated otherwise, a feature of the invention is means to control a counter either (one) to produce an output of numbers in several groups starting and ending in different numbers, repeatedly or (two) to produce an output of numbers of one of said groups, repeatedly.

A feature of the invention resides in a decoding circuit for translating the output of the regeneration counter or other means producing a similar output into the operation of current adder tubes in a cascode amplifier for producing the horizontal and vertical deflection potentials for aiming the beams of the cathode ray tubes. Each current adder tube acts to cause a definite increment of current to flow in the cathode of the upper triode of the cascode amplifier and this in turn is converted by this upper triode into a definite increment of potential applied to the deflection circuit of the cathode ray tubes. These incremental values are so chosen that with a minimum number the various values needed may be selected and simultaneously applied for control of the position of the beams. The values are additive so that by operating a selected group of one or more current adder tubes any one of the needed values of deflection potential may be produced.

By way of example, the horizontal deflection weights are 0 to 9 inclusive, 11 to 20 inclusive, and the half values in between. There are six current adder tubes to produce the values ½, 11, 5, 1, 2 and 1 respectively, whereby any one of the deflection weights above enumerated may be produced by a selected combination of these values.

The vertical deflection weights are 0 to 9 inclusive, and 11 to 25 inclusive, and again there are six current adder tubes to produce the values 5, 11, 5, 1, 2 and 1 respectively, whereby any one of the vertical deflection weights above enumerated may be produced by a selected combination of these values.

The decoding circuit used is a device inserted in line to translate the output of the counter, or any other means used to represent each decimal digit of an address, into a selected and corresponding operation of these current adder tubes, whereby upon the appearance of the decimal representation of an address on the fourteen bit conductors (the thousand's place uses only 2 bit conductors since no address is greater than 3 in its thousand's digit) the proper deflection potentials will be made available and the beams of the cathode ray tubes will be properly aimed.

A feature of the invention therefore consists of a raster control means comprising a means for sequentially indicating the various points to be traversed by the beams and means for translating these indications into appropriate deflection potentials. A counter is provided for producing these indications in a continuous succession and other means is provided for selectively producing these indications on demand. When such demanded indications are to be produced, the said continuous succession of address indications is interrupted and after such demanded operation is completed the said continuous succession is resumed at the point where the interruption occurred.

Heretofore the address indications directly operated the current adder tubes of the deflection circuit whereby the raster of the tubes was strictly limited to a pattern bearing a direct relation to the succession of binary-decimal numbers produced. By the addition of the decoding circuit of the present invention the rasters may be controlled more flexibly so that conversion from one to another capacity may be made and the sequential energization of adjacent spots in the larger capacity arrangement may be avoided, thus minimizing the effects of "spill over."

A feature of the invention may therefore be stated as the provision of means for coding addresses, decoding means responsive thereto, and deflection circuits responsive to said decoding means for controlling the aiming of the beams of the cathode ray tubes to spots defined thereby.

In prior art arrangements the deflection weights have been a function of the regularly advancing pattern of the binary representation of the address numbers with the result that the various addresses form a pattern of great regularity whereby the location of any particular spot can at once be identified from a consideration of its numerical identity. In the present arrangement, however, the addresses are grouped and the various groups are arranged in such manner that the frequency with which each spot is regenerated with relation to the spacing of such a spot between contiguous spots is constant. The great regularity of the prior art arrangement has therefore been disturbed in order to gain the advantage of regularity in frequency of regeneration.

The peculiar path traced by the beams of the tubes is dictated by the mathematical combinations of the decoded bits of the decimal-binary addresses.

It will be realized that to produce a second half raster in the 3600 arrangement exactly like the first half raster it would have been necessary to introduce a further translation to translate the addresses 2000 to 3599 to codes identical with those for the numbers 400 to 1999, for it is these codes which on being decoded control the deflection potentials.

A feature of the invention may therefore be said to be the achievement of regularity in the frequency of regeneration through irregularity in the positioning of the address locations. Since regularity in both factors would entail additional apparatus and add to the complication of this electronic maze, this feature is of considerable practical value and is believed to be a step forward in the art.

In the cathode ray tube arrangement of the present invention in order to accommodate the large number of addresses described, each "tube" heretofore spoken of, practically consists of four tubes, hereinafter designated A, B, C and D tubes and the spot numbering arrangement is such that spots on each are arranged in multiples of four. By way of example, the A tube accommodates the spots beginning with 0, the B tube accommodates the spots beginning with 1, the C tube accommodates the spots beginning with 2, and the D tube accommodates the spots beginning with 3. If $n$ is the count, beginning with 0 of the spots on each tube, then the address spot number will be according to the following table.

| Tube | A $(0+4n)$ | B $(1+4n)$ | C $(2+4n)$ | D $(3+4n)$ |
|---|---|---|---|---|
| Tube spot number: | | | | |
| 0 | 0 | 1 | 2 | 3 |
| 1 | 4 | 5 | 6 | 7 |
| 2 | 8 | 9 | 10 | 11 |
| 3 | 12 | 13 | 14 | 15 |
| 4 | 16 | 17 | 18 | 19 |

The above arrangement holds good for the complete list of address numbers 0 to 3599 inclusive, though the tube spot numbers, due to the pecularities of the binary decimal coding and the decoding means do not follow with strict regularity but move about the face of the tubes in a characteristic pattern which is apparent in the delineation of the rasters clearly shown in the drawings.

A feature of the invention therefore is the use of a code which will change the values produced by the decoding means only every four numbers in the advancing series of address numbers, in combination with a means for repeatedly and sequentially controlling said four tubes.

As the beams of the cathode ray tubes are pointed to a given address, information may be stored thereat, taken therefrom or information already there may be regenerated or refreshed. The information is in the form of binary bits which in a bank of tubes, one for each place in a code, may represent in code any wanted information such as numbers, mathematical signs or control signals. There being but two numbers in the binary notation any pair of opposite conditions may be used for the expression thereof. In the present instance, a so-called binary zero may be expressed by a positive potential and a binary one by a negative potential. If the beam is pointed at an address spot the coating on the face thereof will be increased positively in potential with a surrounding area of decreased potential. If the beam is very slightly moved to one side then the surrounding area of negative potential is dragged out with the result that where the beam is left stationary the spot will appear to have a positive charge whereas if the beam is slightly moved it will appear to have a negative charge. Binary 0 is therefore a positive potential gradient whereas binary 1 is a negative potential gradient.

These potential gradients are produced in a virtual condenser consisting of the coating of the inside surface of the cathode ray tube, over which the beam plays, as one plate thereof, the material of the face of the tube as the insulating material and a pick-up placed over the outside surface of the target area. It is this virtual condenser which assumes a positive charge at the exact spot on which the beam is focused and a ring of negative charge thereabout. The effect is well known and may herein be considered conventional.

Since these potential gradients are not permanent but are nevertheless comparatively slow to dissipate they may by constant and repeated regeneration be used to store coded information.

To read in information is to create positive and negative potential gradients at the spots of an address, to read out information is to sense the potential gradients found at the spots of an address and to transmit corresponding signals therefrom and to regenerate such spots is to sense the potential gradients thereat and to recreate like gradients. Information may be read out and regenerated at the same time or it may be read out and then left blank, that is a positive gradient may be created at every spot of the address or the information may be read out and new information read in on the same operation.

The graphical representation of a positively charged spot in appearance is similar to a cross sectional view cut through a mound surrounded by a moat, the mound being positive and the moat being negative. The formation of such a spot is popularly spoken of as "digging a hole." The justification for such terminology is somewhat strengthened by the fact that there is a certain amount of debris in the form of ionized particles spattered out of the area and which act to fill in adjacent "holes" and this becomes a limiting factor in the frequency with which the process may be repeated.

A feature of the present invention lies in the means for moving the beams of the tubes off center from a spot in different directions in reading in a binary one. Where too frequent regeneration of a spot must be avoided to prevent the ill effects of spill over, by the same token the movement of the beam off center must be in such a direction that it does not approach too closely a contiguous spot. Where the movement is normally horizontal, when the larger numbered address arrangement is used and the distance between contiguous spots is shortened by half, then the movement is changed to a vertical direction where the distance between the spots has remained unchanged. Means is therefore included in the decoding device of the present invention responsive to address codes representing locations of spots more closely packed for changing the direction of beam movement for reading in binary bits.

It is to be noted that the horizontal deflection weights starting at zero extend to 20 and in some cases to 20½ whereas the deflection weights extend to 25. Speaking in terms of ordinates and abscissas, there will be (in the 2000 address arrangement) 20 ordinates and 25 abscissas and since, physically, the spots are packed into a square on the face of the tube, it appears that there is greater room between the ordinates than between the abscissas. Therefore, since it is wished always to write the dash in the direction where more space is available, the dash takes the form of a horizontal movement in the 2000 address arrangement and in the addresses 0 to 399 in the 3600 address arrangement.

When, however, the 3600 address arrangement is used, the dash for all addresses 400 to 1999 and 2000 to 3699 is changed to a vertical direction. By such an arrangement, automatically operated, the dot is extended to a dash in the direction of the greatest available space.

A feature of the invention may therefore be stated as the provision of means for automatically writing in the dash signals in the direction of the greatest available space.

Movement of the beam must be caused by an increment to the horizontal deflection potential or an increment to the vertical deflection potential. In the normal operation of the cathode ray tubes, the beams go through a cycle consisting of (one) movement to an address, (two) centering on the exact spot of the address and (three) a slight off side movement. The beams are always turned on or made effective when they are thus centered but may or may not be left on during this third step depending on whether or not it is desired to read in a dash at this point. If the beams are turned off before this slight off center movement takes place, then a positive potential gradient is left at this exact spot, but if on the other hand the beam remains effective during this third stage movement then the surrounding negative area about the spot is dragged out and a negative potential gradient is left at the exact spot.

The positive or negative nature of the potential gradient may be sensed in a circuit including the beam pointed directly at the spot, a pick up plate placed over the outside surface of the cathode ray tube and a video amplifier which is responsive to potential values.

Regardless of the potenial gradient encountered by the beam as it moves to an address spot a new dot is written in, that is a positive potential gradient is set up. If a dot had previously been written in at that spot, no change would occur and this would be spoken of as a negative response. However, if a dash had been previously written in at that point, a change from a negative potential gradient to a positive potential gradient would be brought about and this would be spoken of as a positive change. Thus in the sensing of the condition at an address spot a negative (none) change would indicate a dot and a positive change would indicate a dash. When such a positive change is found, then the beam remains on during its slight offside movement to write in another dash to replace that just destroyed by the sensing operation.

Another feature of the invention resides in certain control and testing facilities. The calculator as a whole, only portions of which are herein disclosed, is provided with a console and a maintenance panel on which are mounted a plurality of switches and pushbuttons, those on the console being for the general purposes of steering the operation of the calculator and those on the maintenance panel being for the general purpose of seeking the cause of unstandard operation. Since the calculator operates on a megacycle basis it is obviously impossible to detect an unstandard operation by observation of any single display and hence means are provided to cause such display to be frequently repeated so that the effect produced may be observed on the face of a cathode ray tube.

Generally speaking, the operations of the device are so extremely rapid that it is impossible to even detect any particular and detailed operation so that means is provided to gate the conditions obtaining at a given time determined from a knowledge of the programming of the calculator into a storage register where the conditions may be examined at leisure. By way of example, where the programming requires that a "word" be registered at a particular address at a given stage of a suboperation, a failure may be due to faulty storage at that location. Perhaps some one of the cathode ray tubes has a faulty coating at the particular point corresponding to that address so that the potential gradient necessary for the storage of a dot or a dash cannot be established. The identity of the address may then be established by observation of the V Field, for when an error occurs the calculator is brought to a halt at the address from which the error flows. By means of the register display device the record at the given address is made to appear in the form of Arabic numerals and since this display contains the four digit record of the V Field the address is then made known (the V Field being in essence a set of storage registers for holding the numerical identity of the address involved in a given operation).

There is in constant supervision of the operations of the calculator certain error detecting means known as the modulo 4 detecting means by which a check is made on each word as it is entered into storage. Each word of sixteen four place coded digits is accompanied by a two place coded indicator. This indicator is the 3's complement of the modulo 4 value of the total number of bits in the word and is therefore characteristic of the word. If the modulo 4 value of the total number of bits (the bit count modulo 4) is added to the above described indicator and then the value 1 is added to this sum, the total will invariably be 4 if the word being entered is in order. Therefore, as each new word is offered for storage the bit count is made, its modulo 4 value is determined and then added to the indicator and to the digit 1, whereby any deviation from the expected value 4 is immediately registered as an error. Likewise a detector for each of the said sixteen digits automatically determines if the four place code therefor expressed a digit greater than nine and if this appears true an error of this nature is immediately registered. Upon the detection of either one of these unstandard conditions an appropriate signal is displayed and further operation of the calculator is stopped.

In addition to this modulo 4 checking circuit there is also in constant supervision of the operations of the calculator certain error detecting means known as the modulo 2 latches by which a constant odd or even total of the bits entered into each code place in the storage addresses is kept. Whenever one of the above noted signals is displayed the error may be traced to a particular one of the addresses and a particular one of the 66 data line code places by the use of certain pushbuttons on the console. The operation of one of these pushbuttons will block the further entry of any new word and will cause the regeneration counter to make a complete survey of the 2000 or the 3600 addresses (according to the position of the CRT capacity switch) and to recount the number of bits in storage. Ordinarily this will result in an even number for the number entered should equal the number in storage. If it then appears that the number offered for entry differs from the number in storage that have been properly accepted, then the total will be uneven. Usually in such a case there will be 65 negative signals (even count) and but a single positive signal (odd count) though it is possible but extremely unlikely that two errors have simultaneously occurred. These error checking and indicating means have been fully disclosed heretofore.

A feature of the present invention, however, is a means provided for correcting errors of this nature when found. This means consists of pushbutton means and circuitry controlled thereby for causing the display of words and identification of addresses where words may be stored and for transferring words present in registers from which they may be displayed into storage or from storage into registers where they may be displayed. When the exact nature of the error has thus been ascertained, the faulty word may then be moved to a position where it may be repaired and after repair may then be moved back to the register or the address where it should properly be found after which the operations of the calculator can be resumed.

One of the prime means used for these operations is a four place register known as the V Field. This consists of a set of four latches which under normal conditions receives the identification of each address as the beams of the cathode ray tubes travel over their rasters. By means of one of the above mentioned pushbuttons the address reached when an error is detected may be held steadily (latched) in the V Field and then displayed in the form of Arabic numerals. With the identity of the address known the words involved may then be moved about as above described until the error is repaired.

There is also provided a set of dial switches by which any given address may be written into the V Field. These switches, one for each digit of an address, are set and thereafter one of the said pushbuttons is operated, whereupon the V Field is set from the switches and thereafter used to control the beams of the cathode ray storage tubes so that a word may be moved to or from storage at that particular address.

Another feature of the invention is a means for testing the capability of the cathode ray tubes to correctly store bits frequently transmitted thereto without suffering the ill effects of "spill." It has been stated hereinbefore that one of the features of the invention is a means to maintain a constant ratio between the frequency of application of the cathode ray beam and the spacing between adjacent address spots. In order to be sure that the devices are operating well within their capabilities there is now provided test means for gradually and greatly overloading such devices while keeping them constantly under observation to determine at what point the expected ill effects first appear. Accordingly an additional counter is provided together with a manually adjustable switch whereby each address may be subjected to an increasingly greater number of successive operations. Under ordinary or normal circumstances a dot or a dash will be entered into a given address once in each 2000×8 or 16000 microseconds when the CRT capacity switch is set to 2000 or 4000×8 or 32000 microseconds when the CRT capacity switch is set to 3600. That is to say, the frequency of entering a dot or a dash is normally about 62.5 per second for what is known as the heavy duty service and half that or 31.25 per second for the light duty service. By means of the present arrangements a dot or a dash may be entered each 8 microseconds over a count varying from 100 to 900 times. This very greatly increased frequency will produce the ill effects in a relatively short period, that is the effect is accelerated in this manner and a comparative evaluation of the capability of the tubes may be made. Whereas the normal frequency of repetition of the entry or reference to an address is maintained over long periods, measured in hours or days, this test reference even if repeated 900 times is maintained for only a fraction of a second.

In accordance with the present arrangements all the sixty-six storage spots of an address are treated alike, that is a dot is entered into each or a dash is entered into each or, in accordance with a routine when, by way of example, the reference number switches are set to 500, then 499 dashes followed by a single dot are successively entered. Since all digits of the 16 digit word are thus alike some eight circuits for comparing one digit with an adjacent digit are provided, each of these circuits terminating in an inequality detector and all eight outputs thereof converging to a single error circuit whereby a constant watch over the response of the tubes is kept. Thus the reference number switches may be set at a low value whereupon each address will be subjected to that given number of operations at this high speed and a complete regeneration cycle will be carried out between the test of each address. If no failure signal is produced, then the operator will move the reference number switches to a higher value, repeating this until a failure signal is produced. The so-called test reference cycle consists of two parts, one known as the read in portion and the other known as the read out portion. In the first, or read in portion, each address is approached and a dash or a dot is read in a given number of times in quick succession after which a complete regenreation cycle of all the addresses is carried out until all the addresses have been treated in this manner. This is then followed by the read out portion which each address is approached in the same manner and a given number of read out operations are made in quick succession after which a complete regeneration cycle of all the addresses is carried out. Since the read out operation is essentially a regeneration of the spot that is sensed it might be said that the read out portion of the cycle consists of approaching each address in turn and quickly regenerating the condition found a given number of times in quick succession while carrying out a conventional regeneration cycle between each address. A constant check for identity of records is kept throughout all operations, the actual read in operations, the normal regeneration operations, and the read out operations. It will be realized that each of the said inequality detectors will effectively watch eight address spots since each binary-decimal digit of the word requires four spots at the given address. It is also to be noted in this connection that the regeneration cycle when the CRT capacity switch is set for 3600 addresses differs from the normal regeneration cycle in that the count is straight, from 0 to 3599 inclusive instead of repeating the block 0 to 399 as set out hereinbefore.

In accordance with the present arrangement a so-called test normal relay or switching device is provided which switches over a large number of connections and brings into play this additional counter whereupon the two counters cooperate to control the test cycle above set forth. The test access counter now controls the sequential test of each address and the normal regeneration counter tallies the number of times reference is made to each address, the normal regeneration counter taking over the duty of successively regenerating the record at each address. After the test normal switch is operated, then the Write Switch is operated so that all dashes or all dots are written during the test.

It is to be noted that the spill tests then carried out are more rigorous if all dashes are written since the beam of the cathode ray tube is on for one microsecond in writing a dot whereas it is on for four microseconds in writing a dash. Since sensibly four times as many electrons are extracted from the spot in writing a dash as there are in writing a dot, there is sensibly four times as much electronic debris available for discharging the conditions set up at neighboring spots, and therefore the ill effects of spill are more noticeable under these conditions. Although in practice it has been found that a much larger number of test access references to a given address than 500 can be administered without the appearance of a failure signal, it is considered very satisfactory if the tubes withstand a 500 test.

Another point is to be noted, that no attempt is made during this spill test to identify the particular tube or the particular address which first shows a failure but only to determine the greatest number of times the system of tubes will withstand the test without failure.

Another feature of the present invention is a means for controlling the pattern of a regeneration cycle. The normal regeneration cycle explained hereinbefore depends on the setting of the cathode ray tube capacity switch, that is, if this switch is set to a capacity of 2000 addresses then the regeneration cycle consists of a repeated straight count of 0 through 1999 inclusive, but if it is set to a capacity of 3600 addresses, then the cycle consists of a count of 0 through 399, a count of 400 through 1999, a count of 0 through 399 and a count of 2000 through 3599. It has been explained under these circumstances the addresses 0 through 399 are working under heavy duty conditions and must be regenerated at twice the frequency of the addresses 400 through 3599 which are working under light duty conditions. In accordance with the present arrangements the counts are straightforward in both instances, and the differences between the heavy and light duty conditions are taken care of by the reference selector switches. These switches have two settings, one for heavy duty and the other for light duty, set independently of each other. Thus it is possible to test each at the same rate or at different rates as desired. In order to accomplish this a means in the regeneration counter control circuit which normally causes the regeneration counter to be cleared after the count of 1999 in the first half of the 3600 cycle and after the count of 399 in the second half of this cycle is disabled so that the count will be straightforward and continuous from 0 to 3599. On the other hand, the control of the tally kept by the normal regeneration counter is shifted between the two portions of the reference selector switches in accordance with the area of the CRT being tested. Thus when the CRT capacity switch is set at 2000 the heavy duty portion of these switches will have control but when this capacity switch is set at 3600 the heavy duty portion of these switches will have control only during the counting of the addresses 0 to 399 inclusive and the light duty portion will have control through the counting from 400 to 3599 inclusive. Thus in the testing of the capabilities of the various addresses a differentiation between the light duty and the heavy duty areas may be made.

Another feature of the invention is a synchronizing terminal used for test purposes whereby access may be had for test purposes to any given address without the manipulation of the V Field. That is to say, a synchronizing pulse may be produced during the normal operation of the calculator without stopping such operations. Since each address is frequently worked by the normal regeneration operations this synchronizing pulse will as frequently appear and may be used for test purposes. It may be noted that such a synchronizing terminal is fundamentally similar to another such terminal disclosed in the pending application Serial Number 470,570, filed November 23, 1954, and featured in the divisional application Serial Number 510,118, filed May 23, 1955.

In accordance with this feature a set of manual switches is provided on which any given address may be written and which will place Up and Down conditions on a set of circuits exactly paralleling the circuits leading from the regenerated counter. These circuits and the like circuits from the regeneration counter are then connected through a cascade of And circuits so that when and only when the configuration of Up and Down conditions on the two sets of circuits is exactly alike will there be an output pulse. Therefore this synchronizing pulse is produced each time a particular address is approached, either on routine regeneration or on a read in or read out operation.

Other features will appear hereinafter.

The drawings consist of sixty-two sheets, having ninety-two figures, as follows:

Fig. 14 is a schematic circuit diagram of a blocking oscillator;

Fig. 15 is a symbol used in the logical circuits to represent the circuit of Fig. 14;

Fig. 16 is a schematic logical diagram of a binary adder;

Fig. 17 is a symbol used in the logical circuits to represent the circuit of Fig. 16;

Fig. 18 is a schematic logical diagram of an inequality detector arranged to report the inequality existing between a pair of bit conductors;

Fig. 19 is a schematic logical diagram showing how four of these inequality circuits may be combined to report the inequality existing between two channels each carrying the four bits of a binary-decimal code;

Fig. 20 is a schematic circuit diagram showing the essential elements of a cascode amplifier used herein to produce the weighted deflection potentials;

Fig. 24 is a chart showing the circuit movements within a units decade counter and illustrating the regular succession of incoming pulses from a zero time for a period long enough to count the output decimal digits 1, 2, 3, 4 and 5;

Figure 26:
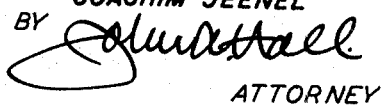
Figure 32:
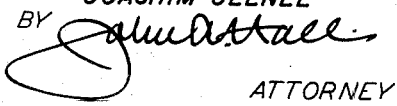
Figure 40:
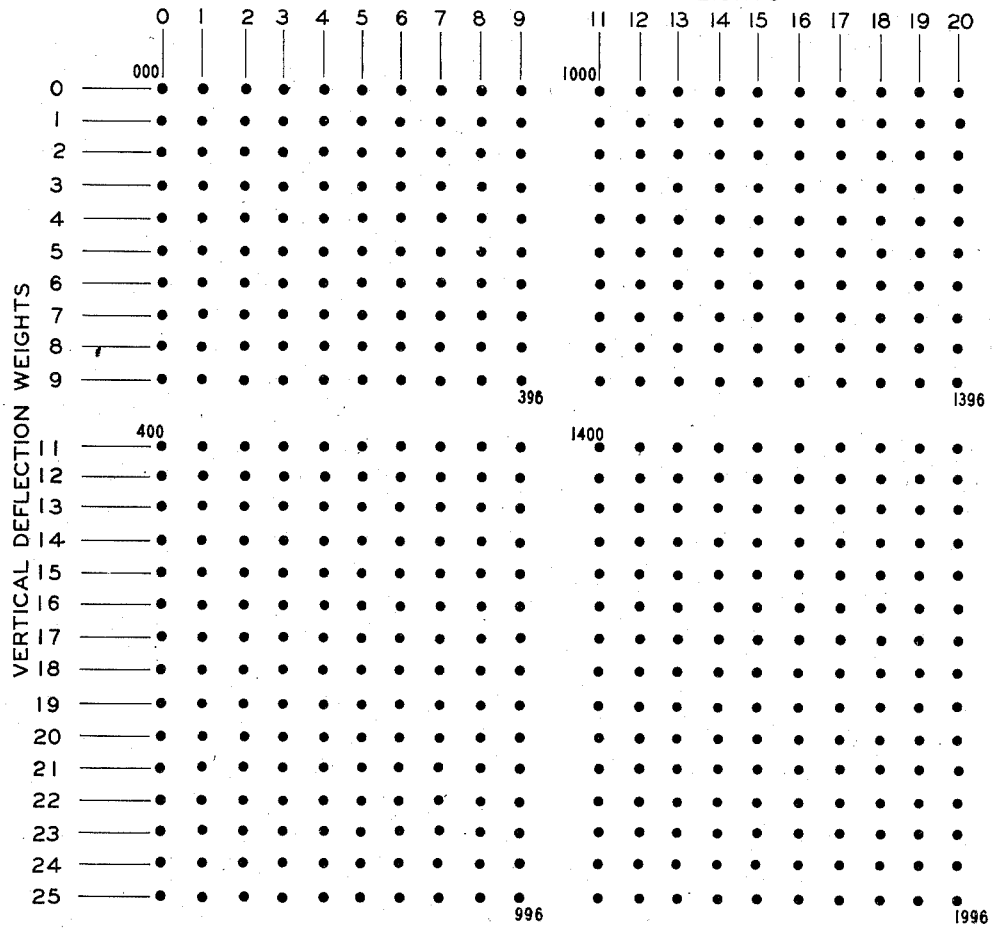
Figure 41:
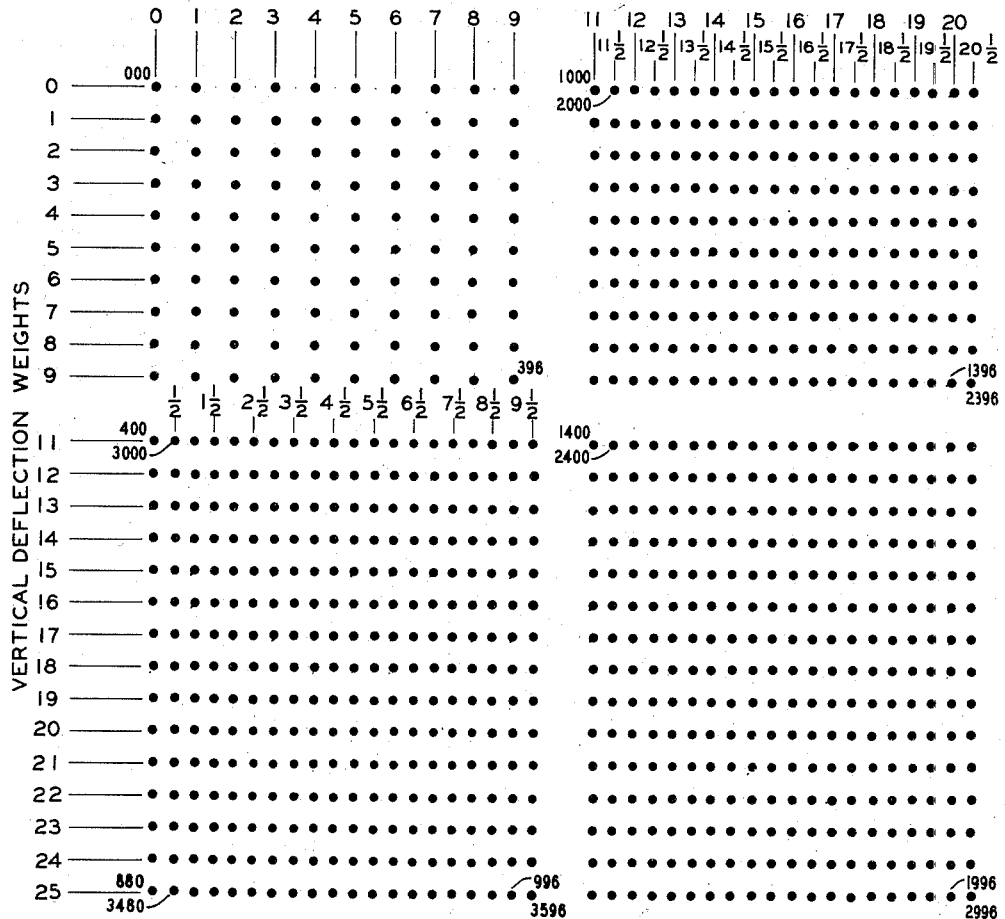
Figure 42:
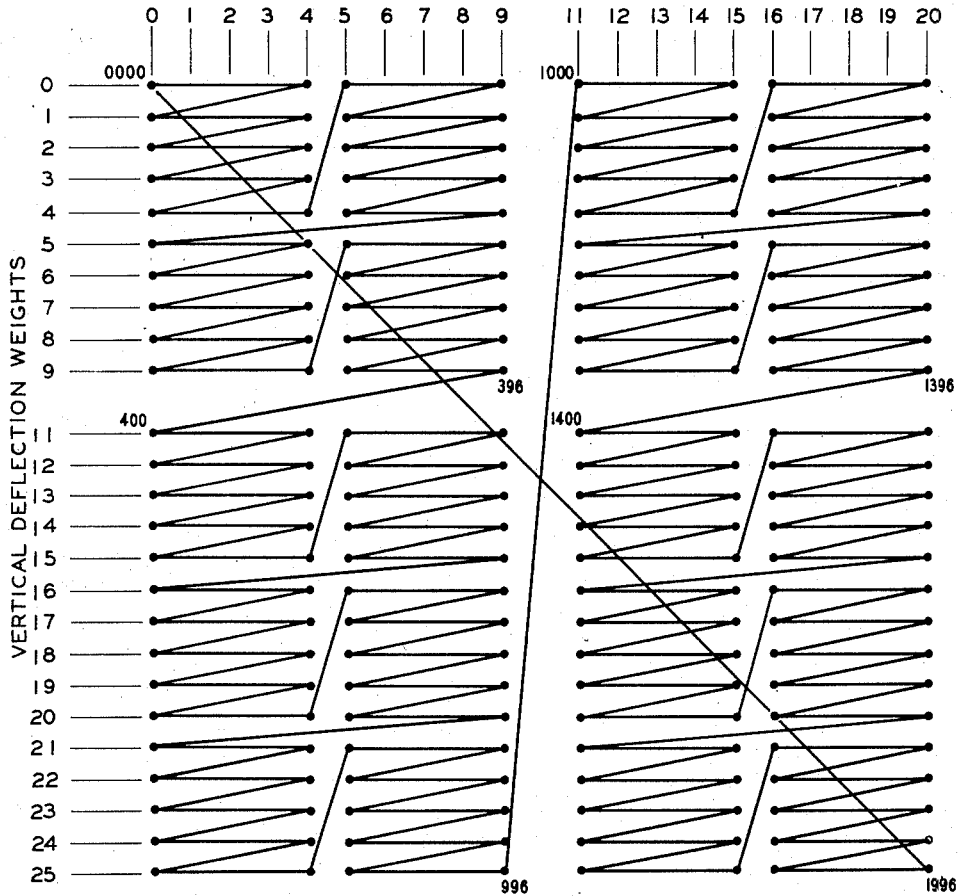
Figure 43:
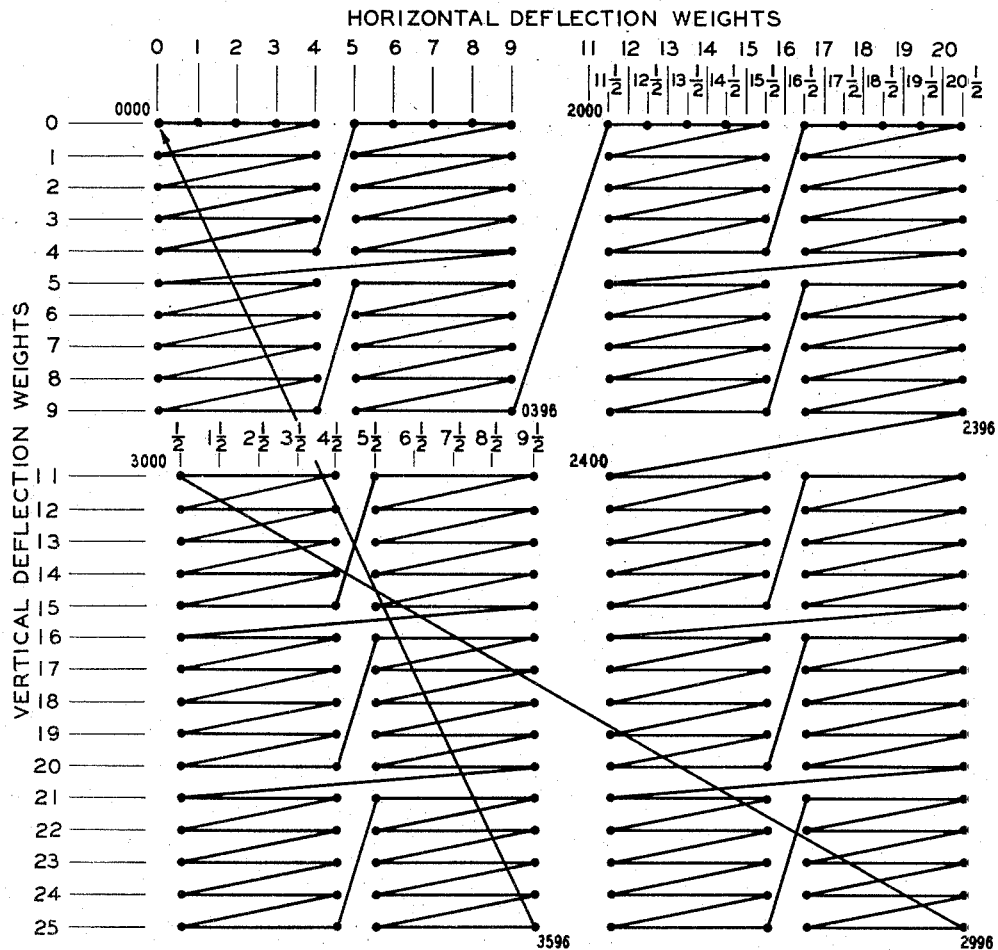
Figure 44:
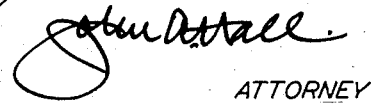
Figure 45:
Figure 46:
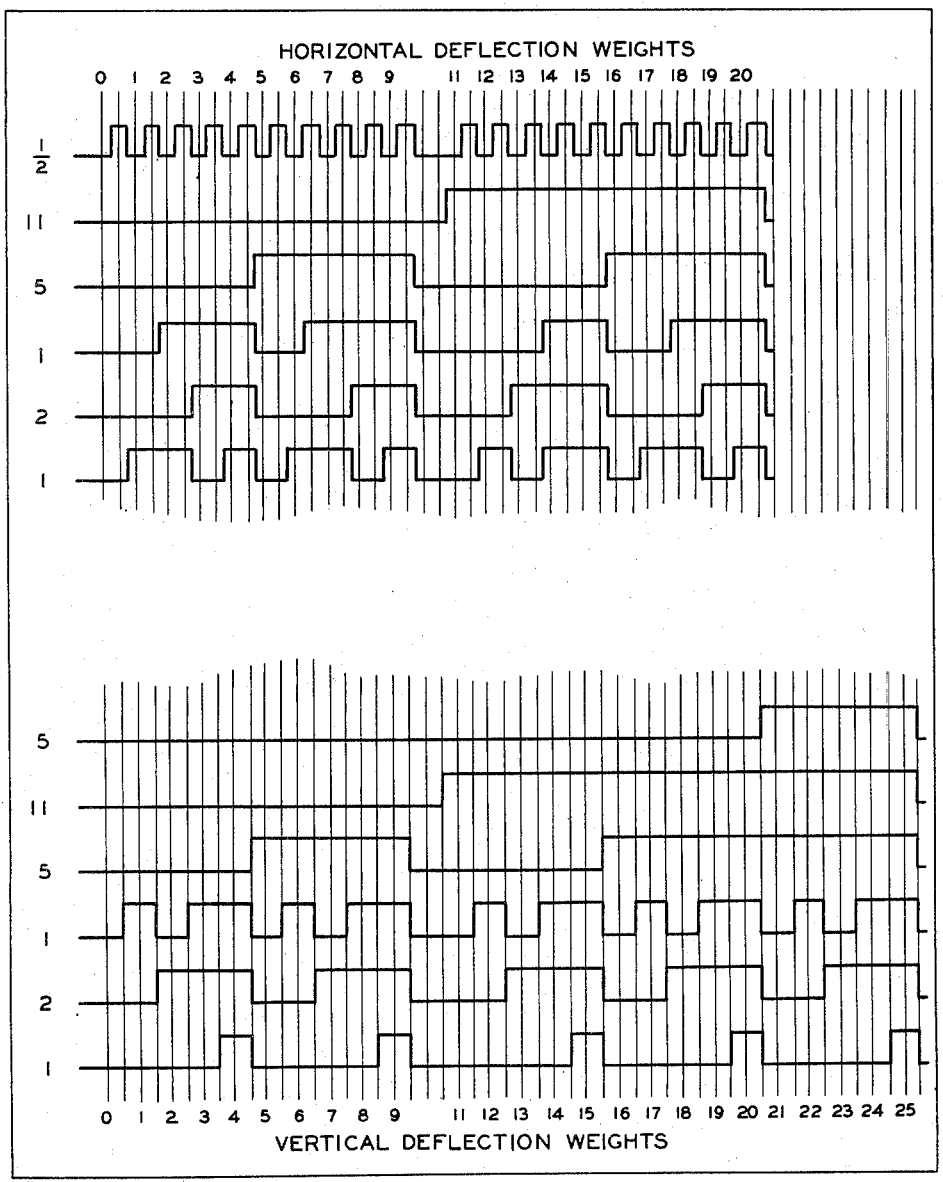
Figure 47:
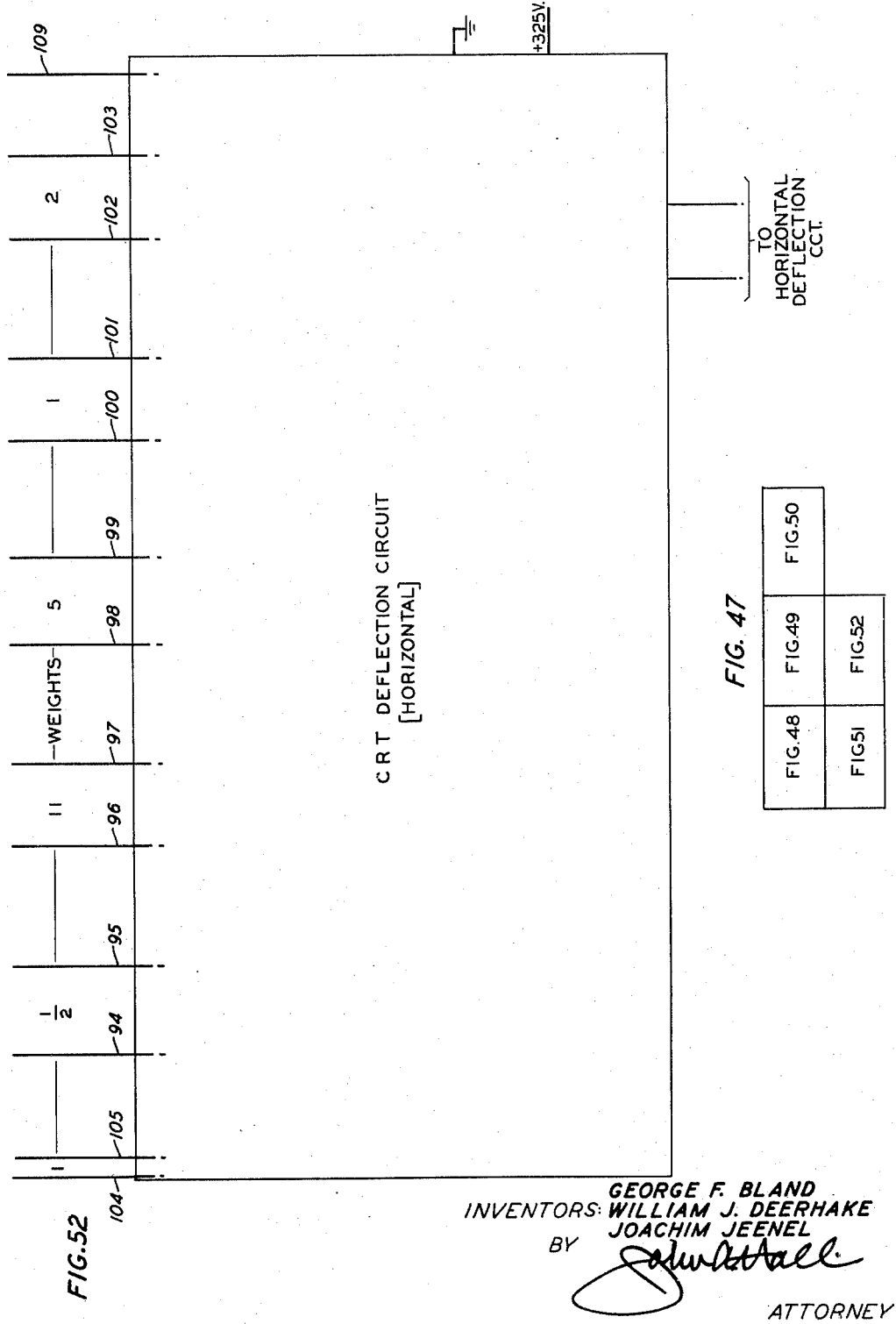
Figure 49:
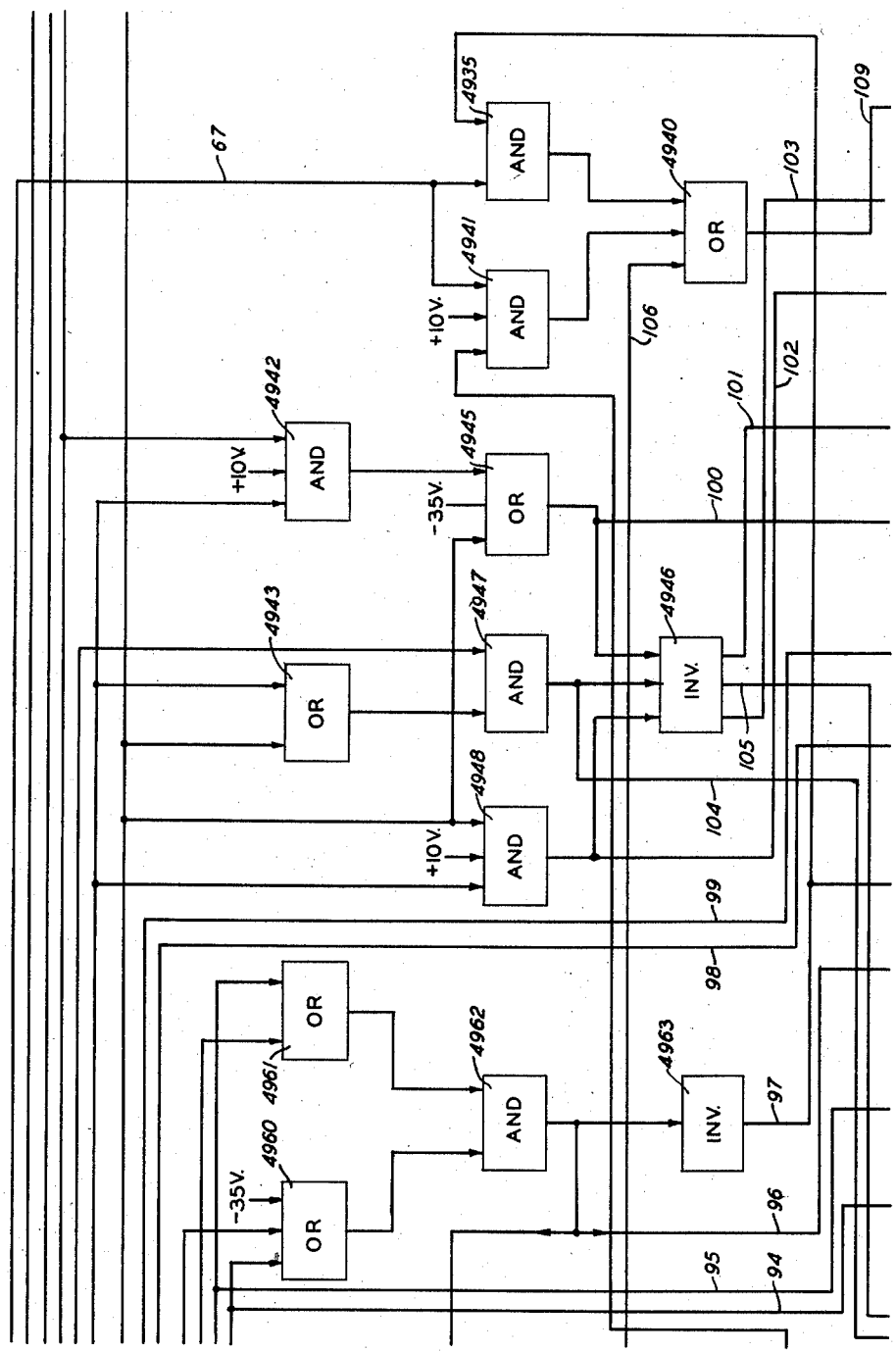
Figure 50:
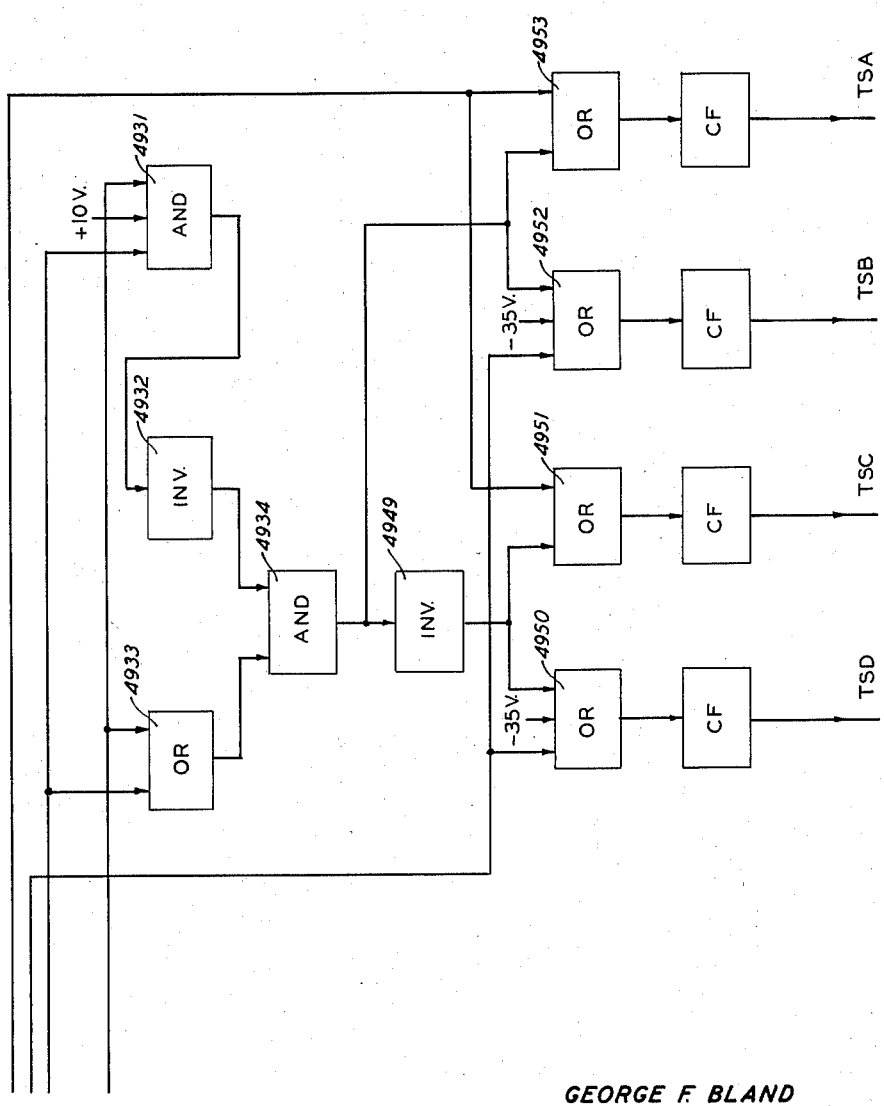
Figure 62:
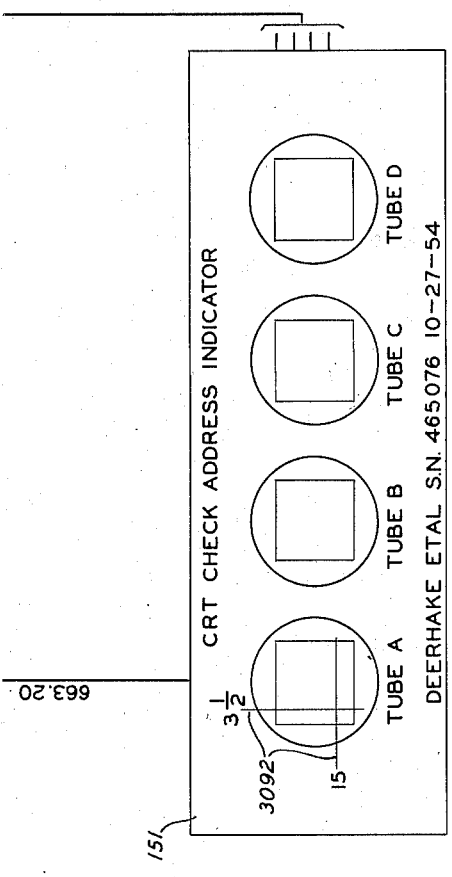
Figure 53:
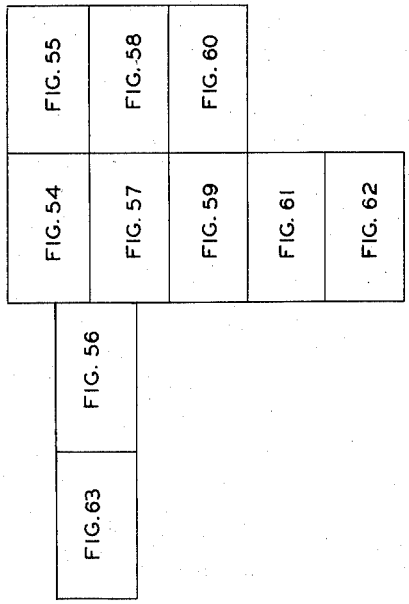
Figure 67:
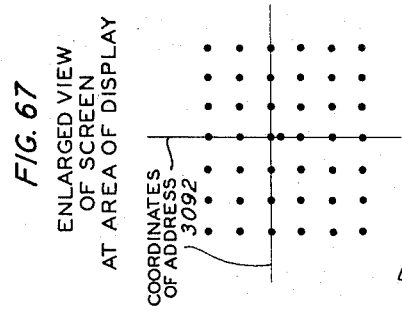
Figure 55:
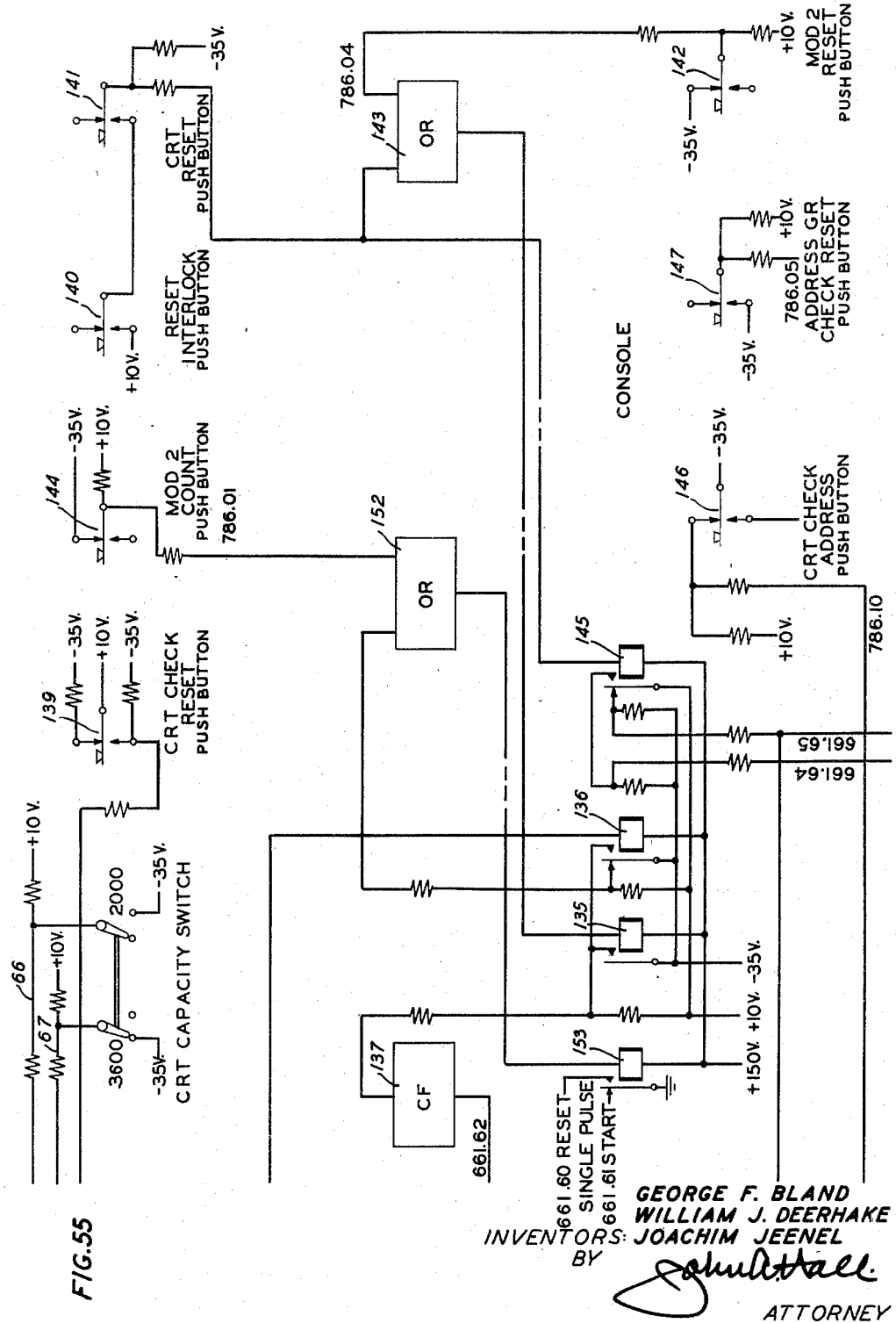
Figure 56:
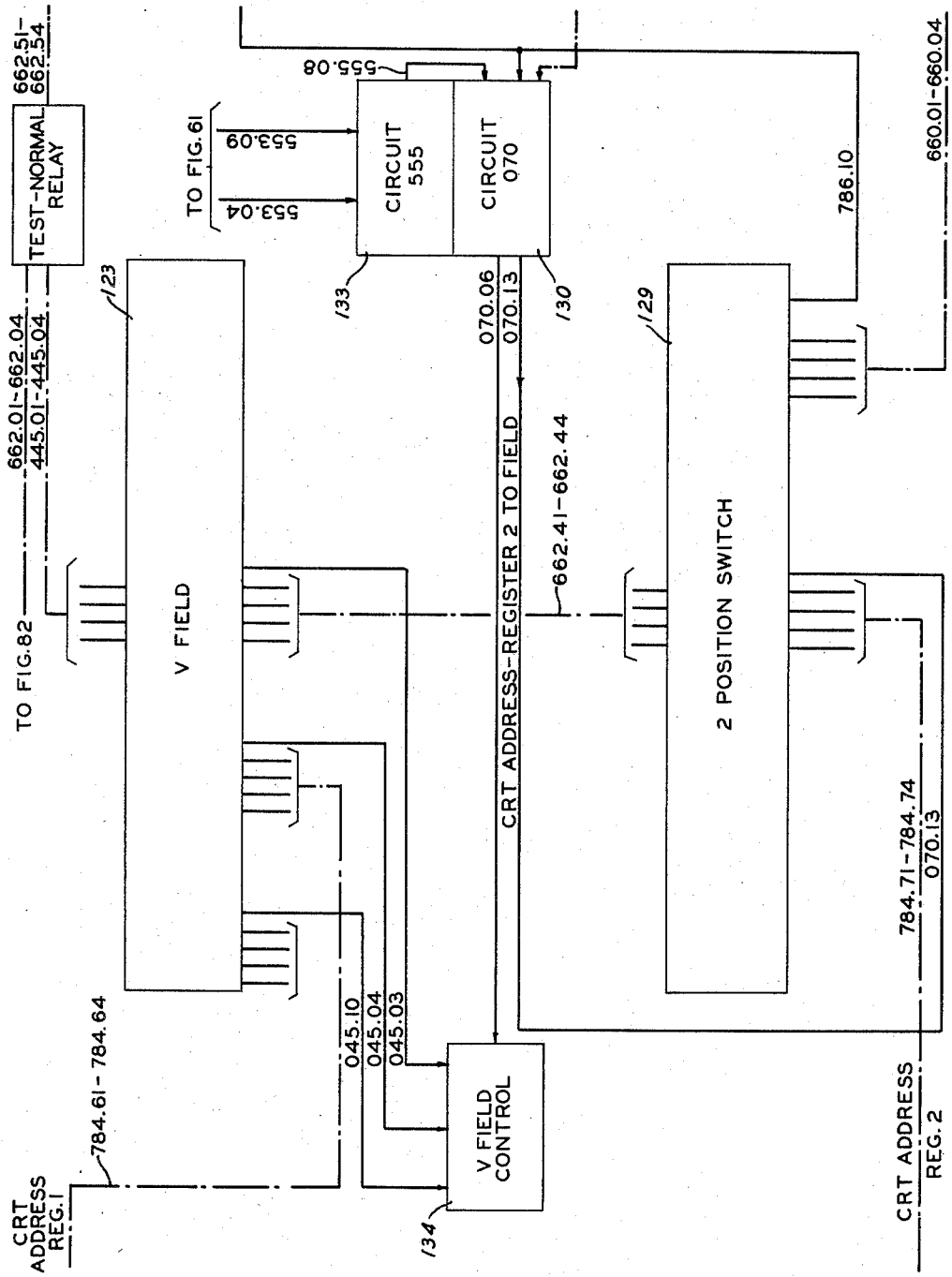
Figure 57:
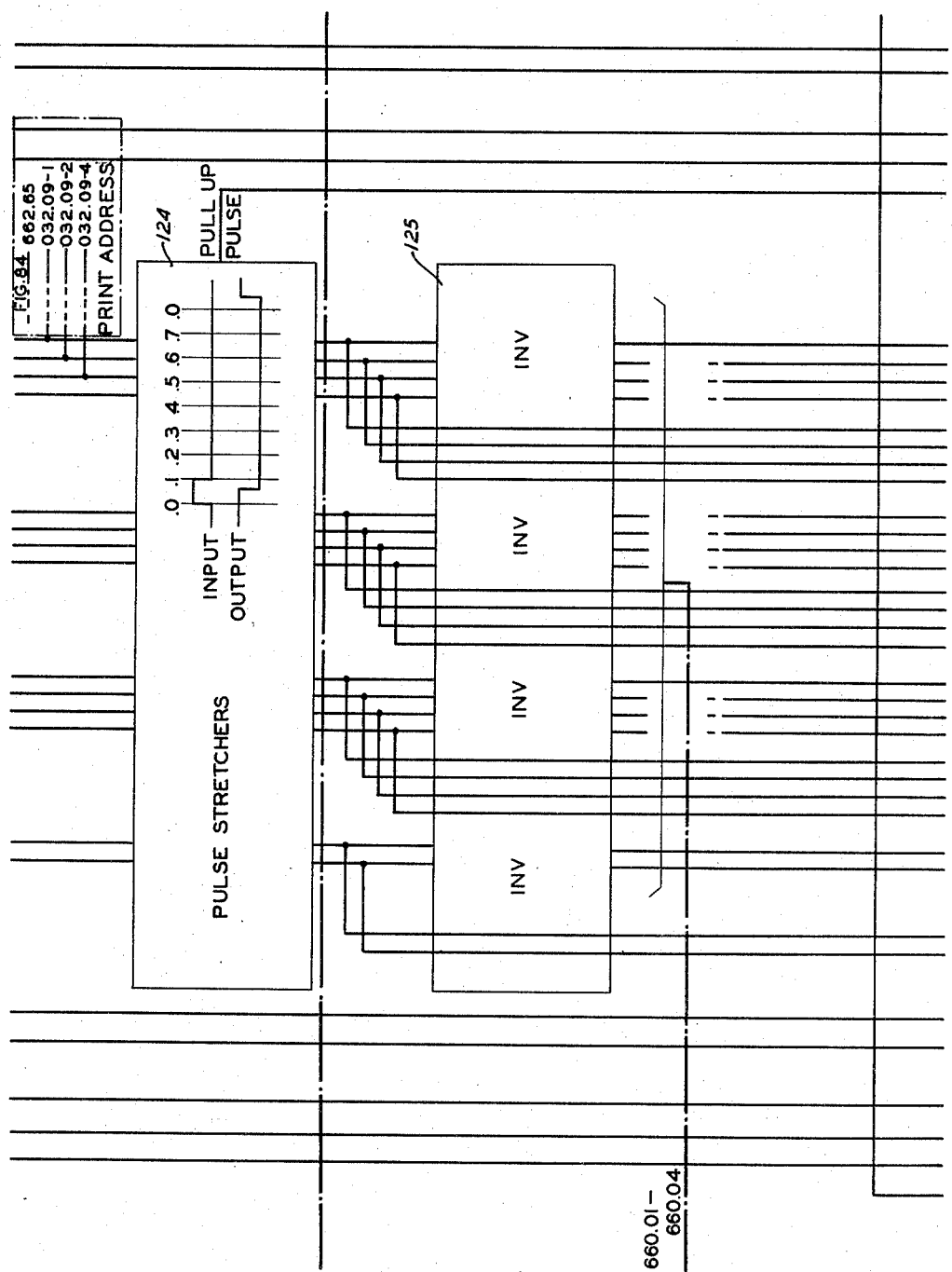
Figure 58:
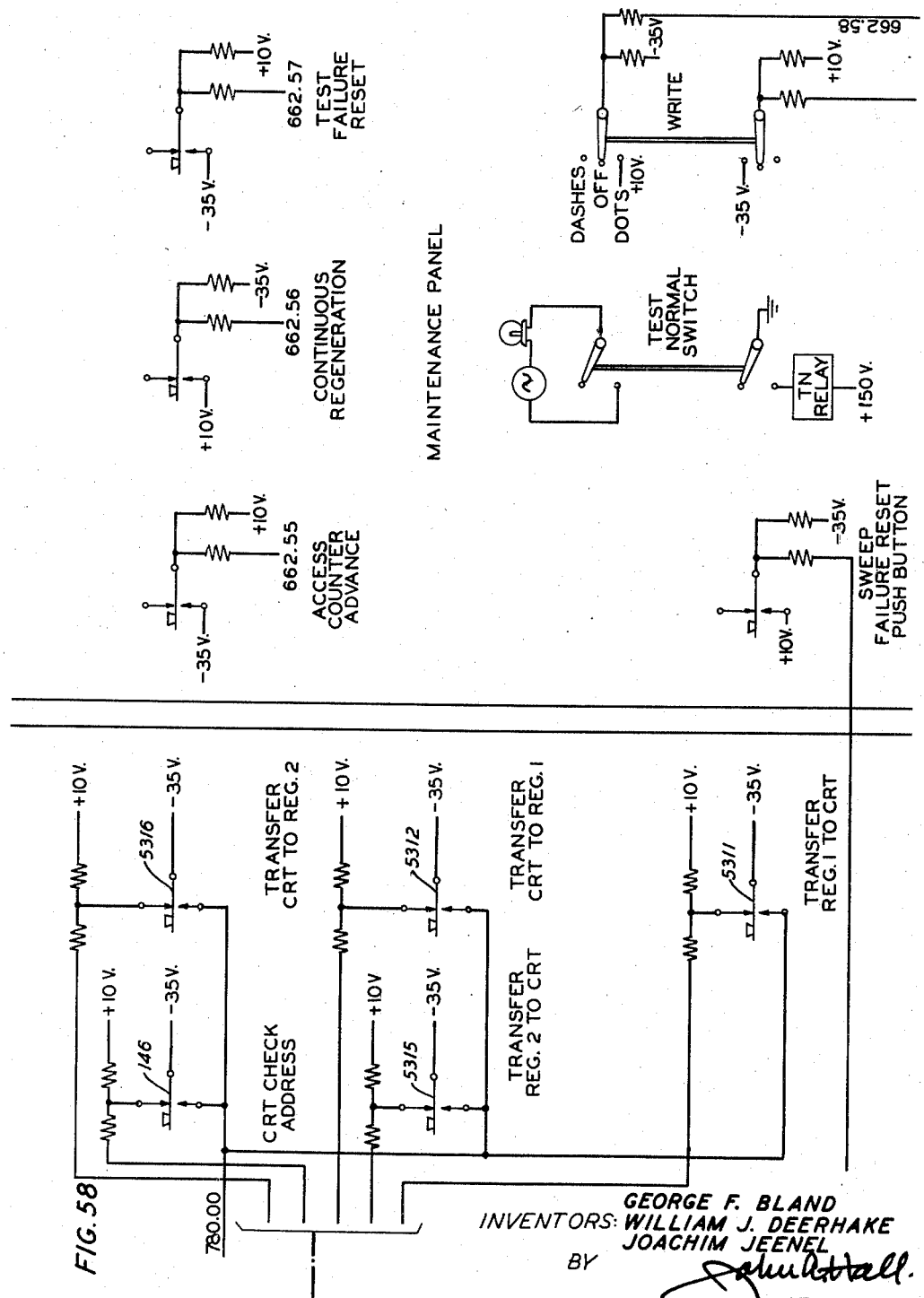
Figure 63:
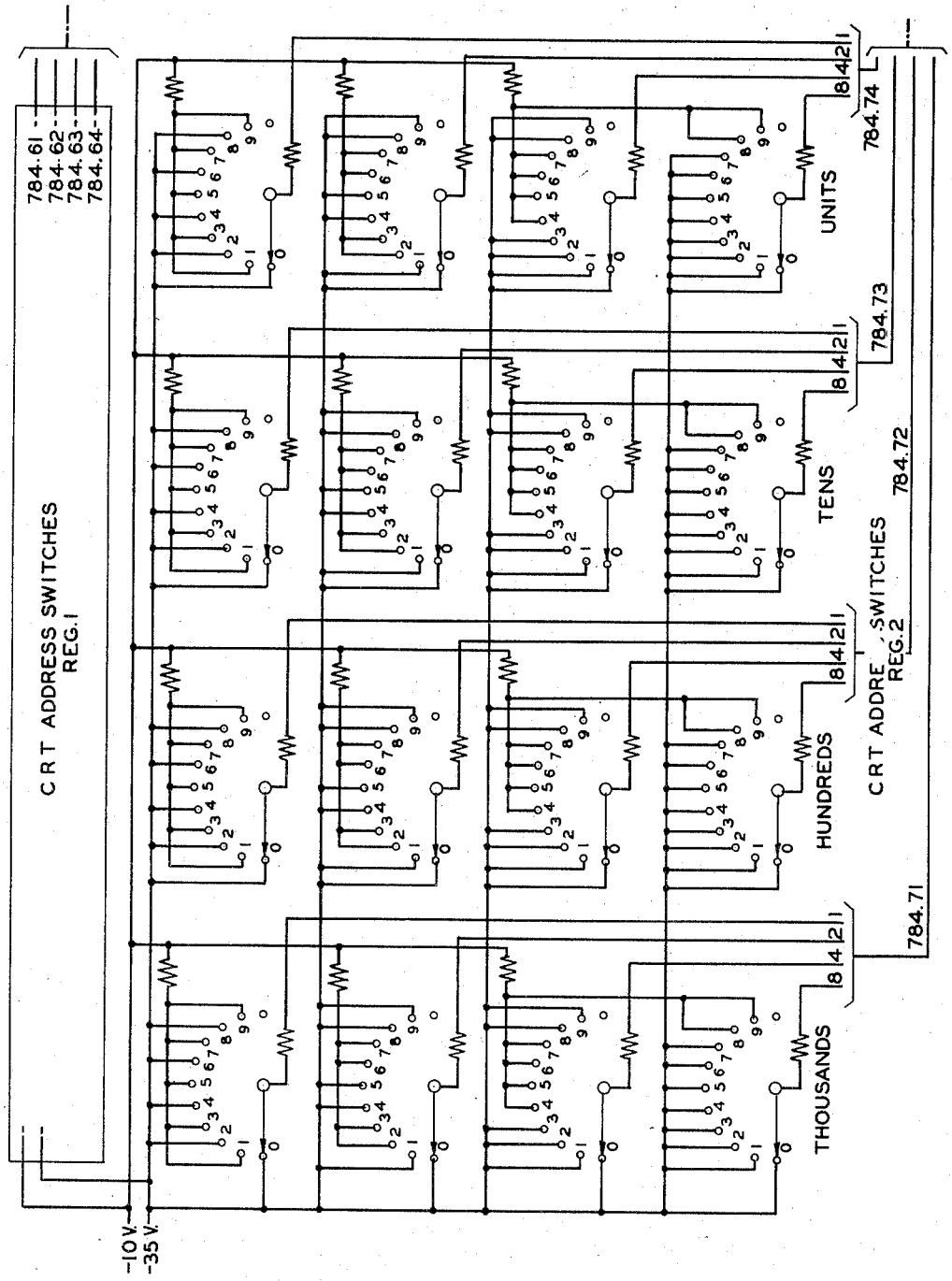
Figure 64:
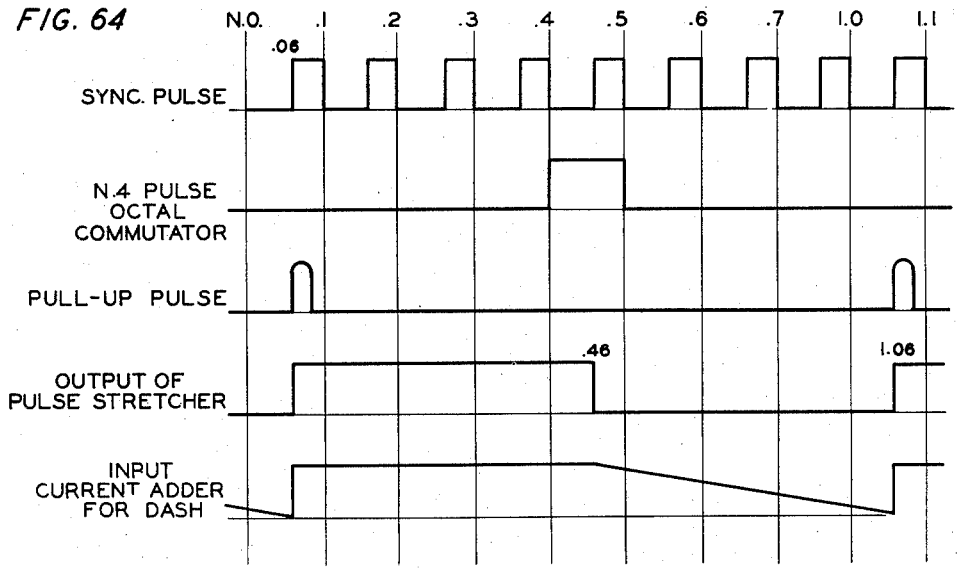
Figure 65:
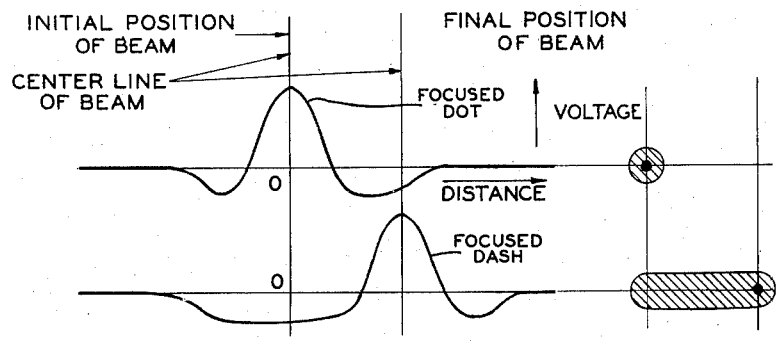
Figure 66:
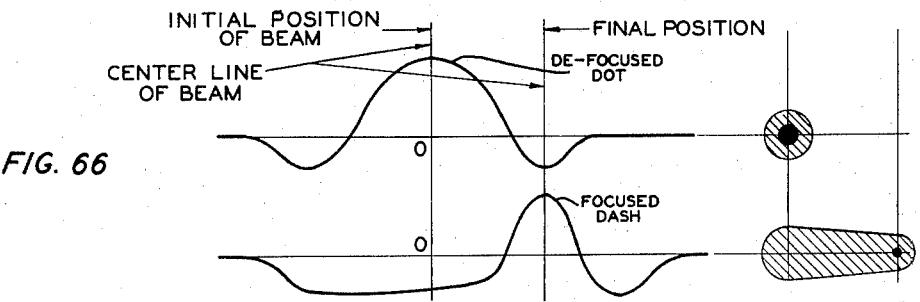
Figure 70:
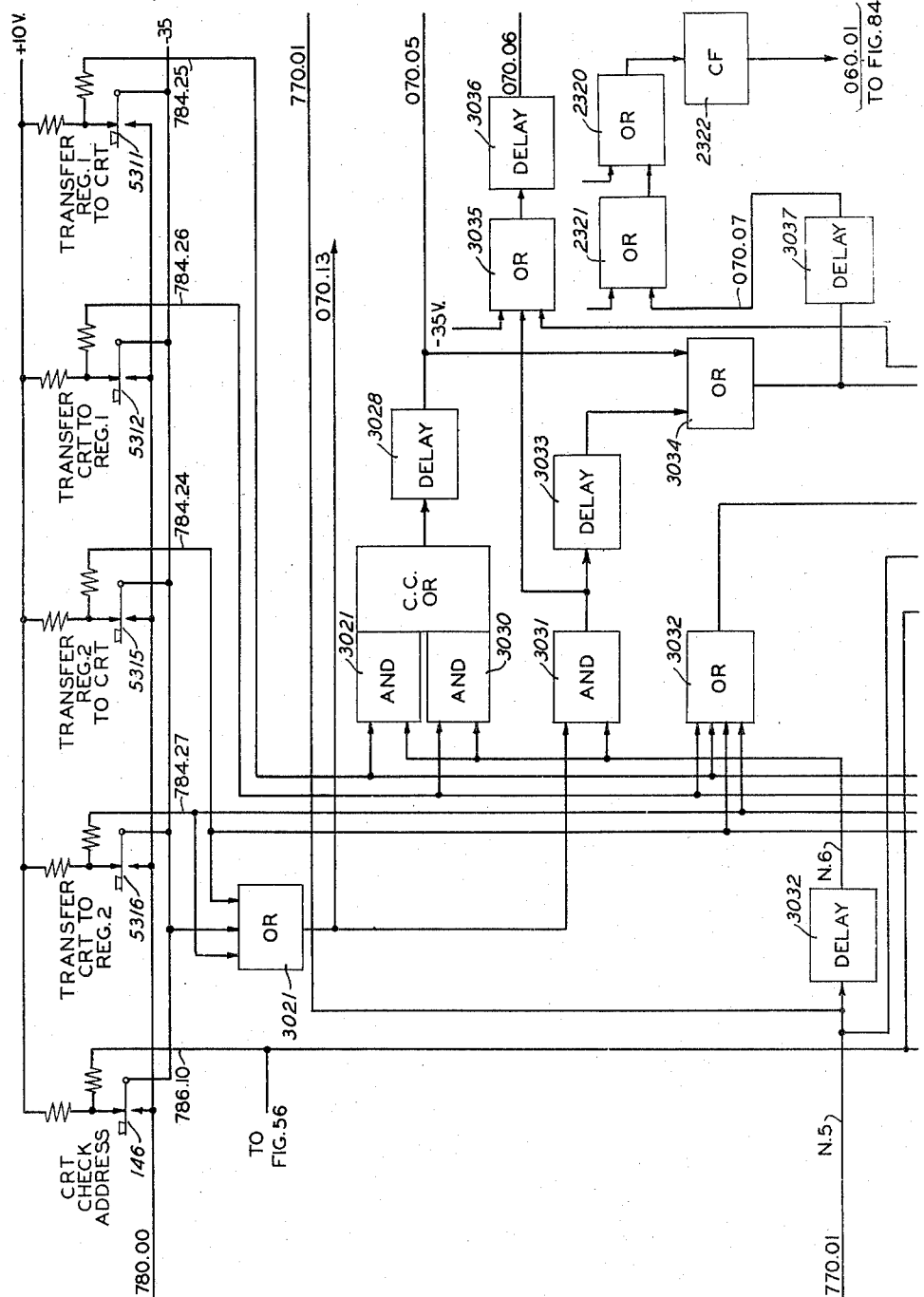
Figure 71:
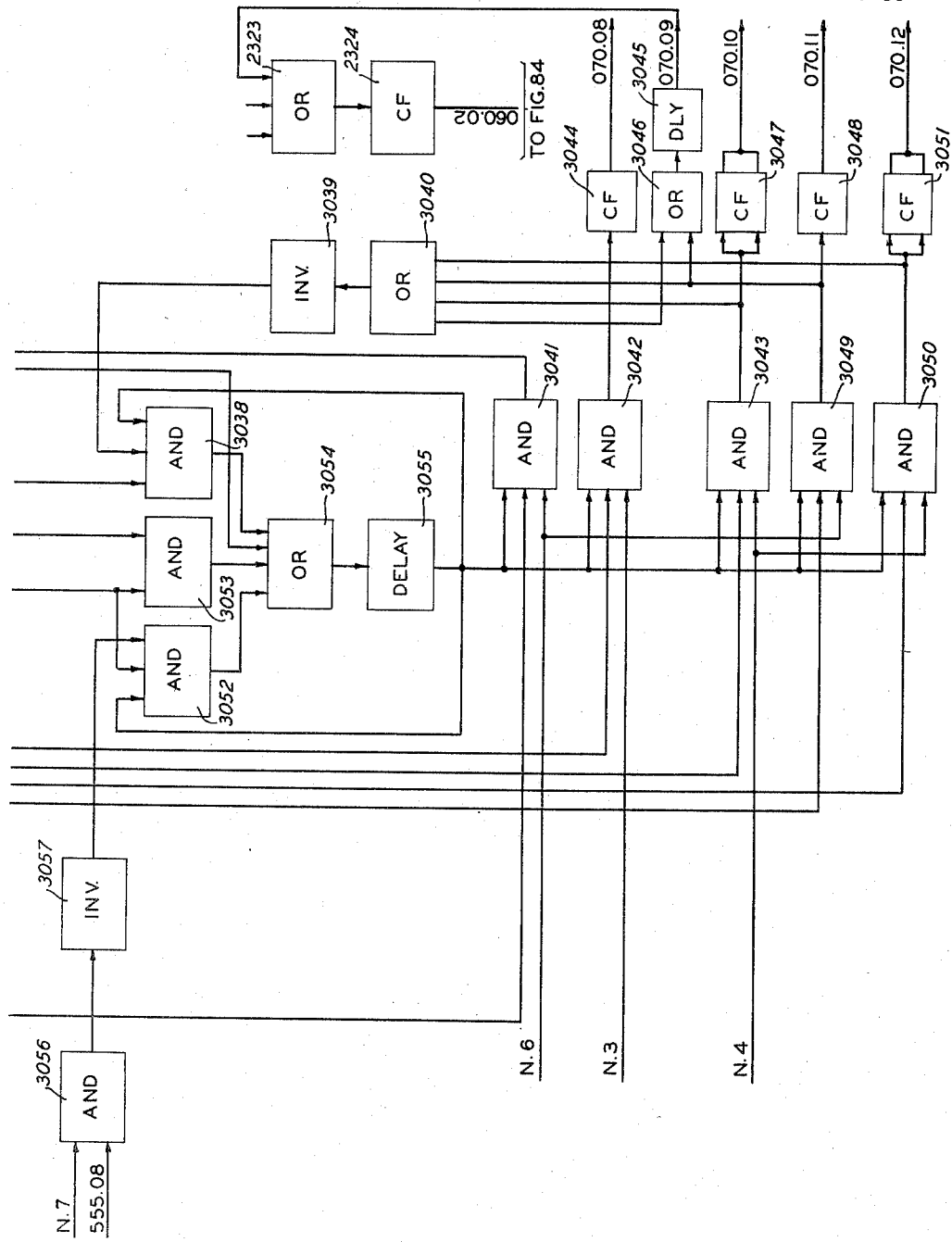
Figure 73:
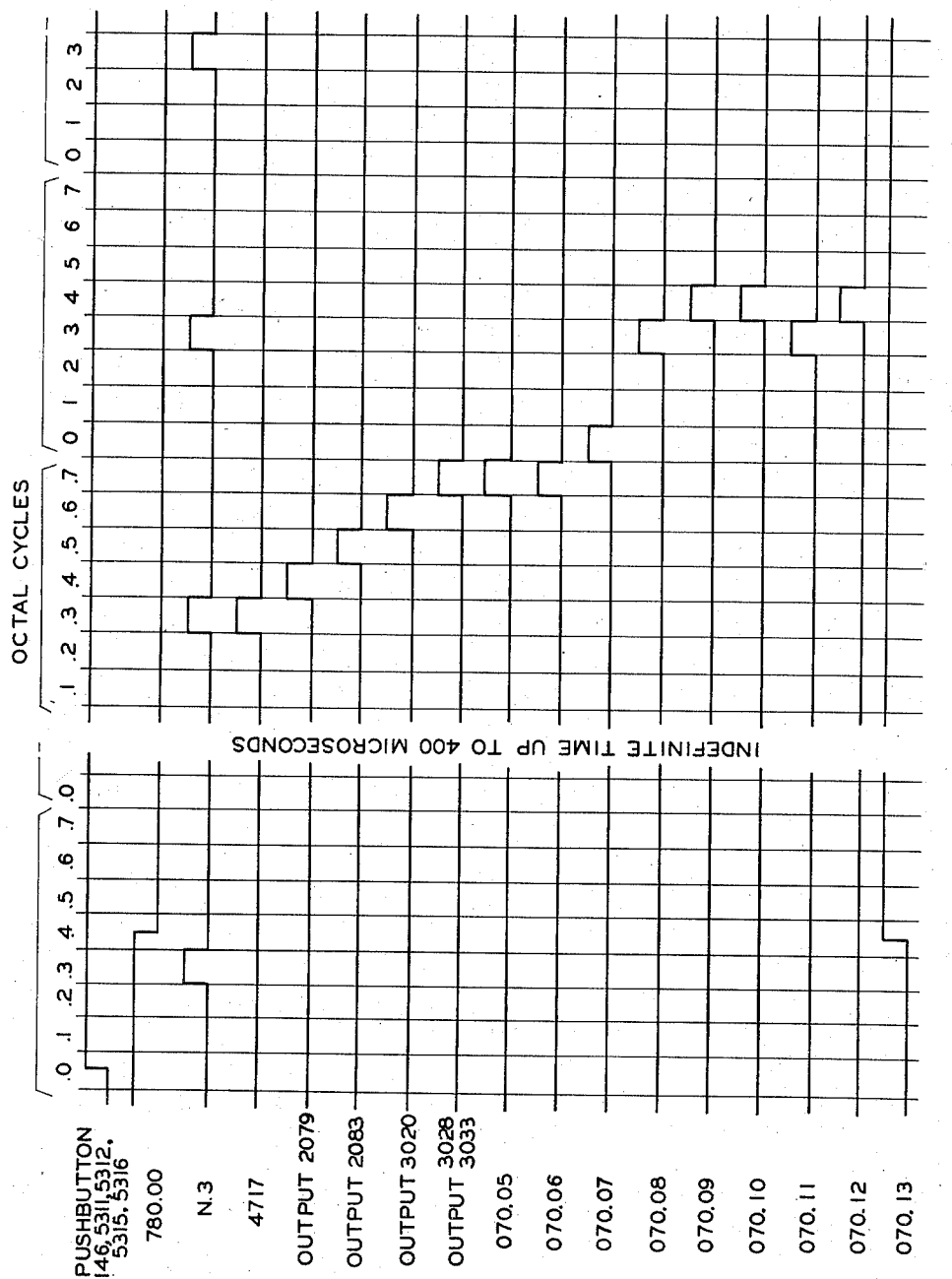
Figure 75:
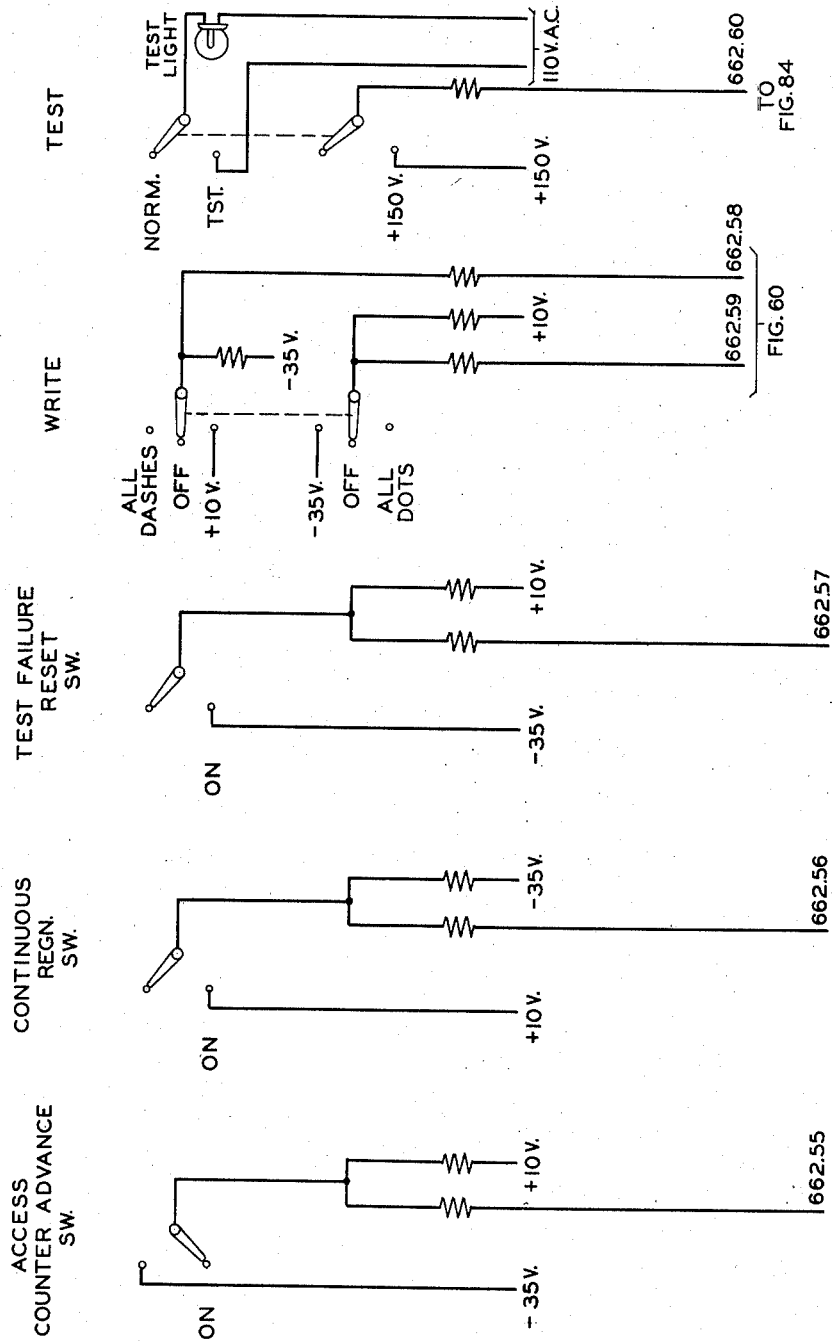
Figure 76:
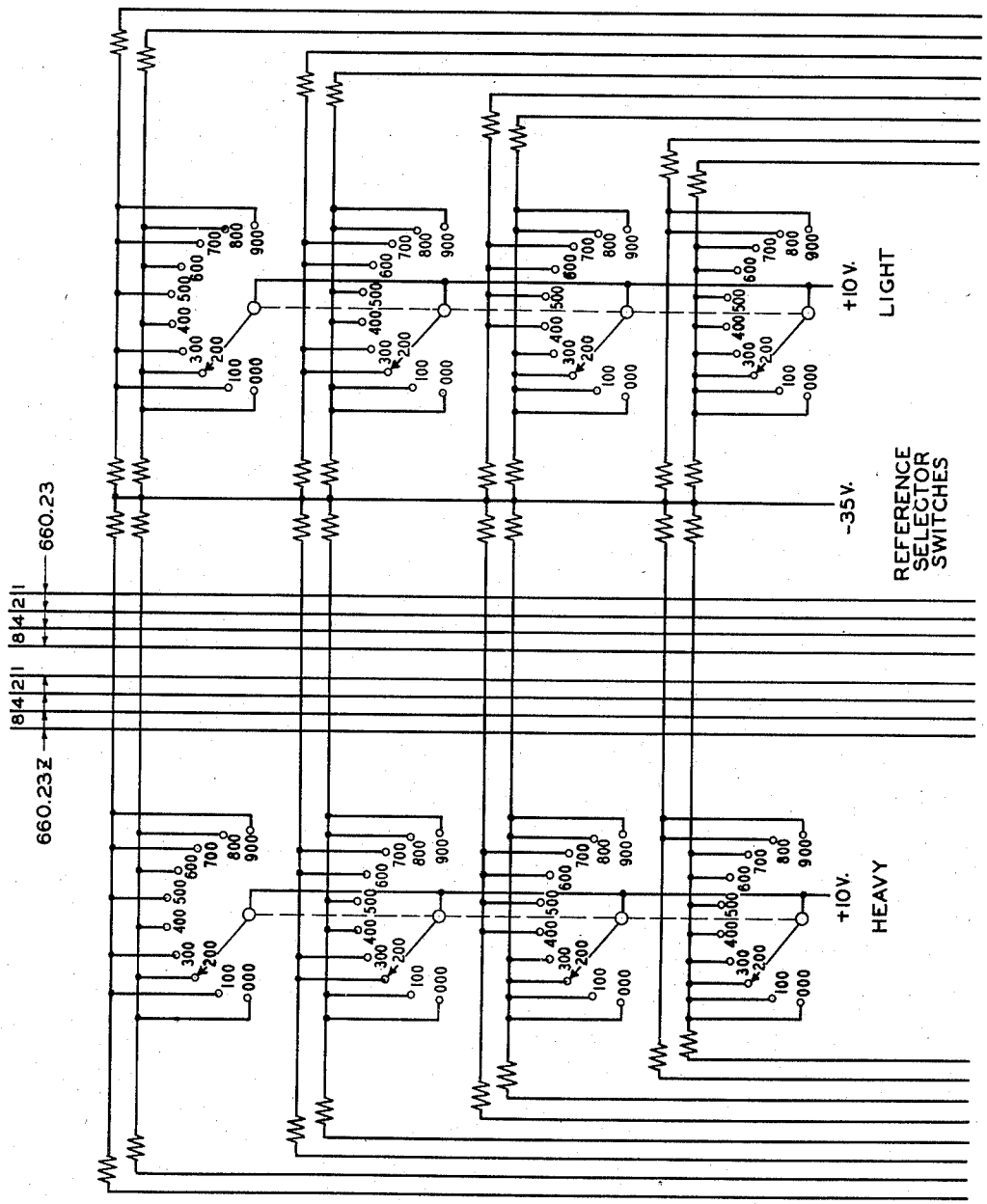
Figure 77:
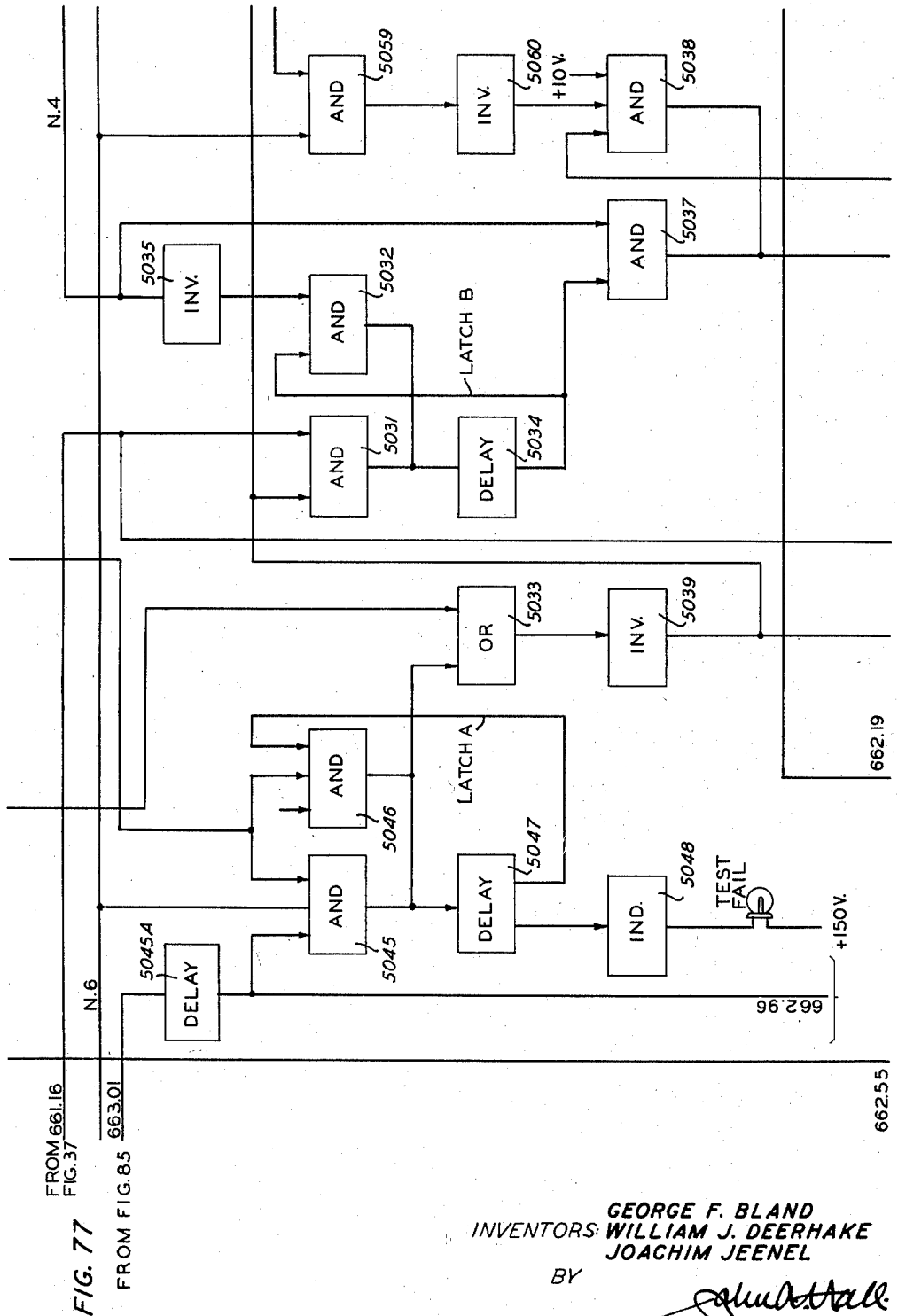
Figure 78:
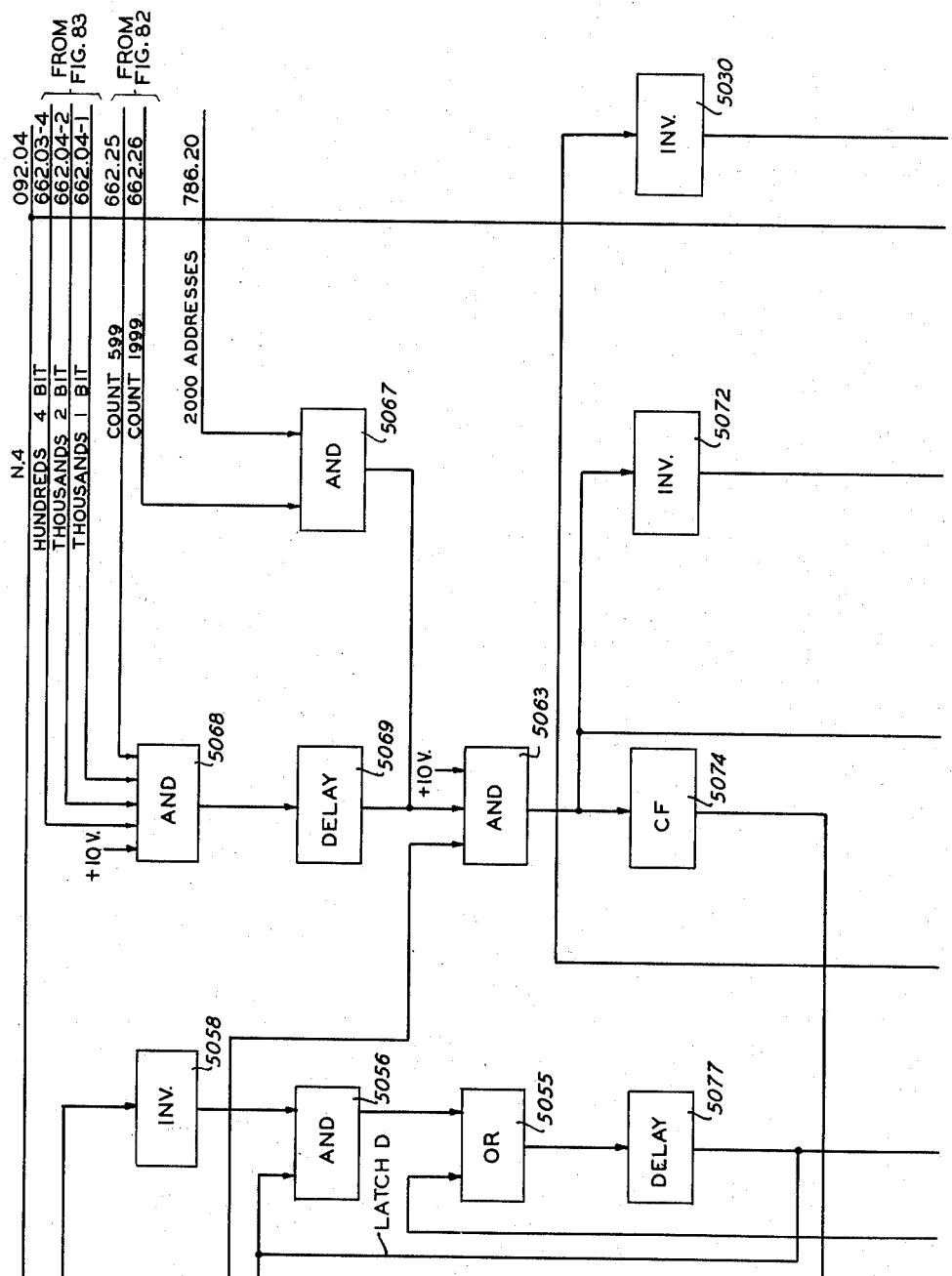
Figure 80:
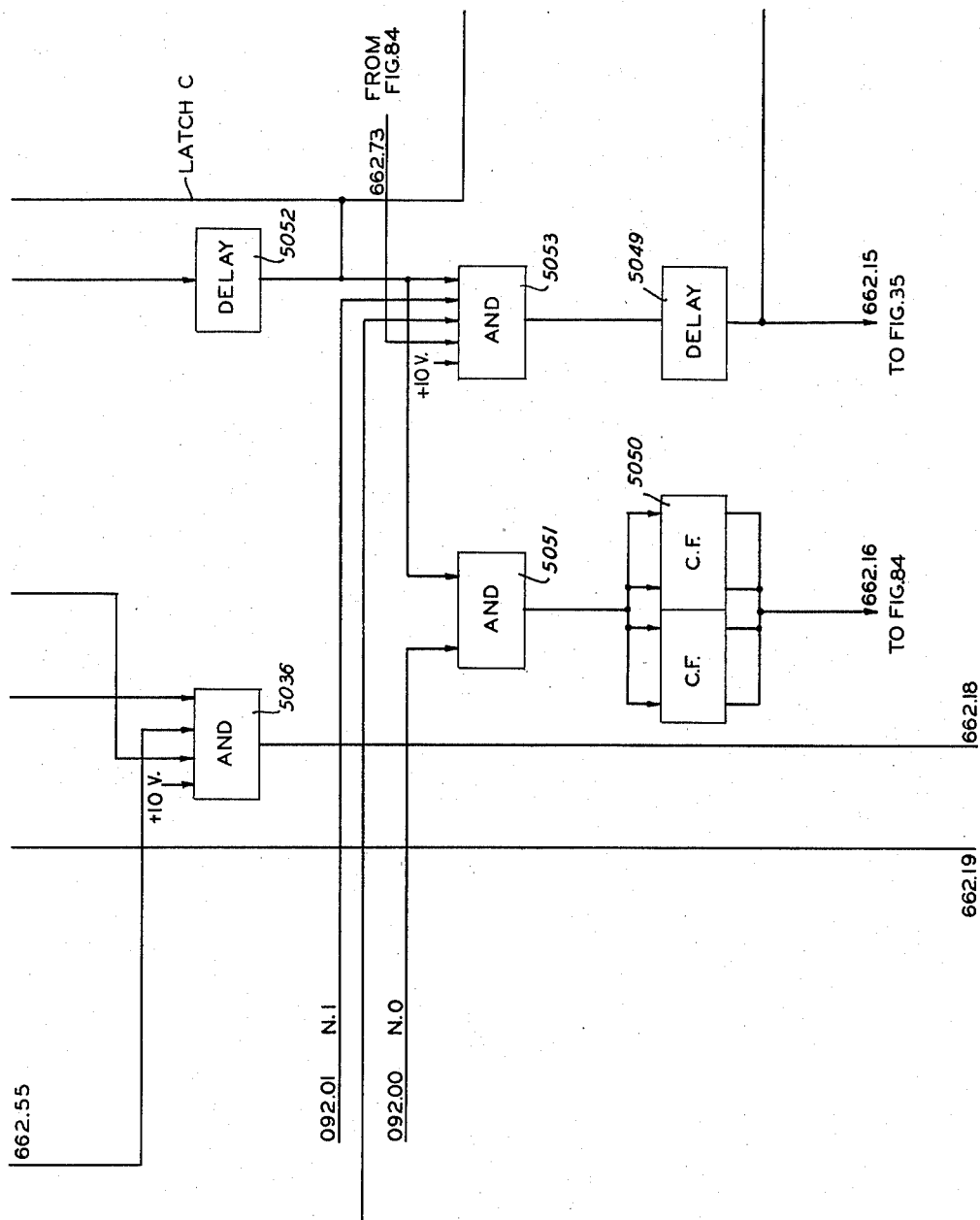
Figure 82:
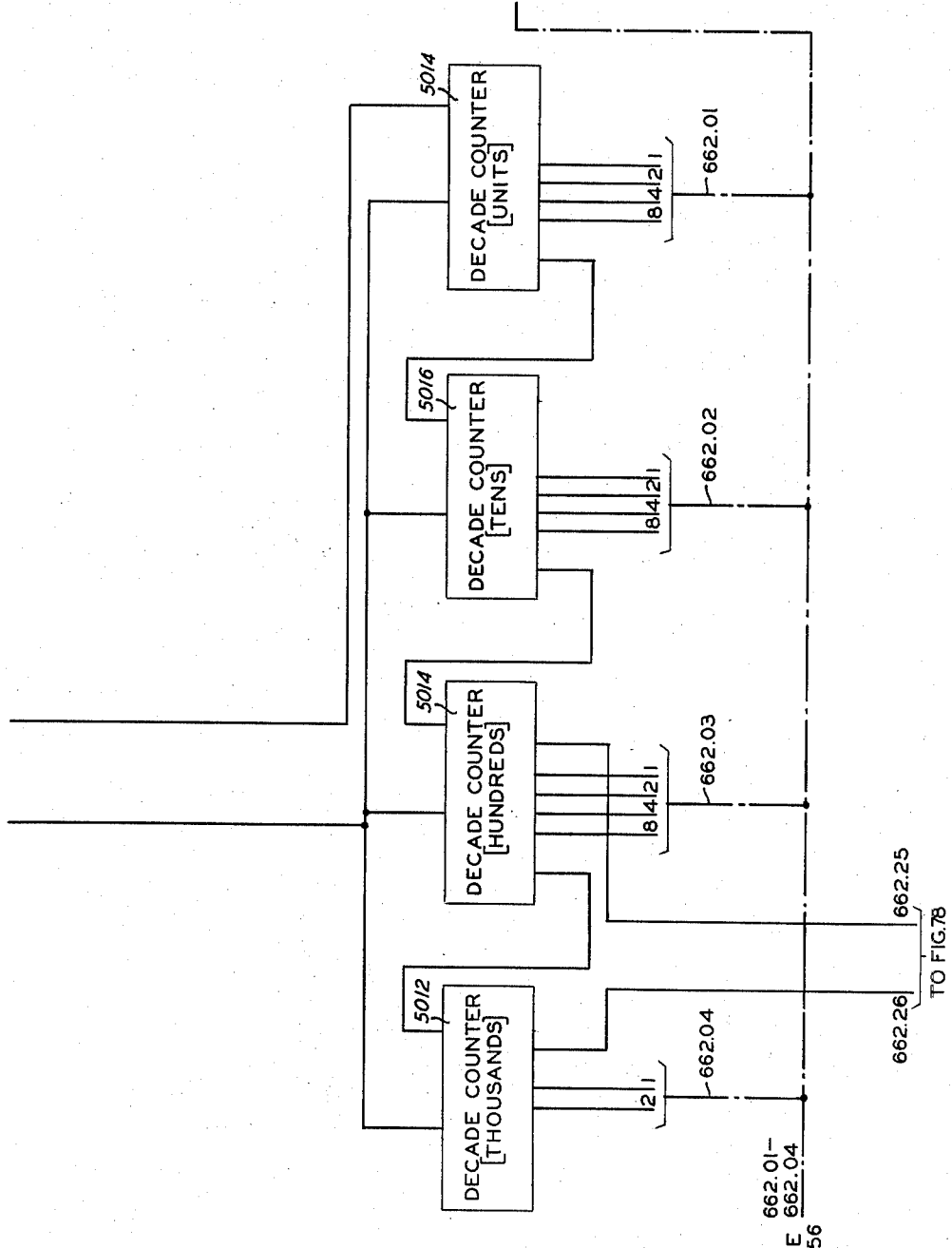
Figure 83:
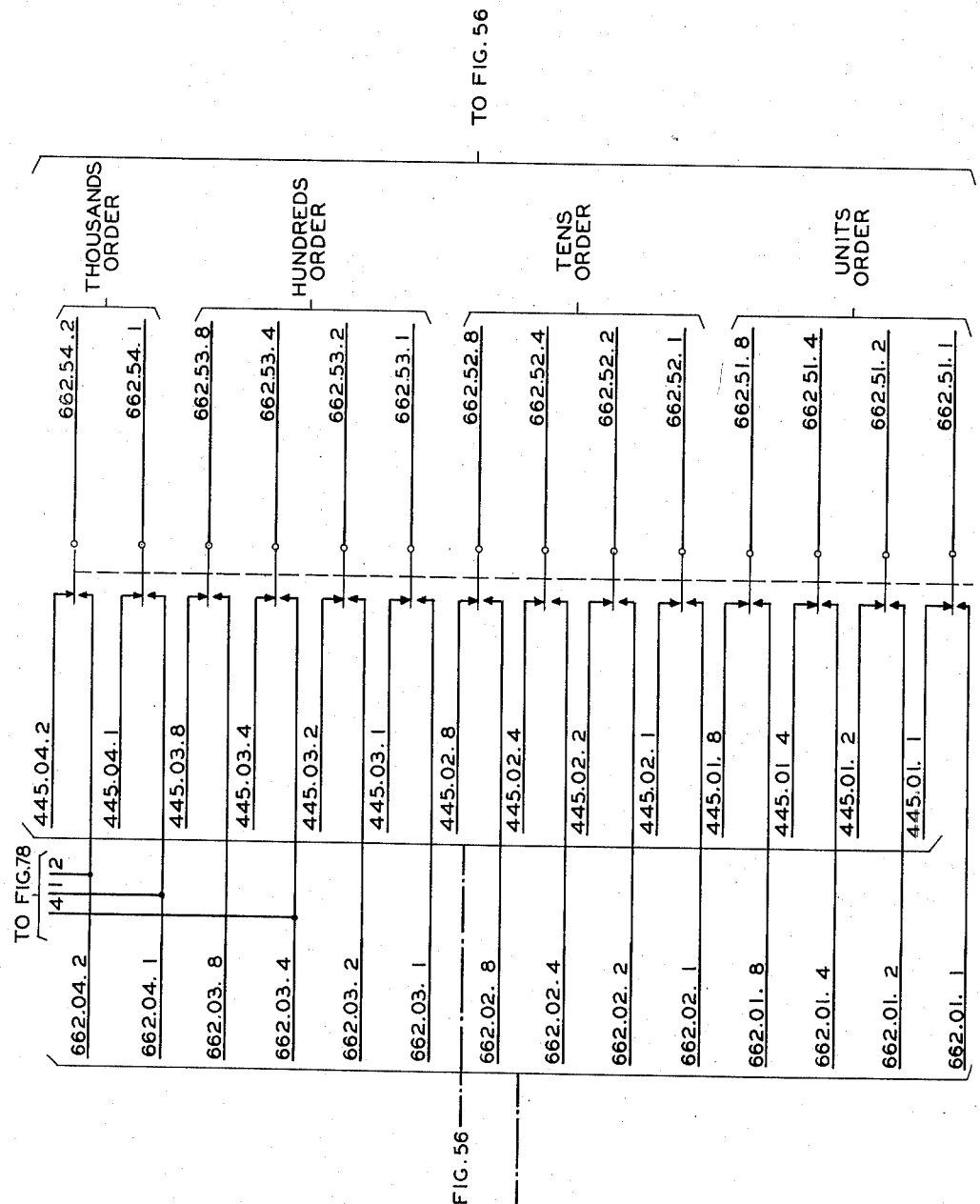
Figure 84:
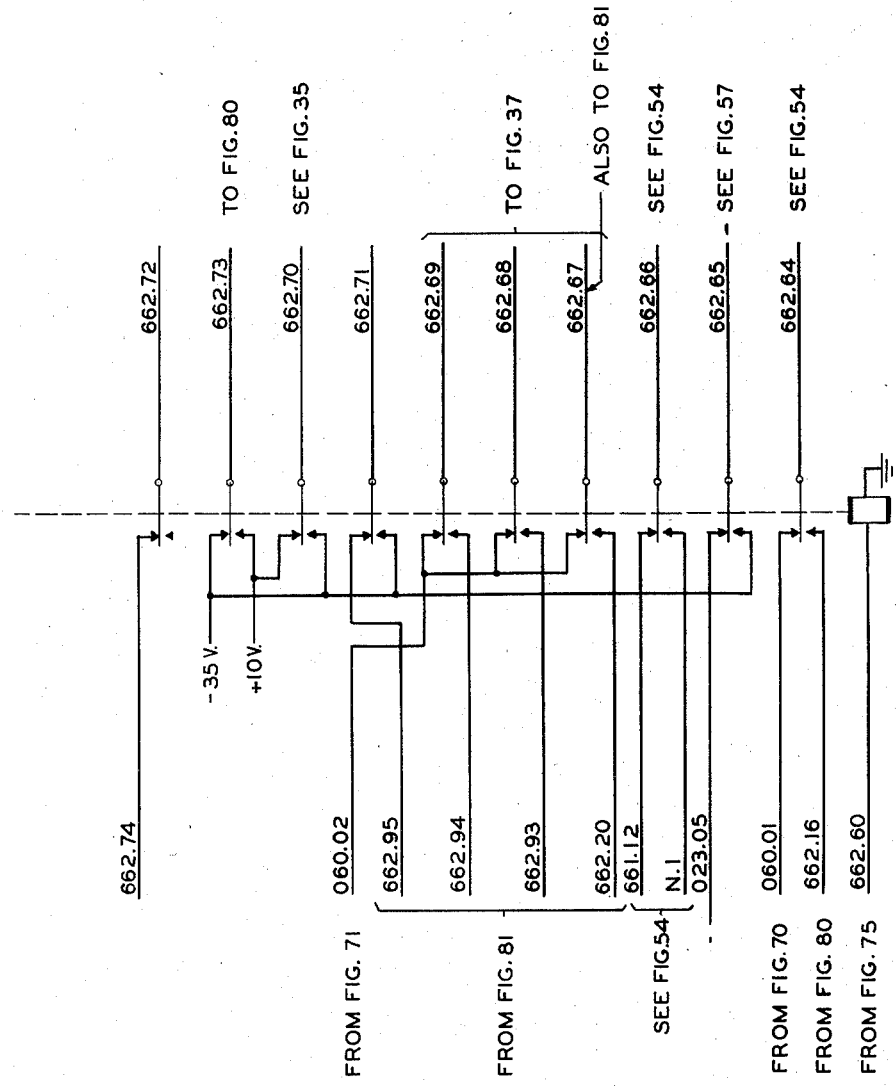
Figure 85:
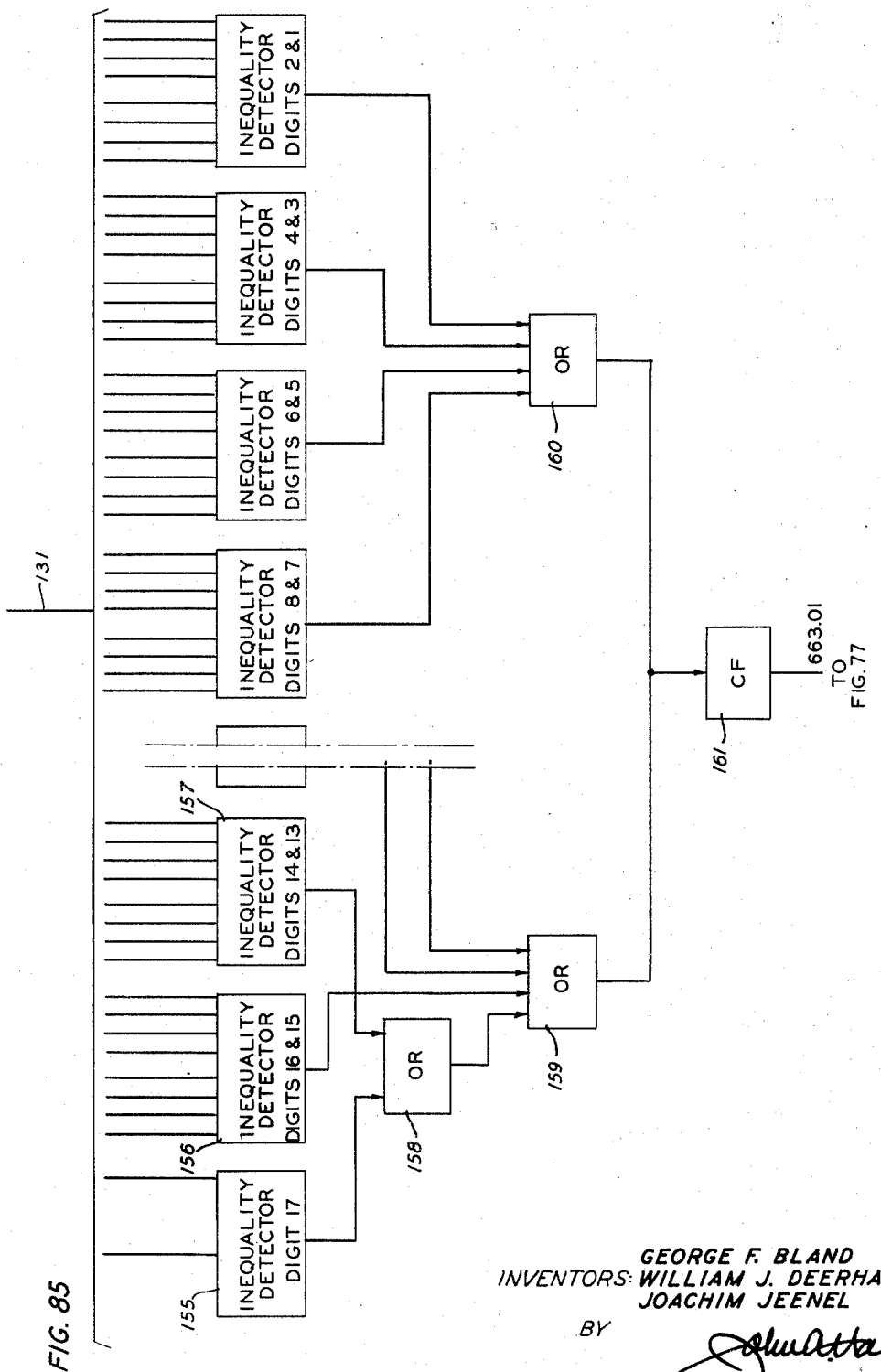
Figure 88:
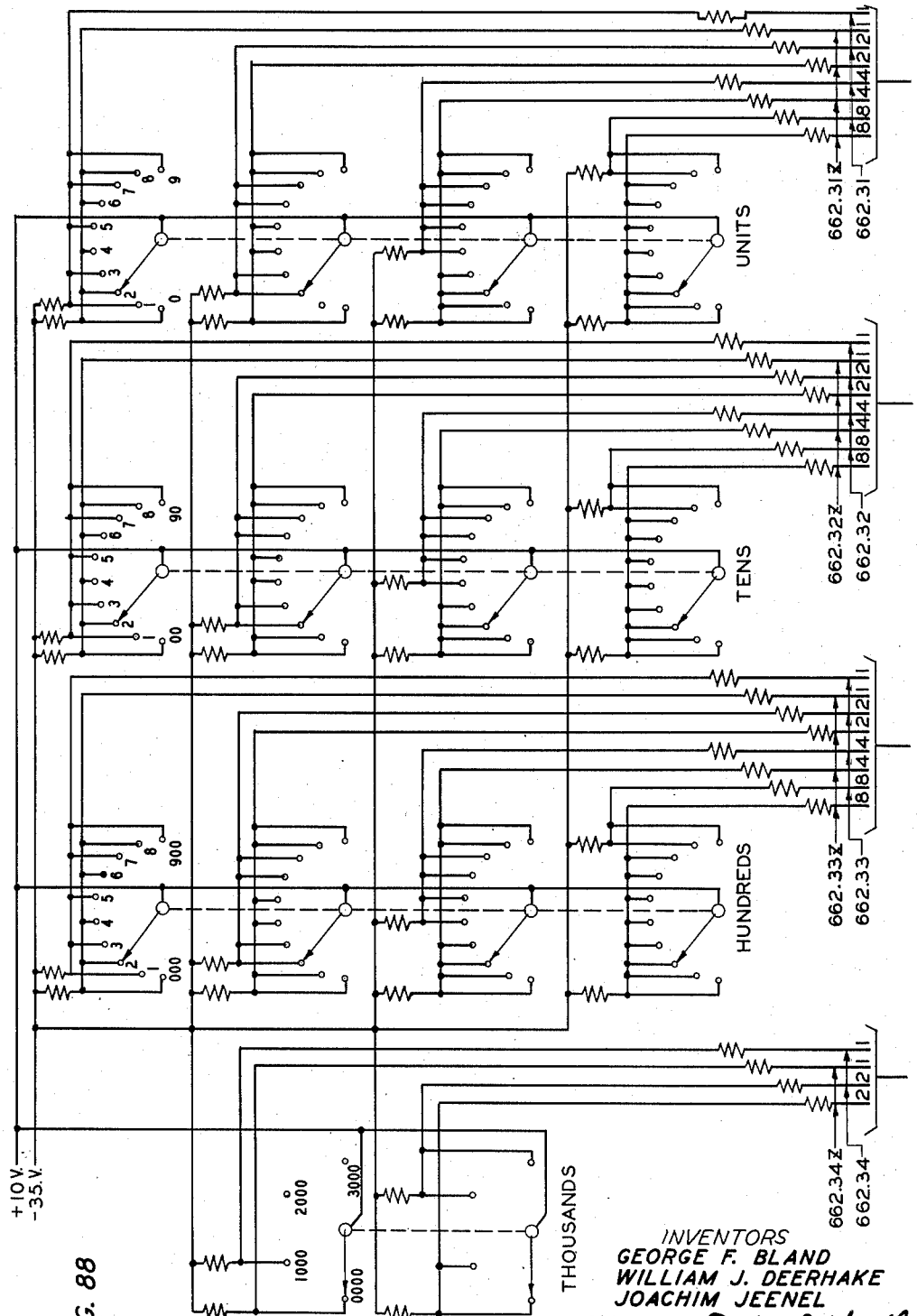
Figure 89:
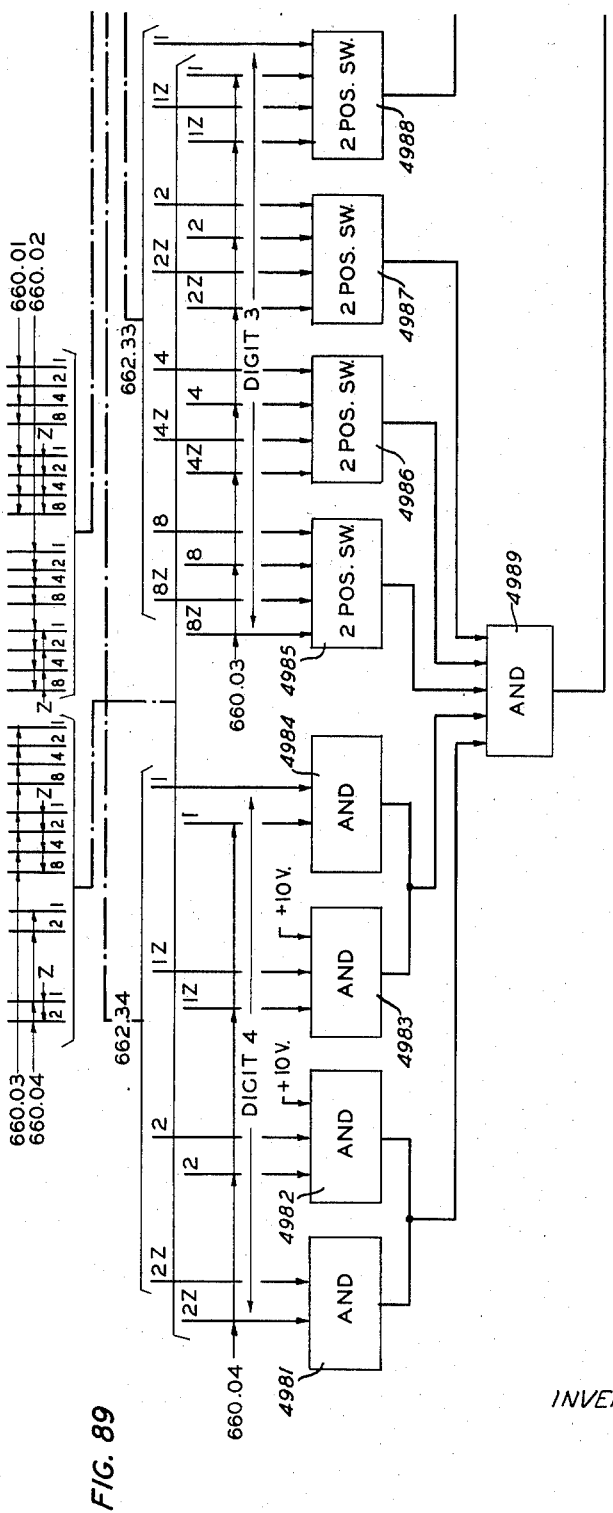
Figure 90:
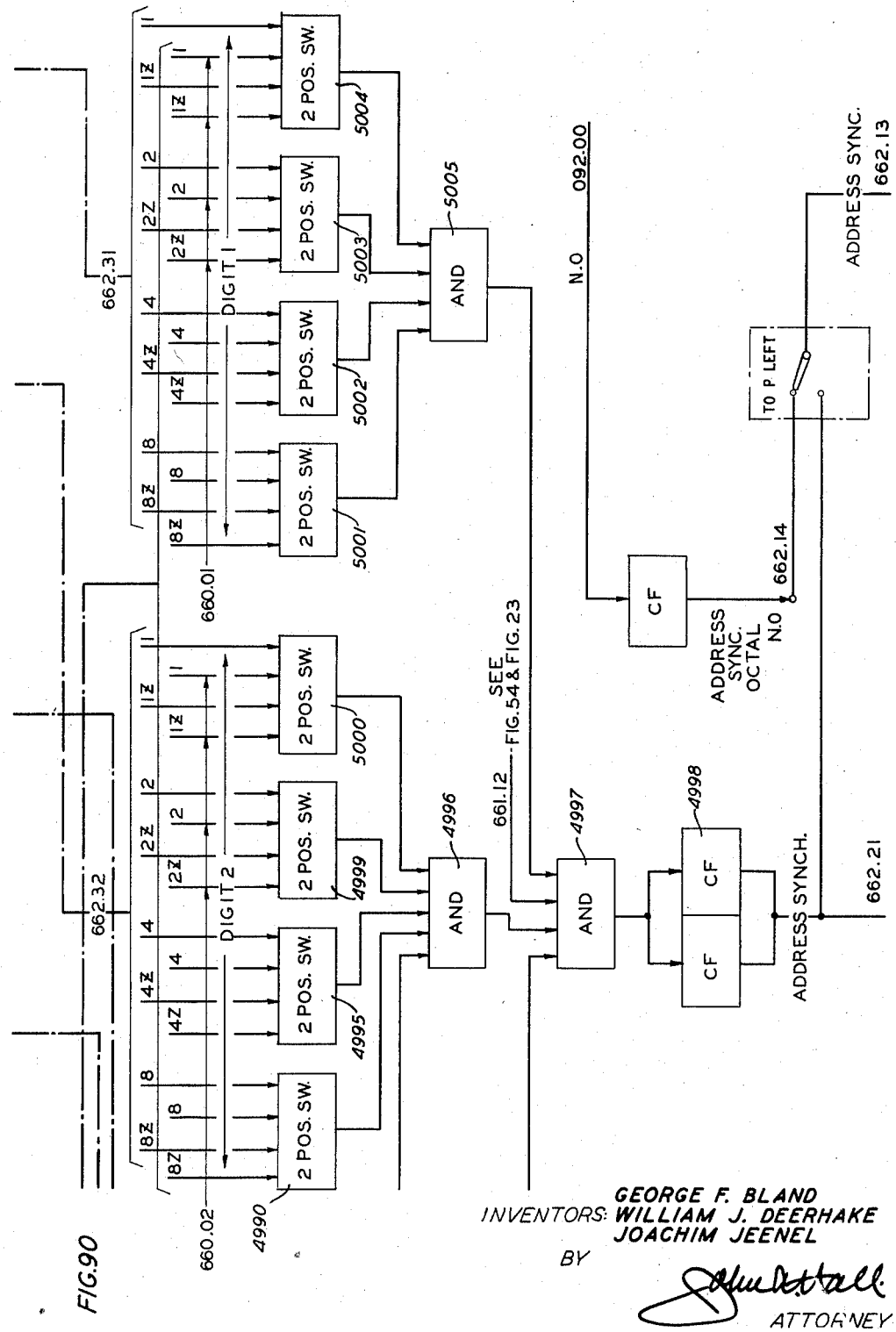
Figure 91:
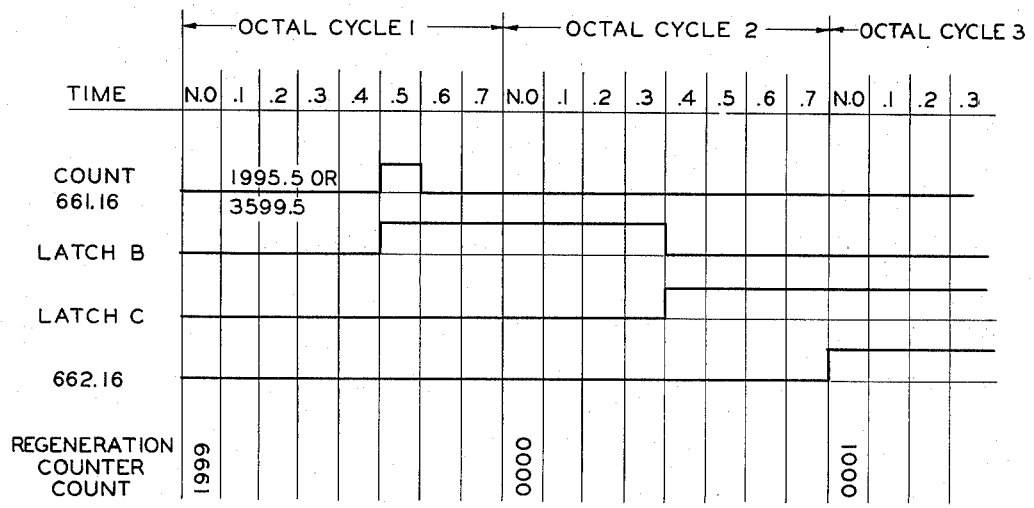
Figure 92:
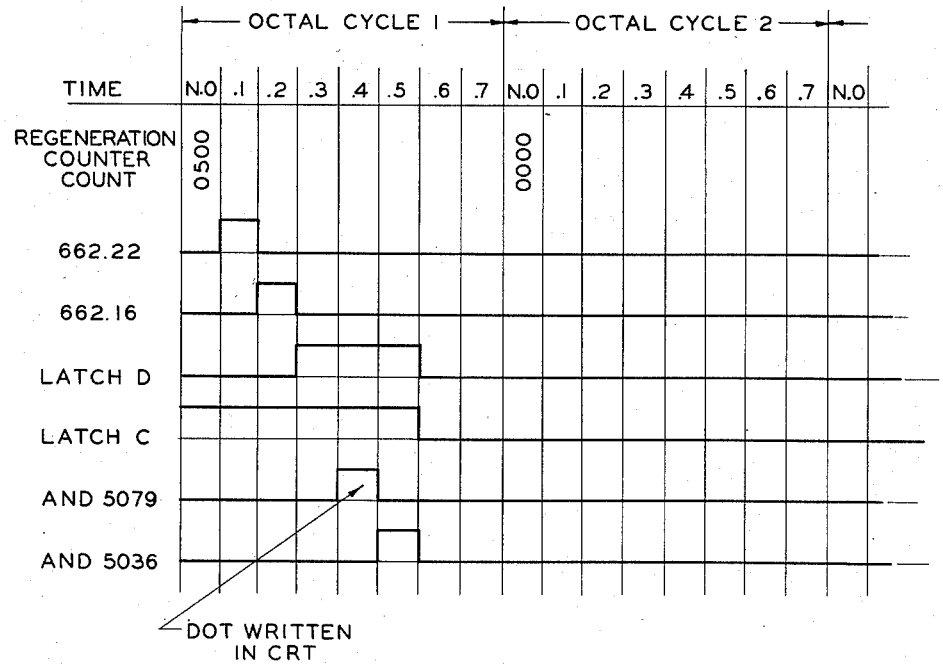

Fig. 25. is a similar chart showing the circuit movements under a regular succession of incoming pulses which has been interrupted after the count of three has been reached and showing how the said reached count of three may be repeatedly shown on the output code leads thereafter indefinitely;

Fig. 26 is a similar chart showing how, at an indefinite time after the count of incoming pulses has been so interrupted after the count of three, such regular succession is restarted and the counts 4, 5, 6 and 7 are made;

Fig. 27 is a similar chart showing a continuation of the circuit movements through the counts of 8 and 9 and the production of a carry pulse to the next higher order (tens) counter with a clearing of the units counter whereby a new count beginning with the units digit 1 may be started in response to the next (eleventh) incoming pulse;

Fig. 28 is a similar chart showing the circuit movements within the tens digit counter responsive to the receipt of the carry pulse from the units digit counter on the attainment therein of the count of 10, and illustrating the circuit movements therein for the following periods while the units digit counter is again counting the units digits 1 through 9 to the second carry to the tens counter;

Fig. 29 is a similar chart showing the circuit movements first within the thousand's counter from time 1998.0 up to the time this counter produces a signal on its A terminal at time 1999.5 which clears all four counter orders and thereafter the start of a new count which is manifested only in the unit's counter;

Fig. 30 is a chart similar to that of Fig. 29 but showing the clearing operation at time 3599.5 and the start of a new cycle in the unit's counter;

Fig. 31 is a similar chart for the hundred's counter showing how the output of the Delay 1 on the A terminal at time 3599.4 which is normally passed through the binary adder to produce a sum output to operate the Delay 2, is used at this time (in combination with other pulses from the thousand's counter) to produce the clearing signal;

Fig. 32 is a similar chart showing circuit movement in the thousand's counter upon the reaching by the counters of the time 0399.5 at the end of the second count of the first four hundred spots in a 3600 spot cycle, at which time a pulse is transmitted to the D−1 terminal of the thousand's counter whereby while the unit's, ten's, and hundred's counters are being cleared and set at zero, the thousand's counter which has been at zero (no circuit movement) is now set at 2 so that the count which otherwise would have been 400 is now caused to be 2000;

Fig. 33 is a similar chart showing the circuit movement within the hundred's counter at the same time as the circuit movement within the thousand's counter shown in Fig. 32 is taking place;

Fig. 34 is a block diagram (on the same sheet with Fig. 36 showing how Figures 35, 36 and 37 may be placed to provide a logical circuit diagram of the means employed to produce a 2000 spot cycle or alternatively a 3600 spot cycle;

Figs. 35, 36 and 37 taken together as placed in Fig. 34 constitute a logical circuit diagram showing the CRT capacity switch and the circuits effective in one position thereof for causing the regeneration counter to count over a continuous succession of counts 0 to 1999 inclusive whereby the beams of the cathode ray tubes will traverse a raster covering the spots 0 to 1999 and which switch in another position thereof will cause the regeneration counter to count over counts 0 to 1999, then over counts 0 to 399 and then over counts 2000 to 3599, repeating this four thousand count cycle repeatedly;

Fig. 38 is a time chart showing the time relation of certain components of the circuits of Figs. 35 36 and 37, during this alternative four thousand count cycle;

Fig. 39 is what might be termed a thumbnail sketch showing the essential elements of a common cathode Or circuit, used to reset the thousand's order counter;

Fig. 40 is a sketch showing the comparative location of the spots on the A tube when used in the 2000 address arrangement;

Fig. 41 is a sketch showing the comparative location of the spots on the A tube when used in the 3600 address arrangement;

Fig. 42 is a diagram showing the raster of any one of the tubes for the 2000 address arrangement, or the first half of the raster for the 3600 address arrangement;

Fig. 43 is a diagram showing the second half of the raster of any one of the tubes for the 3600 address arrangement;

Figs. 44 and 45 are charts showing a list of addresses with the binary-decimal code for each and the translated code expressed in the selective operation of the deflection weight current adder tubes for each and finally the horizontal and vertical deflection potential values for each;

Fig. 46 is a chart in the form of nests of graphs showing the addends which summed form the totals expressing the deflection potentials, this chart expressing in a somewhat different manner the elements of the decoded address codes and the total deflection potential values produced thereby;

Fig. 47, on the same sheet with Fig. 52, is a block diagram showing how Figs. 48 to 52 inclusive are to be placed to form a logical circuit diagram of the decoding means responsive to the input Bits of the address codes and a schematic circuit diagram of the two cascode amplifiers responsive to the said decoding circuit for generating the vertical and horizontal cathode ray tube deflection potentials;

Figs. 48, 49 and 50 taken together comprise the decoding circuit with the Bit and Inverse Bit leads coming in and the vertical and horizontal deflection weight leads carrying the translated address codes leading therefrom;

Fig. 51 is a schematic circuit diagram of the cascode amplifier used to convert the vertical deflection weight signals into the vertical deflection potentials;

Fig. 52 is a block representation of the cascode amplifier used to convert the horizontal deflection weight signals into the horizontal deflection potentials, the circuit of this amplifier being like that of the cascode amplifier shown in Fig. 51;

Fig. 53, on the same sheet with Fig. 62, is a block diagram showing how Figs. 54 to 63 inclusive may be placed to form a general schematic lay out of the circuits employed to disclose the present invention;

Fig. 54 indicates the manner of the association of the regeneration counter control circuits, the regeneration counter, the address switch, and certain fragmentary circuit details which will appear useful in the following explanation;

Fig. 55 is a partial showing of certain circuit details of the switches and pushbuttons located on the console;

Fig. 56 indicates the V Field, a register in which the addresses may be stored and from which these addresses may be placed on view by means of a register display device, together with a switch by means of which addresses from various sources may be routed to the V Field;

Fig. 57 indicates the pulse stretchers and the inverters placed in line between the address switches and the decoding circuit for translating the coded addresses into cathode ray deflection potentials;

Fig. 58 is an indication of certain pushbuttons on the console and certain switches and pushbuttons on the maintenance panel;

Fig. 59 is an indication of the decoding circuits and the array of cathode ray tubes used as means for the storage of information;

Fig. 60 is an indication of a number of auxiliary circuits together with a small number of fragmentary circuit details helpful in explaining the general mode of operation of the device of the present invention;

Fig. 61 is an indication of certain testing and indicating means by which certain errors are rationalized and translated into signals useful in the diagnosis of failures, including the modulo 2 latches, the modulo 4 checking circuits, and the modulo 4 error latch;

Fig. 62 is an indication of a cathode ray tube unit which operates in the same manner as each of the 66 units indicated in Fig. 59 but which is not provided with the pickup plates whereby the spotted illumination of the screens may be observed so that a given address may be determined by the location of its spot on the face of these tubes;

Fig. 63 is a schematic circuit diagram showing the connections of a set of four ten position switches on which a four digit number corresponding to a wanted address may be set up by which a given address may be entered into the V Field;

Fig. 64 is a set of graphs showing how available pulses are combined to produce a control for a current adder tube in the cascode amplifier for producing the bit sweep movement of the beams of the cathode ray tubes for the purpose of writing in dashes;

Fig. 65 is a graphical representation of the potential gradients produced on the face of a cathode ray tube in writing in a dot, representing a binary 0 and a dash representing a binary 1;

Fig. 66 is a similar graphical representation of the same potential gradients produced by a defocused beam at the dot position whereby greater accuracy may be obtained as the need for much greater accuracy in the positioning of the beam is lessened;

Fig. 67 is a much enlarged view of a small area of display on the face of one of the cathode ray tubes of the check address indicator showing the double dot display which appears at the particular address where an error has been detected;

Fig. 68, on the same sheet with Fig. 69, is a block diagram showing how Figs. 69–72 inclusive may be joined to provide a logical circuit diagram of the circuitry of certain pushbuttons for controlling the V Field and the transfer of information between certain of the caculator registers and certain CRT addresses selected by means of identifications set up in the V Field;

Fig. 69 shows the circuit of the single pulse generator used by the transfer pushbuttons to provide a pulse synchronized with the calculator operations;

Figs. 70 and 71 show the said pushbutton and the circuitry controlled thereby for developing the gating signals for making the various transfers of information between the said calculator registers and the designated CRT addresses;

Fig. 72 shows some of the details of the V Field Control circuit and the latches comprising the essential elements of the V Field;

Fig. 73 is a timing chart showing the development of the gating signals under control of the single pulse generator of Fig. 69;

Fig. 74 is a block diagram showing how Figs. 75 to 84 inclusive may be fitted together and fitted to Figs. 54 and 57 to provide a sufficient logical circuit diagram to show the operation of means for making a spill test of the cathode ray tubes;

Fig. 75 shows a number of the switches on the maintenance panel which may be used to manipulate the circuits in order to produce this test;

Fig. 76 shows the reference selector switches by means of which the number of references to each CRT address may be predetermined;

Figs. 77, 78, 80 and 81 show the circuitry for controlling the interplay of the regeneration counter and the test access counter in carrying out the long and intricate cycle of this operation of making the spill test;

Fig. 79 shows the circuits which detect the point at which the tally being made by the regeneration counter reaches the predetermined number of references set by the reference selector switches of Fig. 76;

Fig. 82 shows the test access counter which controls the orderly and sequential testing of the CRT addresses;

Figs. 83 and 84 show the test-normal relay which controls the switching from the normal operational circuits of the device and the circuits which must be set up to make the spill test;

Fig. 85 shows the set of inequality detectors associated with the auxiliary output circuits of the address tubes and which carry exactly the same information to be found on the 66 output parallel data lines thereof whereby the results of the spill test may be under constant observation;

Fig. 86 is a block diagram showing how Fig. 85 may be fitted to Fig. 59 to indicate the intput connections to this set of inequality detectors, the output thereof being indicated as extending to a responsive alarm circuit in Fig. 77;

Fig. 87 is a block diagram showing how Figs. 57, 88, 89 and 90 may be fitted together to form a circuit arrangement for making a synchronizing connection to the device whereby the record at any given address may be observed;

Fig. 88 shows the manual switches by means of which any desired address may be arranged for test, the switches as shown being set on address 0222;

Figs. 89 and 90 show the circuitry by which the various addresses being constantly approached by the regeneration counter, either on a regeneration cycle or on a specific reference thereto, will be matched to the designation of a desired address written on the switches of Fig. 88 so that a pulse in synchronism with the effective connection of such address to the 66 data lines will be emitted so that the record in that specific address may be examined;

Fig. 91 is a timing chart used in connection with the description of the circuitry charted in Fig. 74 to explain the timing by which one reference in the spill test out of a set number is lost; and Fig. 92 is a similar timing chart to aid in the explanation of why the last reference of a predetermined number of references is automatically changed to a different nature.

In the following description certain terms are used and many basic circuit components are mentioned. By way of explanation the following prior art disclosures are set forth and reference is made thereto for a complete description of any given circuit and the manner of its operation.

Patent Re. 23,699, August 18, 1953, issued to B. L. Havens for a pulse delay circuit.

Application Serial Number 338,122, February 20, 1953, filed by Byron L. Havens and Charles R. Borders for a serial-parallel binary-decimal adder.

Application Serial Number 444,253, July 19, 1954, filed by Byron L. Havens and William J. Deerhake, for an electrostatic storage system.

Application Serial Number 444,251, July 19, 1954, filed by Charles R. Borders, for regeneration and octal counter.

Application Serial Number 434,548, June 4, 1954, filed by William J. Deerhake, Byron L. Havens and Kenneth E. Schreiner, for a modulo 4 checking circuit.

Application Serial Number 465,076, October 27, 1954, filed by William J. Deerhake, Charles R. Borders, and Byron L. Havens, for a checking circuit including modulo 2 and modulo 4 checking circuits.

Application Serial Number 472,098, November 23, 1954, filed by Kenneth E. Schreiner and John P. Cedarholm, for a modulo 9 checking circuit.

Application Serial Number 470,570, November 23, 1954, filed by George F. Bland, for a register display system.

Application Serial Number 470,160, November 22, 1954, filed by Byron L. Havens, for an electronic multiplier.

A bit is a binary item, that is, a signal indicating a 1 in the binary code of 0 and 1. The four consecutive binary orders, reading from right to left, represent the decimal digits 1, 2, 4 and 8 and the sum of these values as represented by the bits expressed in any binary code equals the value of the decimal digit represented thereby. A bit is therefore a single binary item in a code which is used to express or convey a given amount of information.

In the device of the present invention binary 0 is expressed by a dot on the face of a cathode ray tube at a particular spot representing a given address and a binary 1 is a dash or an affected area produced by focusing the beam of the tube on a particular spot as though to form a dot and then moving it slightly either to the right or downwardly.

The binary-decimal system is one in which the decimal digits of a number are each separately expressed in a pure binary code. Thus a code 1001, having an 8 bit and a 1 bit, expresses the decimal digit 9. It will appear hereinafter that any other number, higher in value than 9 will be expressed by more than one such binary code, that is, a separate binary code for each digit, as for example, 0100, 0101, 1001, for the decimal digit 459.

A time interval is one microsecond. A time interval may, of course, be of any convenient value, but the circuits of the present invention have been constructed and arranged to operate on a megacycle basis. It may particularly be noted that the delay circuit disclosed in the Havens reissue patent and in each of the above noted Applications have been constructed and arranged to receive a pulse on an input terminal during one time interval and to deliver a like pulse on an output terminal during a succeeding time interval one microsecond later.

Throughout the circuitry of this device, and the calculator with which it is associated, a common source of clamping potential and synchronizing pulses, clearly shown in the said Havens Reissue Patent 23,699, is employed. This serves to pace all the operations described hereinafter.

Up and Down refer to potentials. In this electronic maze, each component, such for instance as a tube circuit, is arranged to be active when the potential on its control conductor is Up and inactive when such potential is Down. Generally, as in a cathode follower circuit, when the potential on an input terminal is Up, the potential on the output terminal is Up and, likewise, when the potential on an input terminal is Down the potential on the output terminal is Down. It may be stated, merely by way of example, that a potential of plus 5 volts or more will constitute an Up condition and a potential of minus 30 volts or less will constitute a Down condition. Up means that the voltage present at a particular point is positive with respect to ground and Down means that the voltage present is negative with respect to ground. If the control grid of a vacuum tube is referred to as Down, it means that the voltage at that control grid is below the cutoff value of the vauum tube.

Numerous coincidence circuits are employed herein. An And circuit refers to a circuit which is operable to produce an Up condition on its output terminal only when all of its input terminals are Up. An Or circuit refers to a circuit operable to produce an Up condition on its output terminal when any one or another or more of its input terminals are Up.

In the logical diagram forming the main part of the present disclosure an And circuit is shown as a rectangle about the designation And and having a plurality of input terminals and a single output terminal.

A cathod follower circuit is a tube circuit having its anode firmly tied to a positive potential source or otherwise arranged so that the grid constitutes an input and the cathode or the cathode circuit constitutes an output. When the grid is Up, the cathode will go Up and when the grid is Down the cathode will go Down.

The And and Or circuits may be combined with the cathode follower circuits, in which case they are designated And—CF and Or—CF respectively.

The invention utilizes numerous dual-type tubes having two sections in a single envelope. Each such section is referred to herein as a tube and is designated by a number followed by the letter L or R or simply by the letters L and R to indicate the left hand or right hand tube section respectively. A tube so referred to is similarly designated thereafter if employed with the same immediate circuitry and for the same purpose even though it is not shown with its corresponding L or R tube.

Another component of these circuits is an inverter. This generally includes a tube and is so arranged that when the input is Down the output is Up and when the input is Up the output is Down.

Frequently, a logical element is required which comprises a diode Or circuit driving an inverter. Such a circuit is termed an Or—Inv circuit and is so designated in the logical diagram.

Various type switches may be constructed and arranged essentially by combinations of And and Or circuits. In general a two position four pole switch may be made up from a plurality of And circuits for switching a four conductor (four bit) channel from one or another of two incoming four conductor channels.

A binary adder is one which will add bits in accordance with the principles of binary addition. Such an adder is but one of four used in a complete adder, the four being known as the 1 bit adder, the 2 bit adder, the 4 bit adder and the 8 bit adder respectively. Each has three inputs, two for bringing in the bits to be added and the third for bringing in a carry 1 bit which is also to be added in to the others. There are two outputs, one for an output sum bit and another for an output carry bit. In accordance with the principles of binary addition a single input bit will produce a single output sum bit, two input bits will produce an output carry bit and three input bits will produce both an output sum bit and an output carry bit. The internal circuitry of the adder is not shown here since it appears in great detail in one or more of the above noted applications.

A latch is a circuit component used to hold or maintain a bit. The circuit is simple and contains essentially only an And circuit and a Delay circuit. The And circuit has a control input and an input leading from the output of the Delay circuit. When, in the course of some operation the control conductor is driven Up and during this period of bit is transmitted over the input to the Delay circuit, the Delay circuit will at the next interval drive the input of the And circuit Up and since the control is now Up the output of the And circuit which also constitutes the input to the Delay circuit goes Up. Consequently this bit will be constantly regenerated by the Delay circuit and will in effect circulate through the And circuit and the Delay circuit, appearing constantly on the output terminal of the Delay circuit from which it may be taken off as desired. When the control input of the And circuit is finally moved Down, then the transmission of the bit over the input of the Delay circuit in the time interval following will be interrupted and the circuit will become unlatched.

Figure 1:
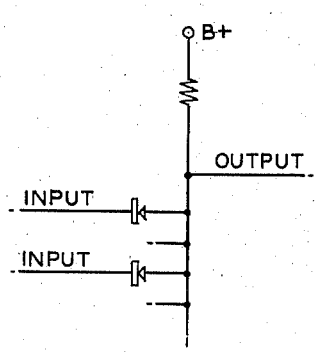
Fig. 1 is a schematic circuit diagram of a diode And circuit.

Fig. 1 shows the essential elements of an And circuit. Two or more inputs are each connected through a diode to the junction of the output and a pull-up resistor leading to a source of positive potential. The diodes are so poled that so long as any input remains Down the output remains Down. To drive the output Up it is required that all of the inputs be Up. It may be noted that if such an And circuit is employed in a circuit arrangement where all of the inputs are normally Up then the circuit arrangement will act as an Or circuit, for if under these arrangements any one or more of the inputs is driven Down then the output will go Down.

Figure 2:
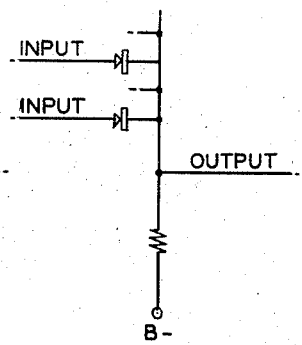
Fig. 2 is a schematic circuit diagram of a diode Or circuit.

Fig. 2 shows the essential element of an Or circuit. Two or more inputs are each connected through a diode to the junction of the output circuit and a pull-down resistor leading to a source of minus potential. The diodes are so poled that when any one or more of the inputs is driven Up then the output is driven Up. It may be noted that if such an Or circuit is employed in a circuit arrangement wherein the inputs are normally Up, then the circuit acts as an And circuit for the output cannot be driven Down until all of the inputs have been driven Down.

Figure 3:
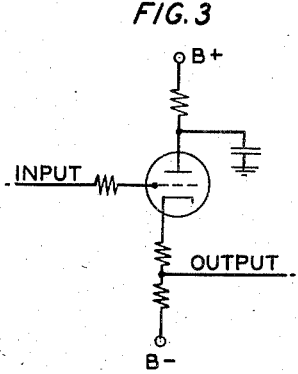
Fig. 3 is a schematic circuit diagram of a cathode follower circuit.
Figure 4:
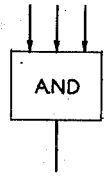
Fig. 4 is a symbol used in the logical diagrams to represent the And circuit of Fig. 1.

Fig. 3 shows the essential elements of a cathode follower circuit. The input is connected through a parasitic suppressing resistor to the grid of a triode (or equivalent tube). The anode is connected through a decoupling circuit consisting of one branch leading through a resistor to a source of positive potential and another branch leading through a capacitor to ground. The cathode is connected through a voltage dividing resistor circuit to a source of negative potential with the output circuit connected midway therein. The output will therefore normally be at substantially the value of the negative potential. However, when the input goes Up and the tube becomes active, the current flow in the said voltage dividing resistor circuit brings the output Up. Thus the state of the output follows the input.

Figure 7:
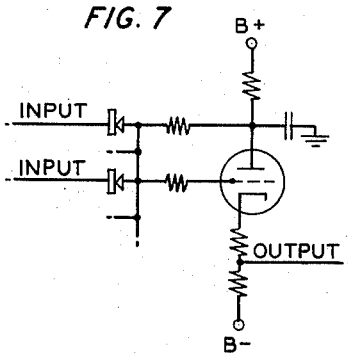
Fig. 7 is a schematic circuit diagram of a combination of the And circuit of Fig. 1 and the cathode follower circuit of Fig. 3.
Figure 8:
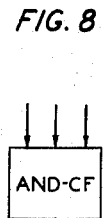
Fig. 8 is a symbol used in the circuit of Fig. 7.

As an alternative arrangement used in many instances, the anode of the triode of Fig. 7 may be tied firmly to the source of positive potential and the decoupling circuit dispensed with.

Figure 9:
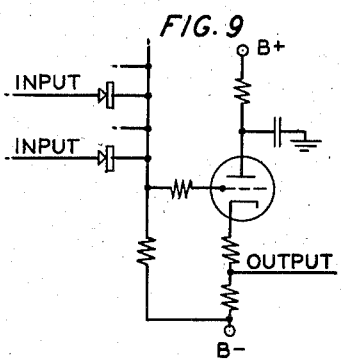
Fig. 9 is a schematic circuit diagram of a combination of the Or circuit of Fig. 2 and the cathode follower circuit of Fig. 3.
Figure 10:
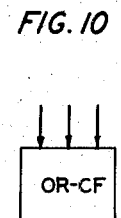
Fig. 10 is a symbol used in the logical circuits to represent the circuit of Fig. 9.

The operation of the combination circuits of Figs. 7 and 9 will be clear without further explanation.

Figure 11:
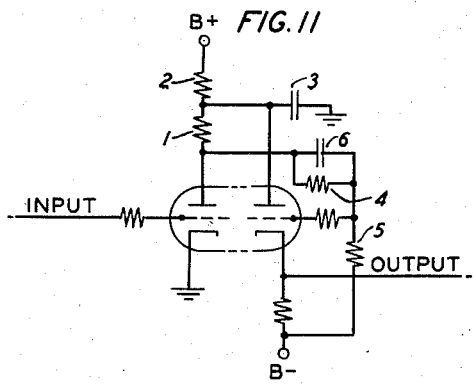
Fig. 11 is a schematic circuit diagram of a combination of an inverter circuit and a cathode follower circuit.
Figure 12:
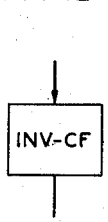
Fig. 12 is a symbol used in the logical circuits to represent the circuit of Fig. 11.

Fig. 11 shows the essential elements of an Inv—CF (see Fig. 12) circuit. The left half of the tube acts as the inverter and the right portion acts as a cathode follower. The anode of the inverter is connected through a voltage dividing resistor circuit to a source of positive potential. Since the anode of the inverter is the output thereof it follows that so long as the input is Down and the tube is inactive, the output is Up. When the input goes Up and the tube becomes active then due to the voltage drop in the voltage dividing circuit the output goes Down. The grid of the cathode follower tube is tied to the anode of the inverter tube and hence the output of the combination follows the output of the inverter.

In somewhat more detail, the input terminal of the combination circuit is connected through a parasitic suppressing resistor to the grid of the inverter tube. If this input terminal is Up, the grid of the tube is Up thereby rendering the tube fully conducting. The anode of the tube is connected through a load resistor 1 and a decoupling circuit consisting of a resistor 2 leading to a source of positive potential and a capacitor 3 leading to ground. The resistors 1 and 2 constitute a voltage dividing circuit to the midpoint of which the anode of the cathode follower tube is connected. The voltage dividing resistors 4 and 5 are connected between the anode of the inverter tube and a source of negative potential and couple the grid of the cathode follower tube directly to the anode of the inverter tube. A frequency compensating coupling capacitor 6 is connected in parallel with the resistor 4. If the inverter tube is fully conducting, its anode is Down and the grid of the cathode follower tube is Down. This causes the cathode follower tube to become less conductive whereby the output terminal tied directly to its cathode goes Down. Whenever the input terminal of the combination is Down, the inverter tube is cut off causing its anode to be at the voltage of the source of positive potential. The action of the voltage dividing resistors 4 and 5 cause the grid of the cathode follower tube to be Up so that the output terminal is Up.

Figure 13:
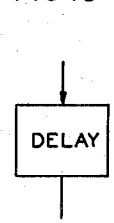
Fig. 13 is a symbol used in the logical circuits to represent a delay circuit, fully disclosed in the Reissue Patent 23,699 issued on August 18, 1953, to Byron L. Havens.

The operation of the delay circuit indicated by its symbol Fig. 13 needs no description here as it is fully described in the above noted Havens Reissue Patent 23,699. Briefly it is a circuit component which will admit a pulse to its input and deliver a like pulse at its output one time interval later. It will also admit to its input a train of pulses consecutively or otherwise spaced in time and deliver a like train of like pulses at its output each one time interval later.

Figure 6:
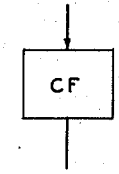
Fig. 6 is a symbol used in the logical diagrams to represent the cathode follower circuit of Fig. 3.

Fig. 14 shows a conventional blocking oscillator of the variety shown and described in the following reference: Fig. 6–1, page 207, vol. 19, Wave forms, Radiation Laboratory Series, McGraw-Hill, first edition, 1949. The left hand tube serves as a triggering tube while the right hand tube serves as the blocking oscillator. By applying a positive pulse to the input terminal, the triggering tube becomes fully conducting thereby triggering the circuit of the other tube so as to produce a positive pulse on the output terminal. For all practical purposes it is considered that the positive output signal occurs at the same time that the positive input pulse is applied to the input terminal. The purpose of the blocking oscillator is to provide a large current pulse in response to the application of a voltage pulse to the input.

Fig. 16 shows the essential elements of a binary adder. There are three input leads 7, 8 and 9 shown. First let it be assumed that but a single bit is introduced into the adder, say on lead 7. Thereupon the Or circuits 10, 12 and 13 will be operated but And circuit 14 will not respond. Since only two of the Or circuits 10, 11 and 12 respond, the And circuit 15 will not respond and since the input of Inv circuit 16 is left Down, its output will be Up. Since the output of Or circuit 13 is Up, coincidence will be established in And circuit 17 and therefore the Sum output lead 19 will be Up.

Now let it be assumed that two of the three input leads, say 7 and 8, are Up simultaneously. In this case all three of the Or circuits 10, 11 and 12 will be operated so that coincidence will be established at And circuit 15 and the carry output lead 18 will be Up. However, the input to Inv 16 will be Up so that its output will be Down with the consequence that And circuit 17 will not operate. Since only two of the inputs to And circuit 14 are Up, its output will remain Down and therefore the Sum output lead 19 will remain Down.

In the third case, where all three inputs 7, 8 and 9 are Up, an Up condition will be produced on the carry lead 18 as before. In addition coincidence will be established in And circuit 14 and therefore the Sum output lead 19 will also be Up.

An inequality detector, such as shown in Fig. 18, is a logical circuit arrangement used for the purpose of comparing two numbers one with the other. In this figure the essential arrangement for comparing one Bit of a binary-decimal number with a corresponding Bit of another is shown. The two incoming or input terminals to which the said Bits are applied are shown at the top of the figure. Both are extended in parallel to the two inputs of an And circuit 20 and an Or circuit 21. If both such inputs are Down then neither And circuit 20 nor Or circuit 21 will be operated and although the output of Inv circuit will be Up the output of Or circuit 21 will be Down so that coincidence cannot be established in And—CF circuit 23. Therefore the output of this And—CF circuit which constitutes the output of this inequality detector unit is Down. Equality in this case is indicated by a Down condition.

Now let it be assumed that a Bit appears on a single one of the input terminals. Coincidence will not be established in the And circuit 20 so that Inv circuit will remain in its normal condition in which its output is Up. However, the Or circuit 21 will be operated and since its output is Up coincidence will be established in And—CF circuit 23 and the output thereof will be Up. Thus, inequality is expressed by an Up condition on the output of the unit.

In the third instance where a Bit appears on each of the input terminals both And circuit 20 and Or circuit 21 will be operated. The output of Or circuit 21 will be Up but the Inv circuit 22 will invert the Up condition at the output of And circuit 20 so that coincidence cannot be established at And circuit 22. Hence, equality is again expressed by a Down condition on the output of the unit.

Fig. 19 shows the use of four such units to detect inequality in two numbers being expressed on the four conductor channels over which such numbers are being transmitted. Here the four outputs of the separate units are tied together so that during the transmission of the numbers each over its separate channel, the output of the circuit will continuously remain Up until equality is attained wen the output will go Down.

Fig. 20 shows the essential elements of a cascode amplifier, a device by which the weighted deflection voltages are produced. The cascode amplifier in general consists of two triodes serially connected so that the cathode of the upper triode is tied to the anode of the lower. The cathode of the upper triode 24 is connected to the conductor 25 which in turn is connected to the anodes of a plurality of lower triodes 26, 27 and 28. The arrangement is such that the potential of the conductor 25 remains constant regardless of the current flowing therein by reason of the variable number of the lower triodes selectively rendered conducting by the associated And circuits indicated. A lead 29 taken from the anode of the upper triode 24 will, due to the variable current flowing through this tube, carry a correspondingly variable voltage useful for application to the deflection circuits of the cathode ray tubes to be more fully described hereinafter.

The upper triode 24 circuit may also be described as a grounded grid amplifier, that is one in which the grid of the triode remains substantially at a constant level while the current through the tube varies so that the anode connected through a load resistor faithfully reflects this current change by its change in potential.

Each of the lower triodes 26, 27 and 28 may be spoken of as a current adder since the function of each is to add an increment to the current flowing in conductor 25 and through the upper triode 24.

The cascode amplifier in this form may be spoken of as a plurality of current adders in parallel as a group connected in series with a grounded grid amplifier. More details of this fundamental arrangement will appear hereinafter.

Figure 21:
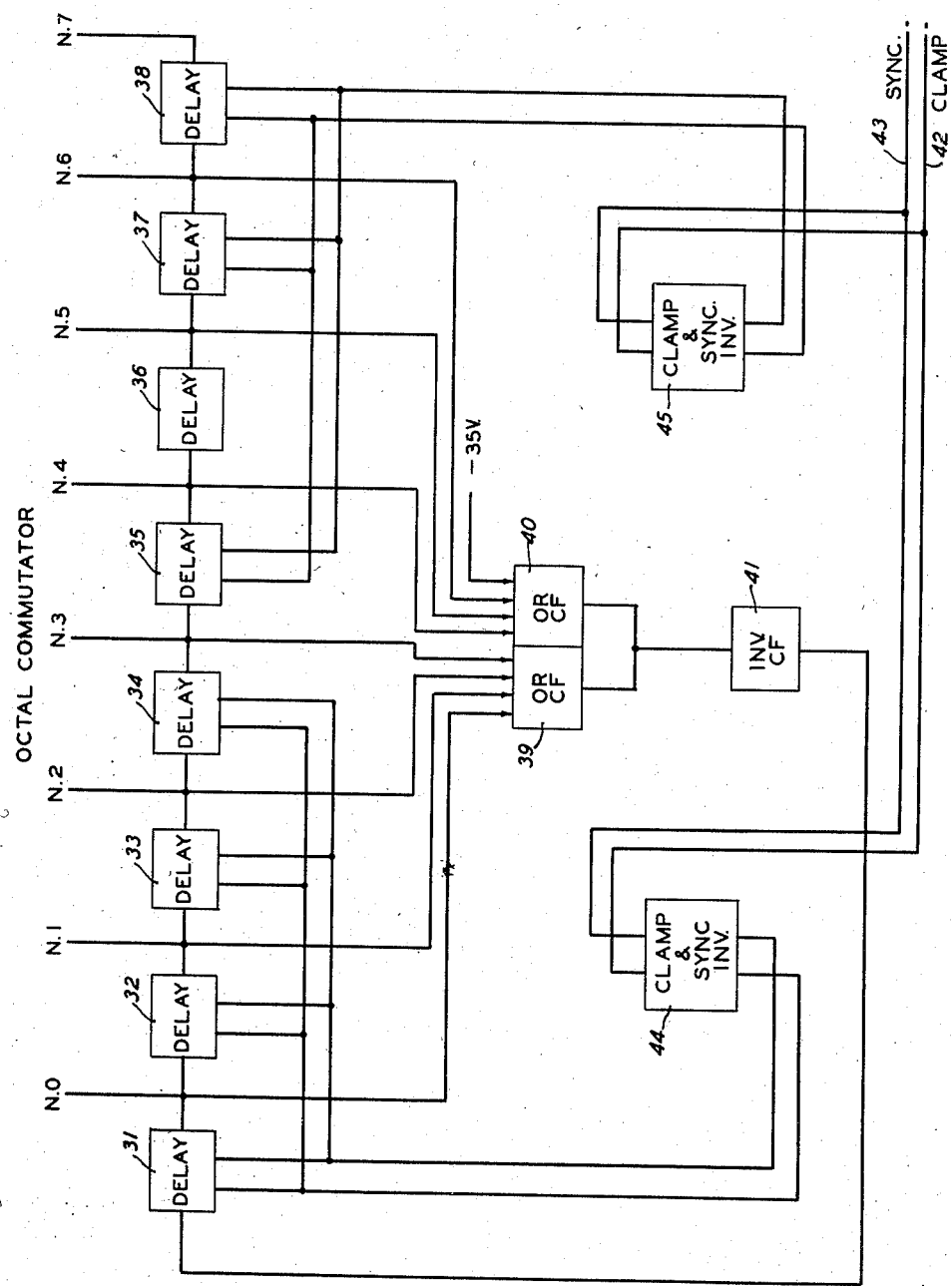
Fig. 21 is a logical circuit diagram of an octal commutator.

A circuit component of fundamental importance in these circuits is known as an octal commutator, here shown in Fig. 21. This is essentially a bundle of eight leads generally designated 0–7 inclusive on each of which a pulse appears in turn in each succeeding microsecond interval, the cycle being repeated constantly so that there is available a source of eight pulses which may be used for counting or timing in any manner desired. It consists generally of a series arrangement of eight one microsecond delay circuits effectively placed in a ring circuit whereby the operation of each triggers the next. The output circuit of each except the last operates an Or circuit and an inverter circuit to hold the input of the first clear, but the output of the last allows this circuit to relax and hence the series is recycled. The circuit operates automatically indefinitely and thus provides a source of pulses recurring on each of the eight leads therefrom each eight microseconds.

One form of this Octal Commutator is shown in Fig. 21. Here the eight delay circuits 31 to 38 respectively are shown to be in a series circuit. If none of these is active, as a starting condition, then the output of the Or—CF circuits 39 and 40 will be Down (this is assured by the eighth lead to the Down potential —35 v.) and therefore the output of the Inv—CF circuit 41 will be Up. This activates the Delay circuit 31 so that one microsecond later its output will go Up. This output leads to the supply lead N.0 and at the same time operates the Or—CF circuit 39 thus terminating the Up condition at the input of the Delay circuit 31. The pulse at the output of Delay circuit 31 also supplies an input to the next Delay circuit 32. Thus it will be seen that pulses will appear in succeeding microsecond periods on the supply leads N.0 to N.7 respectively. When the last Delay circuit 38 delivers its pulse to the supply lead N.7 and the pulse on lead N.6 has terminated, both the Or—CF circuits 39 and 40 go Down whereby the output of Inv—CF circuit 41 goes Up so as to effectively introduce a pulse into Delay circuit 31 simultaneously with the transmission of the pulse over the supply lead N.7. Thus the device operates as though it were a ring circuit where the output of Delay circuit 38 would be connected to the input of the Delay circuit 31.

A point to be noted is that all these Delay circuits, as well as all others herein depend for their proper operation, as fully set forth in the said Havens reissue patent, on a common source of clamp and sync. voltages. Here the common sources are indicated by the leads 42 and 43 respectively. These are connected to the clamp and sync. inverters 44 and 45 each of which supplies this essential current waveform to four of the Delay circuits. It will thus be seen that the whole operation of the device of the present invention is paced by the rigidly maintained frequency of the common clamp and sync. potentials so that where two or more counters are employed though they may operate independently nevertheless are held rigidly in step one with the other.

Another component used herein is the clamp and sync. inverter used for supplying clamping and synchronizing pulses each 180° out of phase with the input pulses to the delay circuits. Such a component is fully described in the above noted Deerhake and Havens disclosure.

It is to be noted in connection with the octal commutator that the progression of pulses on the N.0 to N.7 output leads may be used for counting purposes. Starting from a given time the pulse on the N.0 terminal will mark a first pulse so such a pulse is spoken of as beginning at N.0 time and extending to N.1 time. Similarly the fourth pulse will extend from N.3 to N.4 time. By extension of this system N1.0 time will mean the beginning of the first pulse in the second octal cycle and N37.5 will mean the beginning of the sixth pulse in the thirty-eighth octal cycle.

It will appear hereinafter that the octal commutator is used to control the devices known as the decade counters and that in fact these counters count the passage of octal cycles. It will be shown that a decade counter is started in operation at an N.0 time and that at an N.4 time, known as the read out time, the proper bits to express the count reached will appear on its four output bit leads. Thus in a units decade counter where the operation is starter at an N.0 time a Bit will appear on its one bit output lead at N.4 time. Similarly a Bit will appear on its four bit output lead at N3.4 time, and a Bit will appear on each of its eight bit and one bit leads at N8.4 time.

Figure 22:
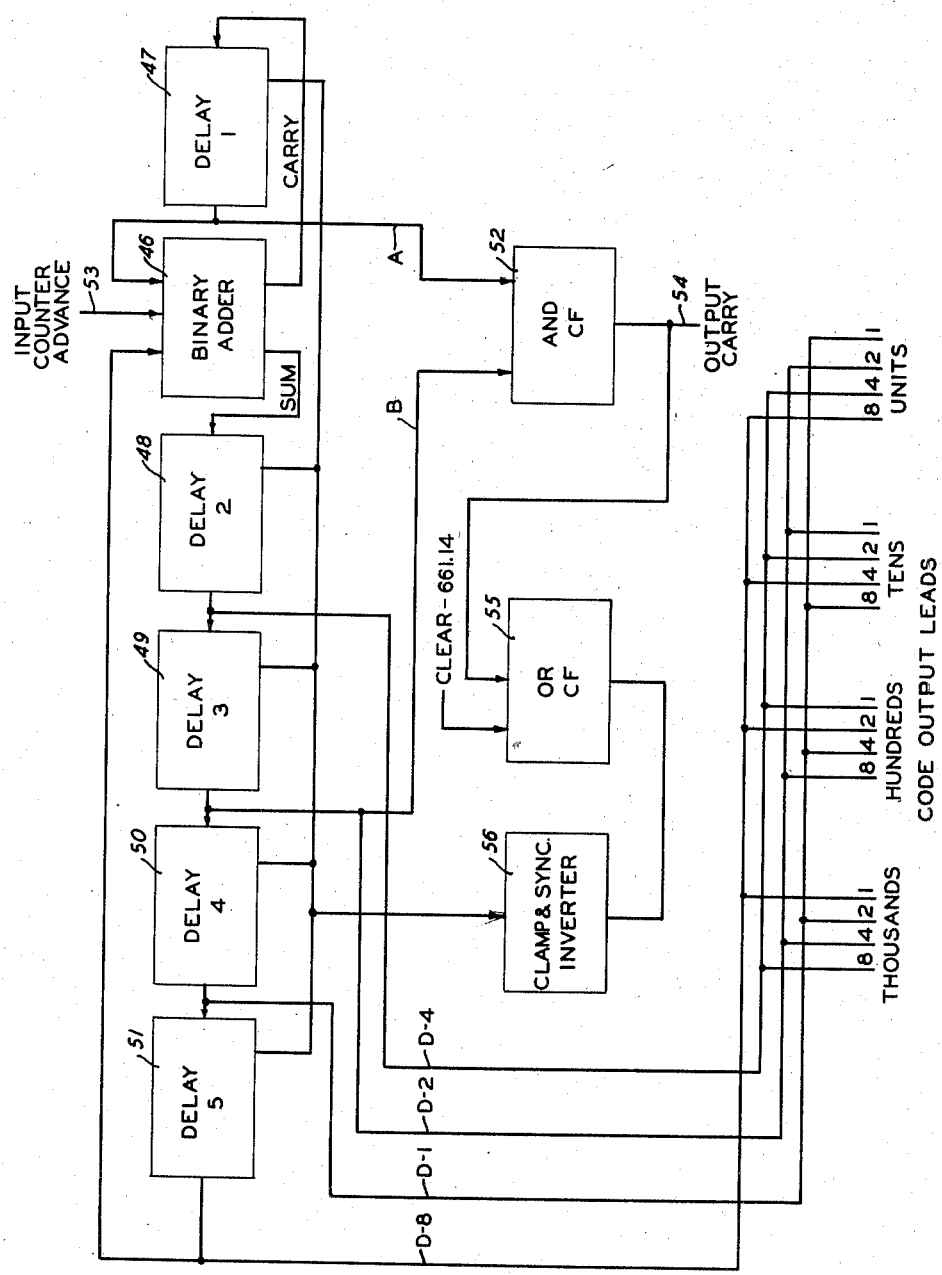
Fig. 22 is a logical circuit diagram of the essential elements of a decade counter with an indication of the arrangement of the output code leads whereby the count reached by any one or more units of such counter may be noted or used.

Fig. 22 shows the essential elements of a single order decade counter. This consists of a binary adder 46 and five delay circuits, the delay (1) circuit 47, the delay (2)

circuit 48, the delay (3) circuit 49, the delay (4) circuit 50, and the delay (5) circuit 51. An And—CF circuit is operated by coincidence of signals from the output of delay (1) circuit 47 and delay (3) circuit 49 and this And—CF circuit supplies an output carry signal over the conductor 54 leading to the input conductor 53 of the next higher decimal order counter. There is also an Or—CF circuit 55 operated by the signal on the output carry lead 54 to control the clamp and sync. inverter 56 for purposes which will appear shortly.

Since these decade counters are operated fundamentally under control of the octal commutator, the code output leads must be differently arranged for each different decimal order. This arrangement is indicated at the bottom of Figure 22 where the 1, 2, 4 and 8 bit leads are shown connected to the output leads of delay (5) circuit 51, delay (4) circuit 50, delay (3) circuit 49, and delay (2) circuit 48 in different orders for the units, tens, hundreds and thousands decimal orders. It will be understood that no single decade counter unit will have all the output code leads as shown in Fig. 22 but that each will have one of the arrangements indicated therein.

The operation of the decade counters is started by applying a pulse to the input conductor 53 of the lowest or units order component, and this is brought in by appropriate circuitry from the N.0 lead of the octal commutator. There being but a single bit applied to the binary counter at this time a bit will appear on the sum output lead connected to the input of delay (2) circuit 48. At time N.1 a pulse will therefore appear at the output of delay (2) circuit 48 and the input of delay (3) circuit 49. At time N.2 a pulse will appear at the output of delay (3) circuit 49 and the input of delay (4) circuit 50. At time N.3 a pulse will appear at the output of delay (4) circuit 50 and the input of delay (5) circuit 51. At time N.4 a pulse will appear at the output of delay (5) circuit 51 and through the binary adder 46 to the input of delay (2) circuit 48.

If at this N.4 time, through appropriate circuitry the code output leads are applied to some given circuits, the units group will show the code 0001.

At time N.5 the pulse applied to delay (2) circuit 48 will have advanced to the output of delay (2) circuit 48 and the input of delay (3) circuit 49. It will thus be seen that a pulse introduced into this ring will effectively circulate therein until the coincidence of two bits into the binary adder 46 produces a carry instead of a sum when the movement of the pulse in its circulation will be delayed for one period. It is not believed to be necessary to go through the operation of this device step by step since it has been fully described elsewhere particularly in certain of the above noted applications. It need only be said at this time that given four of these units interconnected as indicated with the output lead 54 of one connected to the input lead 53 of the next in order, the codes appearing at any N.4 time on the four sets of code leads will represent a four digit decimal number which will be an accurate count of the number of octal cycles which have passed since the start of operation.

Such a counter is used herein as will be more fully explained to control the regeneration cycles as the beams of the storage cathode ray tubes are driving over their rasters to traverse either 2000 spots in one instance or 3600 spots in another.

Figure 23:
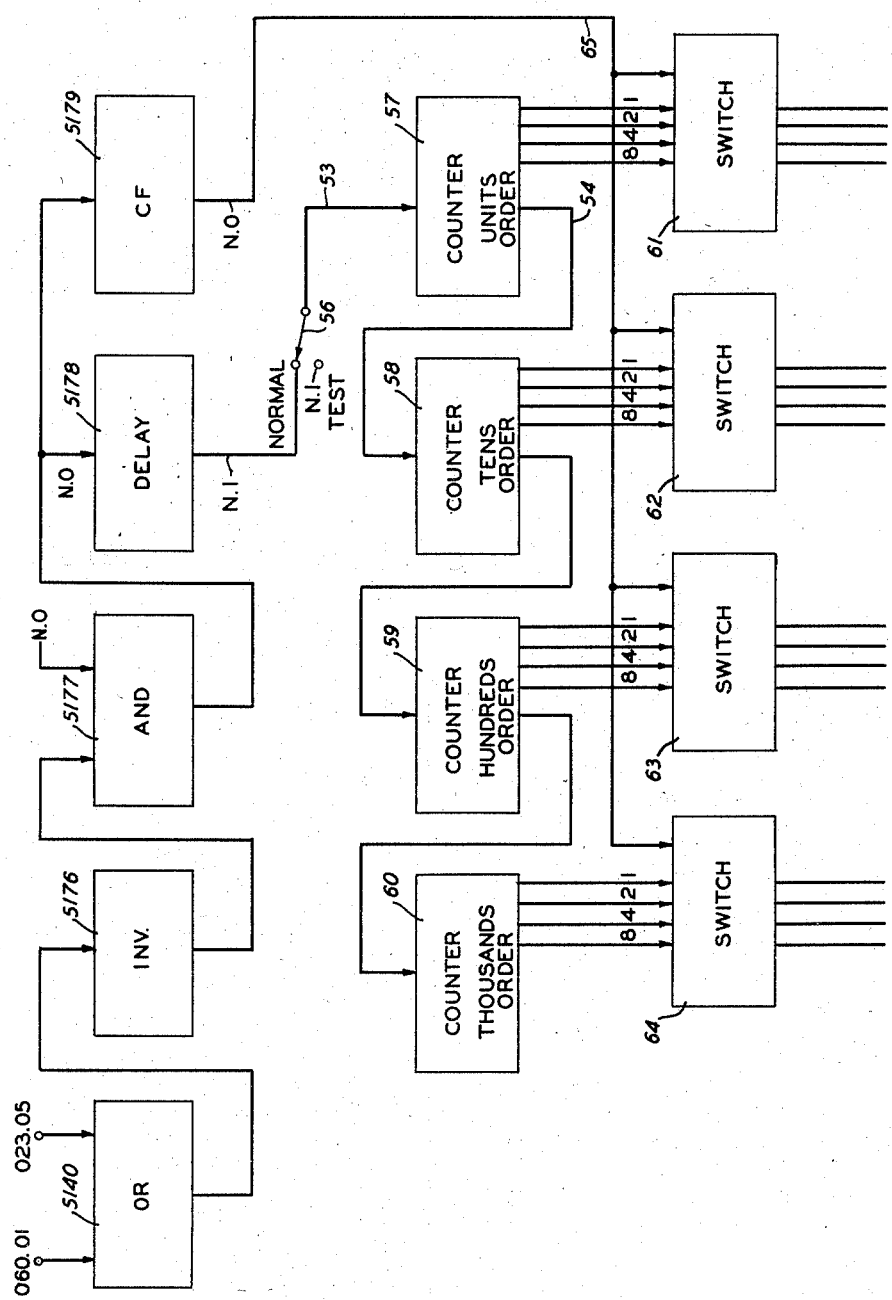
Fig. 23 is a fragmentary logical circuit diagram showing the essential elements of the means for controlling the operation of the decade counters, particularly the means for transmitting a signal to the input at an N.1 time and for operating the output switches at an N.0 time.

Fig. 23 is a fragmentary logical circuit diagram showing the essential elements for the control of the counter. Under normal conditions the Inv circuit 5176 is not operated whereby its output which forms one of the inputs of And circuit 5177 is Up. Since the other input of this And circuit is connected to the N.0 lead from the Octal Commutator, it follows that coincidence is established regularly once every octal cycle at .0 time and that therefor both the Delay circuit 5178 and the CF circuit 5179 are rendered active at such time. The output of the Delay circuit is therefore Up at each .1 time so that a pulse is therefore transmitted over the normal switch element 56 of the Test-Normal switch to the input lead 53 of the units order counter 57. The output or carry lead 54 of this counter is connected to the input of the tens order counter 58.

The four 1, 2, 4 and 8 bit leads from each counter pass through a switch such as the switch 61 for the units order counter 57, the switch 62 for the tens order counter 58, and so on. The four switches 61, 62, 63 and 64 are under the control of lead 65 which is connected to the output of the CF circuit 5179.

Thus the pulses to be counted are admitted at .1 time, and the count obtained is transmitted at (the following) .1 time. It will hereinafter appear that the Inv circuit 5176 is under control of the Or circuit 5140 and that this in turn is controlled by various leads coming from circuits for controlling the counter. Thus when the regular counting of the counter is to be interrupted some one of the inputs of Or circuit 5140 is moved Up whereby the regular succession of pulses to both the Delay circuit 5178 and the CF circuit 5179 is halted.

It will appear hereinafter that the counter will continue to operate but that the count will not advance nor will the count reached be displayed through the operation of any switch such as the switches 61, 62, 63 and 64.

With this understanding, then, that a succession of pulses to be counted are fed into the counter at times corresponding to N.1 of the Octal Commutator and that values of counts obtained are transmitted therefrom at N.0 times, let us examine the operation of the counters.

Fig. 24 is a chart showing the operation of a units order counter from 0.1 time (when the first pulse to be counted is transmitted into the unit) until 4.5 time. In this chart only the Up conditions are indicated, the Down conditions which might be expressed by 0 being omitted as not actually necessary to a correct understanding of the circuit movements. The chart consists of a number of columns the first being provided to indicate the time and being in fact a regular succession of octal cycle times. The second column shows the incoming pulses, which it may be noted are introduced regularly at the .1 time. The third and fourth columns represent the sum and the carry outputs of the binary adder 46, it being understood that a bit on the sum output corresponds to a bit on any one or all three of the inputs to this device and that a bit on the carry output corresponds to a bit on any two or all three of the inputs to this device.

The fifth, sixth, seventh, eighth, and ninth columns show the active state of the Delay 1 to Delay 5 circuits respectively. The tenth, eleventh, twelfth, and thirteenth columns show the bits appearing on the D-4, D-2, D-1, and D-8 leads respectively, which in the units counter carry the 4, 2, 1 and 8 bits of the count obtained. It will be noted that the bits of the count obtained in the different order counters are transmitted over these leads in different orders, as shown in Fig. 22 and in accordance with the following table:

| output leads | D-1 | D-2 | D-4 | D-8 |
| --- | --- | --- | --- | --- |
| Units Order bits | 1 | 2 | 4 | 8 |
| tens order bits | 8 | 1 | 2 | 4 |
| hundreds order bits | 4 | 8 | 1 | 2 |
| thousands order bits | 2 | 4 | 8 | 1 |

Lastly, column 14 shows the read out of the decimal digit and this, it may be noted, always occurs at a .1 time. While the same count is obtained at a preceding .4 time, the transmission of the bits of the decimal number is made at .1 time as explained in connection with Fig. 23.

In Fig. 24, it appears that a first incoming pulse is introduced at 0.1 time and that this Up condition being applied to but a single input of the binary adder immediately (in this same time period) shows an Up condition on the sum output thereof. This it may be noted in Fig. 22 is transmitted to the Delay 2 circuit 48 so that in the chart of Fig. 24 Up conditions are shown in the columns for the incoming pulse, the sum output of the binary adder and the Delay 2.

In the next following time interval the output of Delay 2 circuit is Up, whereby Delay 3 circuit is rendered active. The junction between the output of Delay 2 and the input of Delay 3 constitutes the output terminal D-4 and consequently Up conditions are shown under Delay 3 and terminal D-4.

It will be noted that wherever Delay 2 is rendered actvie, Delay 3, Delay 4, and Delay 5 are successively rendered active and that Up conditions follow on terminals D-4, D-2, D-1 and D-8 respectively.

The binary adder is used to change the regularity of this pattern since it will be noted in time 1.1 that both an incoming pulse and a pulse from the output of Delay 5 are introduced into the binary adder whereby the output thereof is placed on the carry output lead rather than the sum output lead. This activates Delay 1 so that in the next time period at least one of the inputs of the binary adder will be Up. If only one is Up (note time 1.2) then the sum output will be Up and delay 2 will be rendered operative. If more than one is Up (note time 3.2) then Delay 1 will be rendered operative and the start of the successive through the Delay 2, Delay 3, etc. will be delayed.

The chart of Fig. 24 is straightforward in that a regular succession of incoming pulses is fed into the input 53 of the counter and so the count at the output proceeds in regular order.

Fig. 25 is a similar chart but is made to show only three incoming pulses at times 0.1 1.1 and 2.1 the flow of such pulses having been interrupted prior to the reading of time 3.1 as by the placing of an Up condition on one of the inputs of the Or circuit 5140. At time 2.0 a normal readout will not occur though the count attained at that time is in the regular succession. Now it will be noted that at the next read out time the count attained, expression by the decimal digit in a ring to indicate that it is present but is not actually read out, the count has not advanced. Thus the counter will operate indefinitely with the same count repeated but not advanced or read out.

Fig. 26 is an extension of the chart 25 in which it is assumed that the flow of incoming pulses is restarted sometime after time 57.1 at 58.1, this particular figure being chosen only to express indefiniteness. Thus at time 58.0 there is no read out but the same decimal digit (3) is still potentially available on the D-1 to D-8 leads. At time 58.1 another incoming pulse is introduced into the circuit so that at time 59.0 a normal read out occurs and the count is thus seen to be taken up and continued with regularity where it had been stopped just prior to time 3.0.

Fig. 27 is a further extension of this chart to show the operations taking place after the count of 9 has been reached at time 64.0. At time 64.1 the tenth incoming pulse is introduced whereby at time 64.2 the output of Delay 1 and the output of Delay 3 will be Up simultaneously. Looking at Fig. 22 it will be seen that under these circumstances coincidence will be established in the And circuit 52 whereby a counter carry pulse will be transmitted over the output lead 54 to introduce the first incoming pulse to the tens counter. Looking at Fig. 28 it will be seen that this incoming pulse is transmitted into the tens counter at time 64.2.

Coming back to Fig. 22 it will also be seen that when the output pulse is transmitted over the lead 54 it is also transmitted to the Or—CF circuit 55 whereby the clamp and sync. inverter 56 is controlled to clear all the delay circuits of the units counter. Therefore all circuit movement therein ceases at time 64.3 whereby the read out at the following time 65 is zero. Since the read out from the tens counter at this same time is 1, the combined read out is 10.

In Fig. 27 it is seen that at time 65.1 another incoming pulse is introduced in the units counter whereby the train of events depicted in Fig. 24 is reproduced. Thus the units counter will, if supplied with a train of incoming pulses, count continuously from 1 through 0 repeatedly.

Looking now at Fig. 28, it will be seen that as the first incoming pulse is introduced at time 64.2 the count of 1 will be reached at time 65.0. Thereafter at each read out time 66.0, 67.0, and so forth, the output decimal digit 1 will be transmitted. At time 74.2 another incoming pulse will be transmitted into the tens counter so that at time 75.0 the output will represent the decimal digit 2 and the combined output of the tens and units counters will be 20.

It is believed that charts 24 to 28 will be sufficient to show that the input to the different order counters occurs at time .1 for the units counter, time .2 for the tens counter, time .3 for the hundreds counter, and time .4 for the thousands counter. The read out from all counters occurs at time .0. In order to adjust for the different times of input, the four output leads D-1, D-2, D-4, and D-8 are differently arranged as above set forth.

It may be noted that in a normal and uninterrupted cycle of operation of the counter certain stages will be reached as follows:

| Stage | Time |
| --- | --- |
| 1st incoming pulse, units counter | 0.1 |
| 1st incoming pulse, tens counter | 9.2 |
| 1st incoming pulse, hundreds counter | 99.3 |
| 1st incoming pulse, thousands counter | 999.4 |
| Read out, decimal value 0001 | 1.0 |
| Read out, decimal value 0010 | 10.0 |
| Read out, decimal value 0100 | 100.0 |
| Read out, decimal value 1000 | 1000.0 |
| Read out, decimal value 1999 | 1999.0 |

Hereinbefore, and particularly in connection with Figs. 26, 27 and 28, the timing has been distorted in order to illustrate the fact that the counting may be interrupted and then resumed whereby the actual count achieved thus gets out of step with the time that has passed. Hereinafter, as an aid to a clear understanding, it will be assumed that the count has proceeded with regularity and that the time, in the second column of the charts, corresponds exactly to the value of the output decimal digit, as by way of example in Fig. 24, the time 3.0 corresponds exactly with the decimal digit 3 read out at that time.

In accordance with one feature of the invention the cathode ray tubes used for electrostatic storage may be used in one arrangement to provide 2000 spots for storage or alternatively 3600 spots for storage. In accordance with the arrangement of the tubes and the rasters over which the beams thereof travel and which will be more fully described presently, there are 3600 locations, 900 on each of four tubes each defined by the intersection of two lines, one horizontal and the other vertical and measured in terms of horizontal and vertical deflection weights. Each spot is numbered and as the beam traverses its raster it comes to rest for a given time period on the spot numbered to correspond with the count reached by the controlling decade counter. Thus as the count 1523 is reached the beams of the D tubes are each aimed at the spot numbered 1523 (address 1523) regardless of the mode of operation, that is, whether the tubes are operating over the 2000 range or the 3600 range.

A simple two position switch is provided on the control console to select the range of operation and counters are controlled in such way that a count from 0 to 1999 inclusive is made repeatedly, that is as the count 1999 is made the counters are all cleared so that at the next succeeding incoming pulse the zero count as the beginning of the next cycle is made. Since each count consumes eight microseconds of one octal cycle a complete 2000 count is made in 16000 microseconds, or 16 milliseconds, and without any interruptions the raster will be traversed sixty-two and a half times per second. This is more than sufficient for the purpose so that a good many interruptions of the count may be allowed before this rate is lowered beyond the lower limit imposed by conditions to be described directly.

When the selector switch is set at 2000, then the circuits of the device are enabled so that just after the count of 1999 is made the decade counters will be cleared and they will then be in condition to start the count anew, this being done repeatedly.

When the selector switch is set at 3600, then the circuits of the device are enabled so that just after the count of 1999 is made the decade counters will be cleared, counts 0 to 399 will be made (a second time) the counters cleared, the counters reset at 2000 and the counts to 3599 made, this cycle of four thousand counts, including a double count of 0 to 399 being repeated continuously.

It will be shown hereinafter that in the 2000 count arrangement the storage spots on the faces of the cathode ray tubes are equally spaced. In order to utilize an additional 1600 spots for the 3600 spot arrangement, these are located in between the spots of 1600 of those used, so that the spacing is half as much as that used in the 2000 spot arrangement. Thus in the 3600 spot arrangement there are 400 spots widely spaced which are traversed once each 16 milliseconds and 1600 spots closely spaced which are traversed once each 32 milliseconds. It will be pointed out that the more closely the spots are located the less often they must be energized to avoid the effects of "spill over," always regenerating the condition at each spot often enough to avoid the loss of the record established.

Charts 29 to 33 inclusive are provided to give a clear picture of the circuit movements within the various orders of the counter to show how they are recycled in accordance with the two alternative plans of operation. The time values set forth in the first column constitute the exact times in an uninterrupted cycle. Thus at time 1999.0 (Fig. 29) the count 1999 is reached. At time 1999.5 in the thousands counter the output of Delay 1 circuit has entered the binary adder to produce a sum output therefrom and to energize the Delay 2 circuit. This output of the Delay 1 circuit constitutes the A terminal of this counter so that it will be seen in Fig. 35 that if the CRT capacity switch is in the position as shown that coincidence will be established in the And circuit 5141 with results to be described, whereas if the CRT capacity switch is in its alternative position then coincidence will be established in And circuit 5142 with other results to be described. The upper part of the chart Fig. 29 portrays the circuit movements in the thousands counter and since this counter is cleared at time 1999.5 the chart would naturally be blank thereafter until a count of 1000 has been achieved thereafter. Therefore the lower part of the chart is devoted to the units counter to show how the counter starts a new count, the first incoming pulse thereto arriving at time 0000.1, just after the output decimal value 0000 has been manifested.

Fig. 30 is similar to Fig. 29 except that the thousands counter is manifesting the output digit 3 instead of the output digit 1 as in Fig. 29. Thus at time 3599.4 the D-1 and D-8 terminals of the thousands counter are Up and since it will be assumed that the CRT Capacity Switch is in its alternative position and it will be shown (Fig. 31) that the A terminal and the D-1 terminal of the hundred's counter are also Up, then coincidence will be established in And circuit 5142 (Fig. 35) with results to be described. The lower half of Fig. 30 is an exact copy of the lower half of Fig. 29 and shows the start of a new count after the value 3599 has been reached.

Fig. 31 shows the circuit movement in the hundred's counter at the same times as covered by the chart of Fig. 30. It will be noted that at time 3599.3 the carry pulse is received from the tens counter which would cause the record in the hundreds counter to advance from 5 to 6, so that this combined with the output of the Delay 5 circuit produces a binary adder carry pulse which energizes the Delay 1 circuit. In the following interval, time 3599.4, the output of the Delay 1 circuit passes through the binary adder to produce a sum output therefrom and this is manifested as an Up condition on the A terminal. Since the Delay 5 circuit is also active at this time, the D-1 terminal of the hundreds counter will also be Up to produce, as hereinbefore mentioned, coincidence in the And circuit 5142.

It has been mentioned hereinabove that when the CRT Capacity Switch is set for the 3600 operation, 4000 counts are made, first the 2000 counts, 0 to 1999 inclusive, second 400 counts, 0 to 399 inclusive (a second time), and third 1600 counts, 2000 to 3599 inclusive. Thus at time 399.5 (the second occurrence thereof) the counters are cleared as shown in Fig. 30 and the thousands counter is reset to 2, as indicated in Fig. 32. It will be shown shortly (Fig. 33) that at time 399.4, terminals A and D-8 of the hundreds counter will be Up and that coincidence will be established in And circuit 5149. The output of And circuit 5149 leads into the Delay circuit 5171 so that the following microsecond, time 399.5, through the OF circuit 5173 a pulse is applied to the D-1 terminal of the thousands counter thus energizing the Delay 5 circuit therein and starting a circuit movement therein which will produce an output of 2 at the following read out time.

Fig. 32 is a chart showing the pulse applied to the D-8 terminal of the thousands counter. This is immediately passed through the binary adder to produce a sum output and cause the energization of the Delay 2 circuit whereby the circuit movement in this thousand's counter is started. Three microseconds later at the next .0 time the count of 2 will be produced and since the hundreds, tens, and units counters are now cleared, the complete count will be 2000.

Fig. 33 shows the circuit movements in the hundreds counter at the time 399.4. The Delay 1 is active at time 399.3, so that it produces an Up condition on its output terminal A at time 399.4. This chart also shows an Up condition on its D-8 terminal so that at time 399.4 coincidence will be established in And circuit 5149 for the purpose stated, that is 399.5 and also to energize the Inv circuit 5158 to release the latch for controlling this 3600 count cycle.

Let us now examine some of the circuit details for controlling the convertible aspects of the present invention. Fig. 34 is a block diagram showing how the three sheets carrying Figs. 35, 36 and 37 may be placed to form a complete logical circuit diagram for this purpose. In the upper left hand corner of Fig. 35 a manually operated two pole two position switch marked CRT Capacity Switch is shown. This is a switch placed at the control console which in one position, that shown, arranges the circuits so that 2000 addresses are available. If the switch is changed to its alternative position, then the capacity is increased to 3600 addresses, no other changes having to be made. Each blade of this switch is arranged so that in one position it will produce an Up condition (+10 volts) on a control wire and in the other position will produce a Down condition on this same wire. As shown, wire 66 is Up and wire 67 is Down and under these circumstances a capacity of 2000 addresses is provided. This means that the regeneration counter will count 2000 (0 to 1999 inclusive) and then be recycled. Thus after the counter has been properly started and the thousands counter has reached the time 1999.5, as explained hereinbefore, the right hand input of And circuit 5141 will be Up and since the left hand input is normally Up coincidence therein will be established and And circuit 5141 will pass this Up condition to Or circuit 5175. Or circuit 5175 becomes active and passes the Up condition on its output to and through the CF circuit 5181, thus operating the clamp and sync. inverters of the various counters to clear all of them. Later, at time 0000 (which otherwise would have been 2000) the output 0000 would read out and at time 0000.1 the next pulse to the units counter would be introduced therein to start the counting anew. In this manner the regeneration counter will repeatedly count 2000 and then become recycled. As explained hereinbefore the counting may be interrupted at any time for any purpose, such as reading in information to a given idle address, reading out information from a given address or reading out one word and entering another and different word at a given address. Thereafter the counting will be resumed at the point where it was interrupted.

Let it now be assumed that the CRT Capacity Switch is moved to its alternative position where the conductor 66 is Down and the Conductor 67 is Up. As the counting starts at 0000.1 time the regeneration counter will operate over an irregular cycle from zero completely through 3599 before settling down to the regular cycle depicted in Fig. 38.

At time 3599.4, wire 67 being Up and the D-1 and D-8 terminals of the thousands counter and the A and D-1 terminals of the hundreds counter also being Up, coincidence will be established at And circuit 5142. As a result the left hand input terminal of Or circuit 5168 will go Up and Delay circuit 5169 will be energized. In the following interval an Up condition will be placed on the right hand input of And circuit 5146. The middle input of And circuit 5146 is normally Up since it comes from the output of Inv 5145 and likewise the left hand input of And circuit 5146 is normally Up since it comes from the output of Inv circuit 5157. Therefore the output of And circuit 5146 goes Up and passes this condition through the Or circuit 5168 to Delay circuit 5169. This roundabout circuit through And circuit 5146, or circuit 5168, and Delay circuit 5169 constitutes latch number 1 and this will continue to operate continuously thereafter keeping an Up condition on the output of Delay circuit 5169 until either Inv 5145 or Inv 5157 is energized. The regeneration counter therefore counts from zero to 1999 inclusive as depicted in Fig. 38.

At time 1999.5 the terminal A in the thousands counter is Up and therefore coincidence is established in And circuit 5147 whereby an Up condition is transmitted to Inv circuit 5145 thereby releasing And circuit 5146. At time 1999.6 the output of Delay circuit 5169 is Down and therefore the latch 1 is dropped out.

At time 1999.5 the Up condition on the output of And circuit 5147 is also passed through Or circuit 5165 to the right hand input of And circuit 5144. The next to the right hand input of this And circuit is Up as it comes from the output of Inv circuit 5157. The next to the left hand input of this And circuit is connected to conductor 67 and is therefore Up and the left hand input is normally Up as it is connected through and armature 68 of the Test-Normal relay (shown elsewhere) and is therefore connected to an Up potential (+10 volts) so long as the device is under normal operation. Hence coincidence is established in And circuit 5144 and the Up condition at its output is passed through Or circuit 5180, and CF circuit 5181 to operate the clamp and sync. inverters of the four orders of the counter and thus clear the counters so that at the next read out time (which otherwise would have been 2000) the output will read 0000.

The Up condition on the output of And circuit at time 1999.5 will be passed through Or circuit 5167 to Delay circuit 5170 so that latch 2 including And circuit 5148 will be energized and act from this time on to supply an Up condition to the left hand input to And circuit 5149 awaiting the application of Up conditions on the A terminal and the D-8 terminal of the hundreds counter.

Now the counter will count from 0 to 399 inclusive as indicated in Fig. 38. At time 399.5 the conditions just above stated will result in the establishment of coincidence in And circuit 5149 whereupon an Up condition will be transmitted to Inv circuit 5158 and latch 2 will be released.

As a result of the operation of And circuit 5149 an Up condition will be passed through Or circuit 5165 to the right hand input of And circuit 5144 and since the other input terminals of this And circuit are Up as hereinbefore explained, the output of And circuit 5144 will go Up and will be passed through Or circuit 5180 and CF circuit 5181 to clear all four orders of the counter.

Also it will be noted that the Up condition at the output of And circuit 5149 will be passed to Delay circuit 5171 so that one microsecond after the counters have been cleared an Up condition will appear at the output of this Delay circuit 5171 and will be passed through the CF circuit to the common cathode Or circuit leading to the D-1 terminal of the thousands counter thus setting this counter to 2. Hence the count following the count 399 will be 2000. Following this, as indicated in Fig. 38, the counter will count 2000 to 3599 inclusive whereafter this cycle will be repeated.

Thus it will appear that while the CRT Capacity Switch is in one position (that shown) the counter will repeatedly go over its short cycle counting 0 to 1999, whereas if it is in its alternative position it will repeatedly perform its long cycle of 4000 counts, as indicated in Fig. 38.

It may be noted that while the CRT Capacity Switch is in its alternative position, an Up condition is transmitted to the indicator amplifier which is a simple CF circuit and which will result in the continuous energization of a relay 70 to cause the indicator lamp 71 mounted at the control console to glow.

Fig. 39 is a thumbnail sketch of the common cathode Or circuit used to reset the thousands order counter. The output of the Delay 5 circuit 51 is controlled by a cathode follower tube having the conventional pull down resistor to a source of negative potential whereby the output terminal D-8 goes Up when the tube is rendered conductive. The CF circuit 5173 has a similar cathode follower tube but no pull down resistor. Instead the cathode of the tube of circuit 5173 is connected to the cathode of the output tube of Delay 5 circuit 51. This combination constitutes an Or circuit, for if either one or the other of these tubes is rendered active then the output terminal D-8 will be moved Up.

Fig. 40 is a sketch showing the comparative location of the numbered spots on the A tube when used in the 2000 address system. It will be noted that for each code place for each digit of the word to be stored there are four tubes, known as the A tube, the B tube, the C tube, and the D tube. The first spot, numbered 0000 is located on the A tube, the second spot, numbered 0001 is located on the B tube, the third spot, numbered 0002 is located on the C tube, and the fourth spot, numbered 0003 is located on the D tube. In rotation then, the beams of the four tubes A, B, C and D are rendered effective in sequence and this is repeated so that each tube carries spots numbered in multiples of four. Thus, in making the first count of 400 the beam of the A tube will traverse the 100 spots numbered 0000, and every fourth number thereafter to and including spot number 0396. The path traced by the beam during this operation is shown in Fig. 42.

It is to be noted that the spacing of these spots is defined by vertical and horizontal coordinates designated vertical and horizontal deflection weights respectively and this is an indication of the comparative potentials applied to the vertical and horizontal deflection plates of these cathode ray tubes.

Each tube accommodates 500 spots, 100 in the upper left hand corner, numbered 0000 to 0396, 150 in the lower left hand corner numbered 0400 to 0996, 100 in the upper right hand corner numbered 1000 to 1396, and 150 in the lower right hand corner numbered 1400 to 1996.

The arrangement of the additional 1600 spots employed in the 3600 address system is indicated in Fig. 41. Here 400 additional spots on each tube are squeezed between the spots numbered 0400 to 1996 at the same vertical deflection weight coordinates but at half value horizontal weights. Thus, where spot 1000 is defined as on the 0 vertical and 11 horizontal weight coordinates, the spot 2000 is defined as on the 0 vertical and 11½ horizontal weight coordinates.

Fig. 42 shows the path traced by the beams of the tubes in traversing spots 0 to 1999 when used in the 2000 address arrangement. This also represents the first half cycle of the raster for the 3600 address arrangement. Fig. 43 shows the path traced by the beams of the tubes when used in the 3600 address arrangement. It may be noted that the path shown in Fig. 43 is generally similar to but not the same as that shown in Fig. 42.

It is believed that these two figures will give a clear picture of, first, how the 2000 addresses of one arrangement are reached and, second, how the 3600 addresses of the other arrangement are reached in 4000 steps, the spots 0 to 399 being traversed twice as explained hereinbefore.

It may be noted at this point that the order in which one address follows another, that is, the configuration of the raster, in this embodiment of the invention, is a function of the decoded translation of the address codes. It will readily be understood that the address codes for the numbers 400 to 1999 (see Fig. 42) are different from the address codes for the numbers 2000 to 3599 and that the rasters for these two groups will accordingly be different. Since there is no virtue in any particular location for the spot of an address, the great regularity in the location of address spots in prior art systems has given way to economy in apparatus. To determine the particular location of a given address it is now necessary to determine the ordinate and abscissa thereof from the sums of the deflection decoded address code.

Figs. 44 and 45 form a chart showing the coding of the addresses as produced by the regeneration counter, or as produced by any other source, such as the V Field, and the decoding thereof to produce the proper horizontal and vertical deflection potentials for aiming the beams of the cathode ray tubes to the precise spots on the faces thereof representing such addresses. The first column of these charts contain the decimal designation of the addresses and the next fourteen columns contain the decimal binary Bit designations corresponding thereto. It will appear that each Bit path leads first through a pulse stretcher, after which it divides into two paths one leading through an inverter and the other leading directly to the decoding circuits. All of the Bit output paths from the pulse stretchers lead into the decoding circuits, but only a selected few from the inverters lead thereinto.

The pulse stretcher is essentially an inverter but is special in that an input of an Up condition lasting for but a single microsecond (at the read out time N.0) is converted into a Down condition lasting for an entire octal cycle (from N.06 to N1.06).

Therefore there is a full complement of address Bits each expressed as a Down condition lasting for a full octal cycle and a selected few of such signals inverted leading into the decoding circuits.

These inputs into the decoding circuits are led through the logical circuit components thereof to control the inputs to the current adder tubes of the cascode amplifiers used to provide the proper horizontal and vertical deflection potentials. Each dual current adder tube represents a different deflection weight and the final deflection potential produced depends on the numerical sum of the different deflection weights simultaneously produced.

In these charts the next twelve columns represent the six horizontal and six vertical deflection weights (employed in the present embodiment of the invention).

The last two columns represent the total horizontal and vertical deflection weights so that by following along the horizontal row in these charts, the address may be noted, then the binary Bit coding representative thereof found on the counter output terminals, then the deflection weight addends represented by the particular current adder tubes operated, and finally the deflection weight sums represented by the output of the cascode amplifiers.

By way of example, the last address listed, 3092, is represented by the thousands 1 and 2 Bits, the tens 1 and 8 Bits, and the units 2 Bits. Signals on these output terminals are decoded in the decoder circuits into signals for the operation of the horizontal ½, 1 and 2 addend current adder tubes and the vertical 11, 1, 2 and 1 addend current adder tubes so that the totals come to 3½ horizontal and 15 vertical. The location of the spot defined by these deflection weights will be at once apparent in Fig. 41.

Fig. 46 consists of two nests of graphs representing the same conditions depicted in the six columns of horizontal deflection weights and the six columns of vertical deflection weights of Figs. 44 and 45. In this figure the total horizontal or vertical deflection weight is the sum of the separate weights shown as Up at each vertical ordinate, which is numbered in accordance with these totals.

Since the translation of the address codes into the horizontal and vertical deflection weights are given in Figs. 44 and 45 for the entire range, it is a simple matter to make any other combination desired whereby the proper deflection weights may be determined.

Figs. 48, 49 and 50, arranged as indicated in Fig. 47, show a decoder circuit for translating the decimal binary code of an address into horizontal and vertical deflection weights to operate the cascode amplifier current tubes of Figs. 51 and 52.

Figure 5:
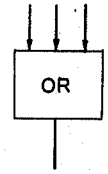
Fig. 5 is a symbol used in the logical diagrams to represent the Or circuit of Fig. 2.

The operation of the cascode amplifier has been fully set forth in the said Havens and Deerhake application Serial Number 444,253, filed July 19, 1954, so the present application will not be burdened with a complete and detailed description thereof. It need only be pointed out at the present time that tube 75 is the upper triode of the cascode amplifier to whose anodes the vertical deflection potential circuits are connected. The tubes 76, 77, 78, 79, 80 and 81 are lower triodes, each acting as a current adder addend tube adjusted (by the value of their cathode load resistors) to produce a current to the cathode of the upper triode equivalent to the weights 1, 5, 11, 5, 1 and 2 respectively. Normally the left portion of each of these dual triodes is in a conducting state whereby a maximum current flows to the cathode of the left portion of the upper triode 75 and produces a potential value at the anodes of this tube to hold the beams of the cathode ray tubes on their zero abscissas. Take the tube 77, by way of example. Normally the conductor 82 is Up and the conductor 83 is Down whereby the left portion of this dual tube is conductive and the right portion is non-conductive. If these conditions are reversed, then the current flowing from the anode of the left portion will be lessened by an amount representative of the weight of 5 and the current flowing into the cathode of the right portion of the upper triode 75 will be increased by this same amount whereby the deflection potential will be so adjusted that the beam will move along its vertical axis a distance of five abscissas. In Figs. 51 and 52 these weights are indicated by the values placed between the conductors of each pair. Thus the figure 5 placed between conductors 82 and 83 indicates that the tube 77 to which these conductors lead controls currents equivalent to the weight of 5.

Now let us trace the circuits affected by the transmission of the decimal binary code for the address 3092. The conductors over which this code is transmitted are shown as entering the circuit of the decoder at the top of Fig. 48 in the form of Bits and Inverse Bits for the four orders used to express the decimal numbers of the addresses. Normally, when the counter or other source is expressing zero, all Bits will be Down and all Inverse Bits will be Up. When the address 3092 is being expressed, the thousands 2 and 1 Bits will be Up and the thousands 2 and 1 Inverse Bits will be Down, the hundreds 1 Bit will be Down and the hundreds 1, 2, 4 and 8 Inverse Bits will be Up, the tens 8 Bit will be Up, the tens 8 and 1 Inverse Bits will be Down, and the tens 4 and 2 Bits will be Up, the units 1 Bit will be Down, the units 8, 4 and 1 Inverse Bits will be Up and the units 2 Inverse Bit will be Down.

Since the tens 8 Bit is Up, conductor 93 will be Up and the right hand portion of tube 76 will be conductive. Since the tens 8 Inverse Bit will be Down conductor 92 will be Down and the left hand portion of tube 76 will be non-conductive. Therefore the weight 1 will be effective.

Since the hundreds 4 Inverse Bit is Up the left hand input of Or circuit 4974 will be Up and this Up condition will be passed to the right hand input of And circuit 4972. Since the hundreds 8 Inverse Bit is Up the left hand input of And circuit 4972 will be Up and coincidence will be established therein with the result that conductor 82 will be Up. Since conductor 82 leads into the left section of Inv 4967 the output conductor 83 will be Down. With conductor 82 Up and conductor 83 Down, tube 72 will remain normal and the weight 5 will be ineffective.

Since both the thousands 2 and 1 Inverse Bits are Down, the output of Or circuit 4973 will be Down and consequently since the middle input of And circuit 4971 is Down conductor 84 will be Down. Since this conductor is the input to the middle portion of Inv 4967 the output conductor 84 thereof will be Up. Since conductor 84 is Down and conductor 85 is Up, tube 78 will be active to add current for the weight 11.

The left hand input of And circuit 4970 comes from the hundreds 8 Inverse Bit, which is Up. The middle input of And circuit 4920 comes from the hundreds 2 Inverse Bit, which is Up, and the right hand input of And circuit 4970 comes from the output of Or circuit 4974 which is Up, as above set forth. Therefore coincidence is established in And circuit 4970 so that its output conductor 86 is Up. This being so, the right hand portion of Inv 4967 is active so that its output conductor 87 is Down. With conductor 86 Up and conductor 87 Down, tube 79 is normal and the weight 5 is not added.

Since the tens 8 Bit is Up, the left hand input of And circuit 4968 is Down, whereby coincidence cannot be established in this And circuit and the output conductor 88 will be Down. With conductor 88 forming the input to the right hand portion of Inv 4966, the output thereof, conductor 89 will be Up. With conductor 88 Down and conductor 89 Up, the tube 80 will be effective to add the weight 1.

Since the tens 8 Inverse Bit is Down, the left hand input of And circuit 4969 is Down and coincidence cannot be established in this And circuit. Therefore conductor 90 will be Down and since this also forms the input of the left portion of Inv 4966 the output 91 is Up. With conductor 90 Down and conductor 91 Up, the tube 81 will be effective to add the weight 2.

Therefore the weights 11, 1, 2 and 1 may be summed to produce the total of 15 and some one of the spots along the abscissa 15, Figs. 40 or 41, will be the target of the beams.

Through a similar tracing of circuits it may easily be determined that conductors 104, 95, 96, 98, 101 and 103 are Up and that conductors 105, 94, 97, 99, 100 and 102 are Down whereupon it will appear that the weights ½, 2 and 1 when summed will yield the total 3½. Therefore the ordinate 3½ will be the target of the beams. The precise spot will be at the intersection of abscissa 15 and ordinate 3½ and this will represent the address 3092.

It has been pointed out hereinbefore that the address spots are coordinately arranged on the face of each cathode ray tube and that they are also arranged within an area that is a perfect square. Therefore since there are a lesser number of ordinates (20) than abscissas (25) the spacing between ordinates is greater. However, when the device is converted to the arrangement for 3600 addresses, the number of ordinates is doubled and therefore the spacing between abscissas becomes greater.

Due to the effects of spill over of electronic debris it is necessary to direct the Bit sweep for converting a dot to a dash in the direction of the greater room. Hence in the 2000 address arrangement the Bit sweep is in a horizontal direction and an incremental value is added to the horizontal deflection circuit to produce a sweep over the time N.46 to Nl.00.

In the drawings, Figs. 48 and 49, the Bit sweep gate conductor 106 supplies a steady stream of signals through the Or circuit 4958 to the vertical deflection cascode amplifier (Fig. 51) and through the Or circuit 4940 to the horizontal deflection cascode amplifier (Fig. 52), whereby, lacking other arrangements about to be described, both these deflection potential generators would constantly produce a Bit sweep during each octal cycle. However, it is desired that only one or the other of the cascode amplifiers be thus controlled; therefore means to blank out this steady stream of signals to one or the other cascode amplifier is provided.

When the cathode ray capacity switch on the control console is set to the 2000 capacity, then the conductor 66 is marked as Up and this Up condition is passed steadily through the Or circuit 4958 to the conductor 107 leading to control of tube 108 so that the steady stream of pulses otherwise transmitted thereto will be ineffective and no vertical sweep will be caused during the period when the capacity switch is so set. By a similar arrangement the steady stream of pulses on conductor 106 will successfully pass through Or circuit 4940 and thence over conductor 109 to a similar tube in the horizontal deflection circuit so that there will be produced therein a Bit sweep.

When the cathode ray capacity switch on the control console is set to the 3600 capacity then the conductor 67 is marked as Up so that during the traverse of spots having either a horizontal weight addend of 11 or a vertical weight addend of 11, And circuit 4935 or And circuit 4941 respectively will be operative and the steady stream of gate signals through Or circuit 4940 will be blanked out. It will be noted, however, that even when the cathode ray tube capacity switch is set to 3600, neither of the And circuits 4935 and 4941 will be effectively operated during the counting of addresses 0 to 399, since no one of the codes therefor includes a weight addend of 11. Therefore the horizontal sweep is effective during the counting of 0 to 399 in both the two positions of the cathode ray tube capacity switch.

By the same token, when a weight addend of 11 is not present in either the horizontal sum or the vertical sum, the two inputs of the And circuit 4959 will be Up and the output thereof will be passed through the Or circuit 4958 to blank out the operation of the Bit sweep means in the vertical deflection circuit.

Thus means is provided to write a dash automatically in the direction of the greater room between adjacent spots on the face of the tubes.

Among the fundamental arrangements of the device of the present invention, all of which, about to be shortly described, are fully disclosed in the said Havens and Deerhake application Serial Number 444,253 filed July 19, 1954, is first and foremost a source of alternating current having an accurately controlled frequency of one megacycle. Using this as a primary control the various clamp and sync. pulses for operating the delay circuits are derived and using these delay circuits such devices as the octal commutator and the decade counter are fashioned. There are then a number of special circuits for deriving accurately timed pulses for various control circuits, each of which is important for the part it plays but all of which may be considered conventional herein since each has been completely described in one or more of the applications hereinbefore set forth. The present application will not be burdened with a complete and detailed description of each said special circuit since such a description is readily available elsewhere. These circuits are as follows.

The rectangle 110 in Fig. 60, labelled Bit Sweep Generator is a device for furnishing a constant stream of pulses over the lead 661.90 known as the Bit Sweep Gate and shown in Fig. 48 as an input to the Or circuit 4958 leading to the vertical deflection circuit where it controls the tube 108, and in Fig. 49 as an input to the Or circuit 4940 leading to the horizontal deflection circuit. The circuit within the rectangle 110 is actually a pulse stretcher which responds to a pulse supplied by And circuit 5219 at time N.46 to change the normally Up condition on terminal 661.90 to a Down condition which then is maintained until the pull up pulse at time N1.06 restores this normally Up condition.

Looking at Fig. 51 it will be noted that when conductor 107 is available for use (that is, when the signals are not blanked out as by a steady Up condition on the right hand input of Or circuit 4958) then the grid of tube 108 will be driven Down from time N.46 to time N1.06 during which time the condensers 111 and 112 will slowly discharge and by gradually reducing the potential on the right hand grid of (Class A) tube 113 will affect this current adder tube to move the beams of the cathode ray tubes slightly off center to write a dash instead of a dot. As the beams of the cathode ray tubes are moved over their rasters, information may be stored at the various addresses by writing dots or dashes thereat, the dot being manifested as a positive potential gradient and the dash being manifested as a negative potential gradient. The dash deflection is actually a part of the raster, for the beam not only moves from one address spot to an adjacent one but also invariably moves slowly off the spot either horizontally or vertically so that the Bit Sweep Generator is a means for supplying a continuous stream of pulses properly timed to cause this horizontal or vertical deflection of the beam in addition to the primary control directing the beam from one spot to the next.

This operation may be seen in Fig. 64 where the set of graphs includes first the sync. pulse wave form, a regular succession of pulses, derived from the fundamental megacycle wave, each sync. pulse lasting for the last four tenths of the cycle, that is, by way of example from time N.06 to time N.10. The next graph shows the N.4 pulse as provided by the octal commutator and which is used by the pulse stretcher to control the output thereof. It will be noted in Fig. 60 that the And circuit 5219 has two inputs, one supplying the sync. pulses and the other supplying the N.4 pulse so that coincidence is established at time N.46, to move the output of the pulse stretcher to Down at this time.

The next graph shows the pull-up pulse which constitutes a pip derived by the pull-up pulse generator 115 from the fundamental megacycle wave occurring regularly at time N.06 and lasting effectively no longer than time N.08. This pull-up pulse is employed for various purposes, one of which as above mentioned is to discharge the pulse stretcher forming the main part of the circuit in rectangle 110, so that its output will go back to Up at time N1.06. The next graph shows the output of the pulse stretcher and actually constitutes the waveform of the potentials delivered over the terminal 661.90 to control the tube 108 in the vertical deflection circuit or a similar tube in the horizontal deflection circuit. The last graph shows a waveform which represents the effect produced by the current adder tube 113 whereby the position of the beam focused on a given address is moved slightly to one side to write a dash.

Fig. 65 and Fig. 66 are included herein for ready reference though a complete description is contained in the said Havens and Deerhake application. As shown in Fig. 65 the top graph is somewhat in the nature of a cross-sectional view depicting the potential gradients produced in the coating on the face of a cathode ray tube where a dot has been written. It forms what may be termed a mound surrounded by a moat, the mound being a positive potential gradient and the moat being a negative potential gradient. If this could be represented by a plan view it would appear somewhat as a dot (solid black representing a positive potential) surrounded by a ring (hatched area representing a negative potential). These areas are on a much smaller scale than the mound and the moat graph to the left thereof.

When a dash is to be written, the beam is first focused and then moved from its initial position to its final position whereby the moat is drawn out leaving a trough of negative potential gradient. The result is that where these potentials are sensed, always at the initial position of the beam, a previously written dot expressed as a positive potential gradient will cause no net change to be effected, that is the sensing of a dot will produce a negative result since the change is from positive to positive. However, when a dash, expressed at this initial position is encountered there will be a net positive change from a negative potential gradient to a positive potential gradient. The sensing operation, in a word, is the focusing of the beam on the initial position, which at this instant would tend to write in a dot, that is to establish a positive potential gradient and this tendency will produce a change only if the potential gradient previously established is negative.

Let it be clearly understood that a dot is represented by an established positive potential gradient and is detected or sensed as a negative (none) change. A dash is represented by an established negative potential gradient and is detected or sensed as a positive (from negative to positive) change.

Fig. 66 shows the result of defocusing the beam as it is pointed to the initial position and then focusing it as it is moved off to one side to form a dash. By employing this technique, greater latitude in the accuracy of pointing the beam is gained, both the positive and the negative areas being increased.

Another circuit which may herein be considered conventional is the Pull-Up Pulse Generator, indicated by rectangle 115 in Fig. 60 and which derives the chain of pull-up pulses depicted in Fig. 64.

The Defocus Pulse Generator 116 is a circuit arrangement for fattening the beam as it is pointed to its initial position in order to produce the result depicted in Fig. 66.

The On Pulse circuit 114 is one which will produce an outgoing pulse shaped like a truncated pyramid and whose base extends in time from about N.40 to N.44, this pulse being adjustable in time for centering purposes and being used for triggering the pulse stretcher circuits associated with each cathode ray tube unit.

The Video Sample Timing Pulse Generator 117 is a circuit for producing a sharp pip at time N.46 and the Video Blank Gate 118 is a circuit consisting of a pulse stretcher, whose output is normally Up, which is triggered to Down at time N.40 and which remains Down until released by a Pull-Up Pulse at the following N1.06 time, and an inverter for converting this output to an Up condition extending from N.40 to N1.06. This Up condition is used to blank out existing information at an address when new information is to be read in. This circuit is responsive to a control pulse (N.40 to N.50) transmitted over a read in control terminal.

*General scheme of operation*

The general scheme of operation may be understood by a consideration of the schematic showing of the circuits and representations thereof laid out in Fig. 53.

When no information is being read into or being read out of any specific address, the regeneration counter control 120 shown in Fig. 54 will control the regeneration counter 121 to continuously count through its set range, one address being represented on its four decimal digit sets of code wires in each octal cycle. As set forth hereinbefore, if the CRT capacity switch (see the upper left hand corner of Fig. 55) is set (as shown) for a capacity of 2000 addresses, then the regeneration counter will count from 0 to 1999 inclusive and will repeat this cycle indefinitely, the information at each address in turn being sensed and then regenerated so that through the long persistence effect of the coating on the face of the cathode ray tube the recorded information may be retained. If the CRT capacity switch is set for a capacity of 3600 addresses, then the regeneration counter will go through a cycle of counting 0 to 399, 400 to 1999, 0 to 399, and 2000 to 3599. It may be noted that the circuits of the regeneration counter control have been shown in Figs. 35, 36 and 37, that the essential elements of a single decimal order of the counter have been shown in Fig. 22 and that the general schematic of the counter with its essential control and the address switch (rectangle 122 in Fig. 54) have been shown in Fig. 23.

The Address Switch 122 is a means for switching addresses in code from either the regeneration counter 121 or from some other source such as the V Field 123 into the pulse stretchers 124. These pulse stretchers are circuit components fully described in the said Havens and Deerhake application which convert the one microsecond position output pulses (at read out time N.0) into a full eight microsecond negative (Down) condition as depicted in the time chart within the rectangle 124. The outputs of the pulse stretchers are then each divided into two paths, one extending through an inverter (see rectangle 125) and the other directly to the decoding and the deflection circuits 126, shown in detail as indicated in Figs. 48 to 52 inclusive. In these circuits the addresses, in code, are converted into vertical and horizontal deflection potentials which are applied to sixty-six cathode ray tube units (see rectangle 127) each having four tubes, a total of 264 cathode ray tubes for driving the beams of these tubes over the rasters described hereinbefore. From these tubes there are sixty-six data lines over which data may be read in to or out of the various addresses.

The manner in which the data is stored at any given address is not described in detail herein since there is a full disclosure of the means and method of reading in and reading out such data in other disclosures herein considered conventional and especially in the said Havens and Deerhake application. The present invention is not considered with the actual storage of information but rather with the convertibility of the capacity of the storage facilities and the method of and means for the detection of unstandard conditions which may appear therein.

There is provided in the complete calculator of which the circuits and facilities herein disclosed are only a part, an arithmetic unit consisting primarily of three registers known as registers 1, 2 and 3 into which data may be read and out of which results may be taken over connections indicated by the multiple taps 128 to the sixty-six data lines near the bottom of Fig. 59. Patent 2,754,450 issued July 10, 1956, on an application filed as a division of the above noted application of George Francis Bland shows a means for displaying the information contained in these registers and in other registers containing pertinent information at any given time. Among these other registers is a four digit register known as the V Field, herein indicated in Fig. 56 by the rectangle 123. This is a register consisting primarily of a set of latches which stores the identity of an address. In this schematic representation it may be noted that the identity of an address may be taken off from the output of the inverters 125 transmitted over the wires 660.01 (units), 660.02 (tens), 660.03 (hundreds), and 660.04 (thousands), passed through the two position switch 129 and then transmitted over the wires 662.41 (units), 662.42 (tens), 662.43 (hundreds), and 662.44 (thousands) to the V Field 123.

Similarly, the identity of an address may be set up on the switches of Fig. 63 and under control of the control circuit 130 may be entered through the two position switch 129 into the V Field 123.

Further, when it is determined by the register display device that the V Field contains a wanted address this may be passed through the Address Switch 122 so as to set the beams of the cathode ray tubes on to that particular address for any desired purpose.

One of the checking circuits used in the calculator of which the circuits of the present invention are a part is the modulo 4 checking circuits 132 shown as a rectangle in Fig. 61. This is a means fully described in the Deerhake et al. application Serial Number 434,548 filed June 4, 1954. It may be shortly described as a calculator for adding the number of binary one bits included in a sixteen digit (64 code places) number, casting out any multiple of 4 included in the sum, and using the remainder (always less than 4) as an addend. It will be noted that the trunk 131 carries 66 wires and it will now be noted that the two not accounted for just above are used to carry an indicator, this being the 3's complement of the bit count modulo 4, this value having been fixed at some previous stage in the movement of the information, where the bit count was made, any multiple of 4 was cast out and the remainder subtracted from 3. This value (0, 1, 2 or 3) expressed by a combination of a 1 bit and a 2 bit on the 65th and 66th wires is then used as a second addend. A fixed value of one is then used as a third addend and the sum of these three addends must total 4, otherwise an error of some kind is indicated. The modulo 4 checking circuit has essentially two outputs, the output 533.04 indicating the failure to produce a 4 as the sum of the three addends above described and the output 533.09 indicating that some one or more of the four bit wires for each decimal digit code has indicated an erroneous value greater than nine. Thus the information being read out of some address or being read in to some address may be checked in transit and an indication of error passed eventually to the V Field control circuit 134, for purposes about to be described.

Looking at Fig. 55 it may be noted that either relay 135 or relay 136 will place a Down condition on the CF circuit 137 and that this in turn will place a Down condition on the clear lead 661.62 leading to the Modulo 2 latches 138. The CRT check reset pushbutton 139 will operate the relay 136 and the simultaneous operation of the Reset Interlock Pushbutton 140 and the CRT reset pushbutton 141 as well as the Modulo 2 Reset pushbutton 142 through the Or circuit 143 will operate the relay 135. When either of these relays has operated the Modulo 2 latches, described in the said Deerhake et al. application Serial Number 465,076 filed October 27, 1954, will be cleared and when the clear condition on lead 661.62 is relaxed will be ready for another operation.

The Modulo 2 latches starting from some time when the lead 661.62 has been brought Up will then accept each new "word" as it is entered into one or another of the addresses. Each of these latches being an "on" and "off" device may therefore be "on" or "off" as a result of the odd or even number of binary 0 bits represented during a plurality of acceptances of new words.

Let us say that of the two thousand (or 3600) addresses, fifteen hundred are in use and let us further say that of the fifteen hundred new words accepted, 951 have had a binary 0 in a particular code place corresponding to a particular Modulo 2 latch. In that case this particular Modulo 2 latch would have operated 951 times to an odd condition and would therefore be "on," that is, its lamp would be lighted.

Now each of the other sixty-five latches would also have been operated an indefinite number of times and some would be "on" and others would be "off." The pattern of lighted lamps, constantly changing in the normal operation of the calculator due to the constant entry of new words in various addresses, would mean nothing, other than to idly note that each has been operated an odd or an even number of times.

Now, however, it is desired to determine in which one of the sixty-six code places an error has occurred whereupon the count Modulo 2 pushbutton 144 is operated and then released. Upon its release (and at the following N.6 time) a single pulse from the single pulse generator 5143 (see Fig. 37) is transmitted. This has the effect of clearing the regeneration counter (note that the single pulse goes into Or circuit 5180 and places an Up condition on the clear lead 661.14) and causing it to go through one complete regeneration cycle of all the addresses without interruption for the entry of any new word. The single pulse from the single pulse generator 5143 triggers the latch composed of And circuit 5150, Or circuit 5164 and Delay 5172 and thus provides a steady Up condition on the left hand input terminal of And circuit 5151 so that the accept gate 661.18 may be moved Down at time N.5 in each following octal cycle until this latch is deenergized. This will happen when the counter being set for 2000 addresses reaches address 1999 (output of And circuit 5141 into Or circuit 5166 to operate Inv circuit 5156) or alternatively when the counter is set for 3600 addresses and it reaches address 3599 (output of And circuit 5142 into Or circuit 5166 to operate Inv circuit 5156. Thus the accept gate 661.18 is periodically driven Down so that each Modulo 2 latch will, for a second time, have to accept the same number of entries it had previously and over an indefinite period accepted. It will thus, regardless of this number, have accpeted an even number and its lamp will therefore be out. However, if an error in one of the sixty-six code places exists as through the failure of a CRT to record a proffered binary one bit or through the erroneous recording of a one bit which was not proffered, that particular Modulo 2 latch will count one more or one less than it had previously (through the mentioned indefinite period) counted and will thus, regardless of the number previously counted, now show the acceptance of an Odd number so that its lamp will be lighted. Following this the CRT Check Reset Pushbutton 139 is operated and then released. While operated the CF circuit 137 will be released so that the normally Up condition on the clear lead 661.62 is removed to allow all the Modulo 2 latches to return to normal. Also during this time the Or circuit 152 is operated to cause the operation of relay 153 which controls the single puse generator 145 (Fig. 37) so that on the release of the pushbutton 139 the regeneration counter is again caused to go through a complete and uninterrupted cycle while the accept gate lead 661.18 is Down whereby the record of the number of binary 0 bits in the address system is toted up on the Modulo 2 latches. Thereafter and over an indefinite period as each new word is entered into an address, this count of binary 0 bits will be increased as before described.

As further explanation of the operation of these Modulo 2 latches it may be noted in Fig. 37 that a lead (upper left corner) designated 060.02 is marked N.4. This lead is known as the write control and will be Up for one microsecond in an octal cycle which is used for reading in a word to some specific address. When this is Up it will energize the Or—Inv circuit 5163, during one microsecond directly from the 060.02 lead and during the following microsecond through the Delay 5160 so that for a two microsecond period the normally Up condition on the Or—Inv circuit 5163 will go Down and through the CF circuit 5174 will clear the accept gate lead 661.18. Thus at each read in operation the Modulo 2 latches are made responsive to the acceptance of a binary 0 on the corresponding one of the sixty-six data lines.

The Modulo 4 error latch 149 is responsive to a Modulo 4 error signalled by an Up condition on the lead 553.04 or on both leads 553.09 and 553.04. Such a latch is also shown and fully described in the said Deerhake et al. application above noted. As one result of such an error the Word Check failure signal lamp 150 will light up and an error signal will be transmitted over the lead 661.71 leading to the calculator for conventional purposes such as to block further action thereof until the error may be found and remedied. Also one of the four lamps designated A, B, C and D will light up to show which of the four cathode ray tubes of the units contains the address in which the error has occurred.

There is shown in Fig. 62 a single cathode ray tube unit containing the four tubes having identical horizontal and vertical deflection and tube selector circuits to the sixty-six such units indicated in rectangle 127. There is this difference, however, that the tubes 151 are not provided with pick up plates over their faces but are open so that they may be viewed. Therefore each will show a composite of the dots representing the 2000 addresses as shown in Fig. 40, or the 3600 addresses as shown in Fig. 41. There is also a connection 663.20 between the Modulo 4 Error Latch 149 and the CRT Check Address Indicator 151 by which a second dot is made to appear alongside of the dot representing the particular address in which the error appears, the circuitry for this display being fully described in the said Deerhake et al. application noted in the rectangle 151.

Now this visual indicator is a device by means of which the particular address containing the error may be identified, for by noting the coordinates of the double dot display the numerical identity of the address is made known. Thereafter by conventional methods the source of the error is tracked down and remedied. Merely by way of example, it may be stated that perhaps the phosphor coating of a particular cathode ray tube is deficient at that given address point so that when the address is known and the particular one of the sixty-six code place tubes has been identified, this tube may be replaced, with the result, verified by experience, that the error is remedied.

While this visual indicator is still retained and is of great value other means are now available in the improved means of the present invention. Attention is called to the register display device disclosed in the Patent 2,754,450, by means of which the information contained at any given time in certain registers and fields of the calculator may be displayed in the form of Arabic numerals. Among these is the so-called V Field which always contains a record of the numerical identity of the particular address from which or into which information is being passed at any given stage of a suboperation chosen by the operator from his knowledge of the programming of the calculator.

*Manipulation of the V Field*

In somewhat more detail the manner in which the V Field is employed in the detection and remedy of an error is shown in Figures 69, 70, 71 and 72 and in the chart, Figure 73. Here the use of certain pushbuttons on the console is set forth, each said pushbutton acting to produce a given result in the manipulation of the V Field. When an unstandard condition is detected, say by the Modulo 4 checking circuits (Fig. 61) and the word check failure lamp operated from the Modulo 4 error latch (Fig. 61) provides an indication that an error exists, the operator may depress the CRT check address pushbutton 146 which, as explained above, will condition the two position switch 129 so that the output of the regeneration counter will pass into the V Field. There, the address at which the error has occurred, is latched in so that through the register display device it may be displayed in the form of Arabic numerals and thus be made known to the operator. The operator knowing the particular address containing the unstandard condition may remedy the error by the manipulation of the pushbuttons and switches on the console.

A number of these pushbuttons, including the CRT check address pushbutton 146, are shown in the circuits of Figs. 70 and 71 and the results of their operation depicted in the chart of Fig. 73. Generally speaking each of these pushbuttons moving from its normal back contact frees a control wire which then goes Up and puts a Down condition on the common wire 780.00 which then sometime within the following 400 microseconds causes the transmission of a single pulse over the lead 770.01.

There is disclosed in patent application 470,570, filed November 23, 1954, a register display device by means of which information contained in certain registers and fields of the calculator may be displayed in the form of Arabic numerals. Since the existence of this data is transitory, the operator from his knowledge of the programming has means at his disposal to gate this information at any given count of suboperation. This means includes a counter which counts off four hundred microseconds in the form of fifty counts of complete octal cycles each embracing eight microseconds. The display means is therefore under control of a means which passes through a repeated four hundred microsecond cycle. The lead 4717 is actually the carry lead from the second unit of this counter and will therefore transmit a signal each time the counter has completed a count of four hundred and may therefore be used to trigger the single pulse generator 2079 so that operations started by this component will start in synchronism with the cathode ray display means.

In the chart Fig. 73 it is to be noted that the time at which the pushbutton 146, 5311, 5312, 5315, or 5316 is shown as going Up is the time at which the normal connection provided by the pushbutton is broken and that it may occur at random. Likewise the timing shown by the graph for the terminal 780.00 is the time at which any one of these pushbuttons makes contact to this terminal and this too occurs at random. The time elapsing between the changes shown in these two graphs is a measure of the time it takes for the pushbuton to travel from its back to its front contact and this is indefinite, depending on several factors such as the distance between these contacts and the speed with which the operator manipulates the pushbutton. While the first operation is one which establishes certain Up conditions on given And circuits, the second is controlling, for it is not until certain octal commutator intervals have occurred thereafter that the controlling pulses are transmitted.

It is to be noted that the desired effect of the operation of a pushbutton is strictly timed by the use of a single pulse generator which acts at a definite time sometime after the terminal 780.00 is affected to transmit the single pulse necessary to control the operation. This may be as much as 400 microseconds, or 50 complete octal cycles at time N.3. Thus, after the pushbutton (say 146) is fully depressed and the terminal 780.00 is brought Down from its normally Up condition coincidence of an N.3 octal pulse and a pulse (at an N.3 time) on the terminal 4717 is awaited. When this occurs the single pulse generator 2079 is activated and at the following N.4 time it transmits a pulse to the Delay 2083 which at time N.5 then transmits a pulse over terminal 770.01. Following this, at time N.6, the Delay 3020 transmits a pulse which is used by way of example, to produce coincidence in the And circuit 3029, then delayed for one microsecond by the Delay 3028 to time N.7 when it is applied to the terminal 070.05.

In the following description it will appear how the various terminals 070.05 to 070.13 inclusive are affected as shown in this chart.

Provision is included in the Calculator for making a Modulo 4 and greater-than-9 check of all the words in the CRT storage during a CRT regeneration cycle. Once each octal cycle the decade counters develop addresses which are fed into the CRT storage circuits for reading out a 17 digit word stored at a particular address onto the transfer bus (the 66 data lines 128, Fig. 59) for examination by the Modulo 4 checking circuits 132 for one of the two error conditions. However, this presupposes that a 17 digit word is not being read in or read out of CRT storage in the normal course of calculator operation. The regeneration cycle occurs and the 17 digit word located at the succeeding addresses developed by the decade counters is read out into the parallel bus for examination except in the following instances:

(1) When the Read Instruction circuit reads out an instruction word from CRT storage and inserts it into the Instruction Register.
(2) When the Read Operand 1 circuit reads out a 17 digit number for entry into Register 1.
(3) When the Read Operand 2 circuit reads out a 17 digit number for entry into Register 2.
(4) When the Read circuit enters the words into CRT storage after reading them from tape.
(5) When the Write circuit reads out the words from storage and enters them onto tape.
(6) When the Terminate circuit enters the result of an arithmetic operation present in Register 1 into CRT storage at the end of the Calculator suboperation cycle.
(7) When the Register, CRT Transfer Control circuit either reads into or reads out of CRT storage at a manually selected address.
(8) When the Scan circuit reads out words from CRT storage during a printing operation.

When none of the above eight functions is being performed by the Calculator, the CRT regeneration cycle is permitted to go on.

More specifically and referring to Fig. 23, when none of the above conditions exist, Or circuit 5140 is caused to be Down which condition is then reversed by inverter 5176 in order to cause the left input terminal of And circuit 5177 to be Up. Each N.0 time of an octal cycle a signal is received at the right input terminal of this And circuit 5177 from the Octal Commutator. Thus at N.0 time coincidence is established and a signal developed which energizes cathode follower 5179 and delay circuit 5178. In this way at an N.0 time a one microsecond signal is developed at output terminal 661.11 (65 in Fig. 23) and at N.1 time a one microsecond signal is developed at output terminal 661.12. (See also Fig. 54.)

It may be seen that the signal developed at input terminal 661.11 serves to gate the digits formed by the four decade counters 57, 58, 59 and 60 to various output terminals leading from the Address Switch 122 (Fig. 54) to set the CRT's on to a particular address. The digits developed at these output terminals are used to read-out a 17 digit word from CRT storage at the address which they form.

The signal developed at output terminal 661.12 (Fig. 54) is delivered through the Test Normal switch to cause output terminal 662.66 to go Up. Referring to Fig. 23 it will be seen that when a signal appears at terminal 662.66 it is delivered to the decade counter 57 which operates in such a manner that at the next N.0 time, determined by input terminal 651.11 being Up, an address one higher than the previous address will be gated through the switches 61–64 of Fig. 23 (Address switch 122 of Fig. 54) for reading out the succeeding 17 digit word. Since input terminal 662.66 goes Up one microsecond after the address is read out of the four counters, this means that at the next read-out time, that is N.0 time, the next higher address will be developed for reading out.

It will be recalled that when the CRT Check Address pushbutton 146 on the console is depressed, output terminal 786.10 shown in Figs. 55 and 70 is caused to go Up. This signal is then delivered to the 2 position switch 129 (Fig. 56) where it serves to gate the addresses developed by the decade counters mentioned above to the output terminals 662.41–662.44. From here the address developed during the regeneration cycle is applied directly to the V Field circuit 123. It is gated into the V Field by a signal developed by the circuit of Figs. 70 and 71 through the V Field control when the CRT Check Address pushbutton on the console is depressed.

When the pushbutton is depressed, as already explained, input terminal 876.10 goes Up. Looking at Figs. 70 and 71, this causes the left input terminal of And circuit 3053 to go Up. When a signal then appears at input terminal 770.01 at N.5 time, And circuit 3053 goes Up and the latch comprising Or circuit 3054, delay circuit 3055, and And circuit 3052 is energized. And circuit 3053 is Up for only a one miscosecond time interval because input terminal 770.01 is only Up for this time during any single continuous depression of the CRT Check Address pushbutton. Thus at N.6 time the upper input terminal of And circuit 3041 goes Up.

Coincidence is established at And circuit 3041 by the arrival of the N.6 signal from the Octal Commutator. This And circuit then energizes Or circuit 3035 and delay circuit 3036 in order to cause output terminal 070.06 to be Up for one microsecond at N.7 time. The signal at this output terminal is then fed to the V Field Control circuit (Fig. 72) where it causes output terminal 045.03 to be Up and output terminal 045.10 to go Down. When output terminal 045.10 is Down the address previously stored in the V Field circuit is erased and when output terminal 045.03 of the V Field Control circuit is Up the address developed by the regeneration counters at input terminals 662.41—662.44 is inserted into the V Field storage circuit.

During each N.7 time of an octal cycle the new address developed by the regeneration counters is entered into the V Field storage circuit. This is due to the fact that the latch, comprising And circuit 3052, Or circuit 3054 and delay circuit 3055, will continue to be energized during the continuous depression of the CRT Check Address pushbutton 146, provided that a greater-than-9 error or Modulo 4 error is not found in the 17 digit word read out of CRT storage and checked by the Word Check circuit. Thus at each N.6 time of an octal cycle, And circuit 3041 is Up operating Or circuit 3035 and delay circuit 3036 to cause output terminal 070.06 to go Up at N.7 time. Thus the previous address stored in the V Field is erased at the same time that the new address developed by the regeneration counters is entered, this process continuing until the Word Check circuit determines the existence of an error in a 17 digit word read out of CRT storage during any regeneration cycle.

The 17 digit word read out of CRT storage at any regeneration cycle is entered into the parallel bus at an N.5 time, at which time it is examined in parallel fashion by the Word Check circuit 132. If a greater-than-9 error is found to exist in this word, output terminal 553.09 is caused to be Up at an N.6 time. On the other hand, if a Modulo 4 error should exist, output terminal 553.04 goes Up one microsecond later or at an N.7 time. Both these signals are then delivered to the Register Error Storage circuit 555 (Fig. 56). The Modulo 4 error signal is fed directly to an Or circuit therein whereas the greater-than-9 error signal passes through a delay circuit before reaching the same Or circuit. Therefore, at an N.7 time, in either event, output terminal 555.08 of the Register Error Storage circuit goes Up.

When this output terminal is Up, coincidence is established at the And circuit 3056 (Fig. 56 and Figs. 70 and 71) with the N.7 signal from the Octal Commutator. When And circuit 3056 is Up, inverter 3057 is made conductive and coincidence is thereby removed from And circuit 3052. De-energization of this And circuit for a one microsecond time interval ends the operation of the latch comprising this And circuit, Or circuit 3054, and delay circuit 3055. This means that at an N.0 time the upper input terminal of And circuit 3041 goes Down and coincidence can no longer be developed at this And circuit by the N.6 signal from the octal commutator during this continuous depression of the CRT Check Address pushbutton 146 on the console. However, during the N.7 time that the latch was being de-energized a signal was developed at output terminal 070.06 for gating the address of the word read out of CRT storage and having either a greater-than-9 or a Modulo 4 error into the V Field. Subsequent addresses developed by the regeneration counters will not be gated into the V Field inasmuch as output terminal 070.06 will continue to stay Down so long as the CRT Check Address pushbutton on the console is kept depressed. Therefore the address of the word containing the error may be held continuously in the V Field for observation.

What has thus been accomplished by the depression of the CRT Check Address pushbutton is the examination of all the words stored in CRT storage for a Modulo 4 and greater-than-9 error. When any one of these two errors had been found in any one of the numerous words stored, the address at which the word is in error is entered into the V Field for inspection. The Modulo 2 error check in the CRT storage circuit is also performed during the reading out and reading in of words into CRT storage. It should also be realized that when a greater-than-9 error or Modulo 4 error check does occur, the Calculator is stalled.

The purpose of the Manual Pulse Source circuit Fig. 69 is to provide a synchronized one microsecond pulse whenever one of several mechanical pushbuttons located on the console is actuated. There are a variety of operations which are initiated at the console of the Calculator by depressing a pushbutton. Due to the uncertainty of the period of closure of the depressed switch and also due to the need for synchronization, a single one microsecond pulse is produced at N.4 time which is used to commence the operation of the logical circuitry concerned.

Referring to Fig. 70, it may be seen that when one of the pushbuttons is depressed common terminal 780.00 is connected to a —35 volt source. When this occurs the Or-inverter 2087 is deenergized making amplifier 2088 conductive and causing current to flow through the coil of relay 2078 located in the indicator panel. This causes the moving contact of the relay to be transferred.

The input start terminal of the single pulse generator 2079 is connected to ground when relay 2078 is deenergized. However, when this relay is picked up, the reset of generator 2079 is grounded which permits the input latch thereof to be operated by the next coincident application of pulses to the right hand inputs thereof.

The extreme right hand input is connected to the lead of the octal commutator transmitting the N.3 pulse, while the next is connected to the output of a counter which counts 50 octal cycles and which transmits an N.3 pulse at the conclusion of this count, that is, once every 400 microseconds.

The 400 microsecond period, which refers to one cycle of operation of the Register Display circuits of Patent 2,754,450, has no predetermined relationship to the eight microsecond CRT timing cycles other than once it is started it is periodic. Accordingly, the time of the appearance of the N.4 pulse at the output terminal of the single pulse generator 2079 is dependent upon the signal developed by the Register Display Control circuit at its output terminal 4717.

The one microsecond pulse on the output terminal of generator 2079 is fed through Delay 2083 and cathode follower 2084 to terminal 770.01 and from there to the various And circuits in Figs. 70 and 71 in order to permit the various pushbuttons on the console to initiate or discontinue calculator manipulation. The signal on terminal 770.01 is fed to various And circuits where a single pulse initiated by the operation of a pushbutton is required.

The manipulation of the pushbuttons of Fig. 70 may follow the operation of the CRT Check Address pushbutton 146 above described. The operator having ascertained the exact address where the unstandard condition exists may wish to move a word about. For instance, he may, by operating the pushbutton 5316, cause the word registered at that address to be transferred into Register 2 from which he may produce a visual indication of the word, so that by mere observation he may determine the cause of the difficulty. The manner in which these transfers may be made may be shortly stated by the following list of terminals affected by the various pushbuttons, as follows.

Pushbutton 5316, transfer CRT to Register 2. Terminals involved are 070.06, 070.07, 070.12, and 070.13.

Pushbutton 5315, transfer Register 2 to CRT. Terminals involved are 070.06, 070.07, 070.09, 070.11, and 070.13.

Pushbutton 5215, transfer CRT to Register 1. Terminals involved are 070.05, 070.07 and 070.10.

Pushbutton 5311, transfer Register 1 to CRT. Terminals involved are 070.05, 070.07, 070.08, and 070.09.

*Transferring a 17 Digit Word From CRT Storage*

The contents in CRT Storage at any address may be entered into Register 2 by the depression of the Transfer CRT to Register 2 pushbutton 5316 on the console. Once the address of transfer is manually selected by the switches of Fig. 63 and the pushbutton depressed, the address is delivered to the V Field and from there to the CRT storage circuits, since read-out from CRT storage can only be accomplished by setting the CRT's on a particular address through the V Field, where the 17 digit word at that address is read out and entered into Register 2. This is accomplished as follows;

First the four Register 2, CRT Address switches are set for a desired read-out address. These switches are shown in Fig. 63. Each of the four switches consists of four wafers corresponding to the 1, 2, 4 and 8 bits, thereby permitting each switch to be set at any number between 0–9. However, it should be recalled that information may be stored at any one of 2000 addresses or 3600 addresses in accordance with the setting of the CRT capacity switch. For example, if the switches are set for an address of 1954, the condition of the four groups of four output terminals is:

|         | 1 Bit | 2 Bit | 4 Bit | 8 Bit |
|---------|-------|-------|-------|-------|
| 784.71  | Down  | Down  | Up    | Down  |
| 784.72  | Up    | Down  | Up    | Down  |
| 784.73  | Up    | Down  | Down  | Up    |
| 784.74  | Up    | Down  | Down  | Down  |

Once these switches are properly set, the operator then depresses the Transfer CRT to Register 2 pushbutton 5316 on the console. This causes the output terminal 784.26 to go Up. The signal at this terminal is fed to the circuits of Figs. 70 and 71. The rest of the operation is automatic.

The first function performed by the circuits of Figs. 70 and 71 is that of transferring the address manually set up on the switches of Fig. 63 to the V Field. The signal developed at input terminal 748.26 energizes Or circuit 3021 which immediately causes output terminal 070.13 to go Up. This signal is fed to the two position switches 129 (Fig. 56) where it gates the digits set up on the CRT Address Manual switches of Fig. 63 which are then caused to appear at output terminals 662.41—662.44 and are made available to the V Field circuit. These digits are then gated by the signal developed at output terminal 070.06 in the following manner.

The signal developed at input terminal 784.26 when the pushbutton 5316 is operated which energizes Or circuit 3021 causes the upper input terminal of And circuit 3031 to go Up. When the N.5 pulse arrives at input terminal 770.01 from the Manual Pulse Source Fig. 69, delay circuit 3020 is energized and, therefore, at N.6 time, coincidence is established at And circuit 3031. This energizes Or circuit 3035 and delay circuit 3036 to cause output terminal 070.06 to go Up for one microsecond at N.7 time.

The signal from this terminal is delivered to the V Field Control circuit where it causes the input terminal 045.03 to go Up and output terminal 045.10 to go Down. Reference to the V Field Circuit Fig. 72 will show that when these conditions occur, the old address stored in the V Field is erased at the same time that the new manually developed address (that is the 1954) is entered.

The next function is to deliver the V Field address to the CRT storage circuits so that the 17 digit word stored at address 1954 might be read out for delivery to Register 2. When And circuit 3031 is Up at N.6 time, delay circuit 3033, Or circuit 3034 and delay circuit 3037 are operated and output terminal 070.07 is caused to go Up for one microsecond at N1.0 time. This signal is then fed to the CRT Access Control circuit where it energizes Or circuits 2321 and 2320 and cathode follower 2322 and causes output terminal 060.01 to be Up at N1.0 time.

From there the signal is fed to the Test Operation CRT Control circuit where it is sent through a normal contact of the Test-Normal Relay and develops a signal at output terminal 662.64 at an N1.0 time. This signal is fed to the Calculator Operation CRT Control circuit where it develops conditions for preventing a normal regeneration counter advance and the development of a signal for reading out a 17 digit word onto the transfer bus at the next regeneration counter address. Note terminal 060.01 in Fig. 23 which operates Or circuit 5140 to disable the counter advance 661.12.

The signal at output terminal 662.64 (060.01) is also fed to the CRT Address circuit where it gates the V Field address available at input terminals 662.51–662.54 through 4-pole 2-position switches 122 in order to reach the address for reading out the 17 digit word at such address.

At an N1.4 time the 17 digit word read out of CRT storage at the V Field address (hypothetically 1954) is entered into Register 2 by the signal developed at output terminal 070.12 of the Register, CRT Transfer Control Circuit Figs. 70 and 71. When Or circuit 3034 is energized in order to develop a signal at output terminal 070.07, it energizes Or circuit 3054 and operates a latch comprising this Or circuit, delay circuit 3055 and And circuit 3038. The signal which appears at the output of the latch starting at N1.0 time causes the upper input terminal of And circuit 3050 to go Up. The latch is maintained as long as the Transfer CRT to Register 2 pushbutton 5316 is depressed and inverter 3039 is not made conductive. When either of these conditions does not exist, coincidence is removed from And circuit 3038 and the latch is released.

If the Octal Commutator delivers an N.4 signal while the pushbutton is depressed, coincidence is developed at And circuit 3050, which operates Or circuit 3040 and cathode follower 3051. Energization of the Or circuit makes inverter 3039 conductive which pulls the center input terminal of And circuit 3038 Down to release the latch at N1.4 time. As long as the pushbutton is continued depressed, the latch will not again be energized, since no other single impulse from Fig. 69 can be developed.

Energization of cathode follower 3051 causes output terminal 070.12 to go Up at N1.4 time. The signal at this output terminal is fed to the Register 2 Control circuit (not shown) where it sets up the conditions for erasing the old number in Register 2, inserting the new number, and then checking it at N1.6 time for a Modulo 4 and greater-than-9 error.

Signals are developed at the above mentioned terminals for transferring a 17 digit word from CRT storage to Register 2 for only one microsecond during the depression of the pushbutton. This is due to the fact that the N.5 signal appearing at input terminal 770.01 is developed by a single pulse generator. Only one such one microsecond signal is developed during any continuous operation of the single pulse generator.

*Transferring the contents of Register 2 into CRT storage*

The operator of the Calculator may, if he so desires, manually transfer the contents of Register 2 into CRT storage by depressing the Transfer Register 2 to CRT pushbutton 5315 on the console. As in the case of transferring a desired 17 digit word from CRT storage at a manually selected address to Register 2, as explained above, the Register 2 word in the present instance is entered into CRT storage also at an address selected manually. Once the CRT address selector switches are properly set and the pushbutton depressed, the Register, CRT Transfer Control circuit shown in Figs. 70 and 71 develops signals which store the Register 2 word at the selected address.

Once the address at which the Register 2 word is to be stored is selected by properly setting the four switches shown in Fig. 63, the digits appear at output terminals 784.71–784.74. These digits are then delivered to the V Field circuit by the one microsecond N.7 signals developed at output terminals 070.13 and 070.06, as already explained above. At an N.0 time another one microsecond signal is developed at output terminal 070.07 which gates the V Field code into the CRT storage circuit in order to set up the conditions for inserting the Register 2 word at the V Field address in storage.

When the Transfer Register 2 to CRT pushbutton 5315 on the console is depressed, input terminal 784.24 is caused to be Up and Or circuit 3021 is energized. Operation of this Or circuit develops signals at output terminals 070.13, 070.06 and 070.07 for entering the manually selected address into the V Field and from the V Field into CRT storage. The development of the signals at these output terminals has been explained in detail above.

When the Transfer Register 2 to CRT pushbutton on the console is depressed and input terminals 784.24 is caused to go Up, the center input terminal of And circuit 3049 goes Up automatically. The upper input terminal of this And circuit is Up from the time that a signal appears at the output of the latch, comprising And circuit 3038, Or circuit 3054 and delay circuit 3055. That is to say, the upper input terminal of And circuit 3049 is Up starting at N1.0 time. Therefore, when a signal arrives from the Octal Commutator at an N.3 time, coincidence is established at And circuit 3049 energizing Or circuit 3040 and cathode follower 3048. As already explained, energization of Or circuit 3040 makes inverter 3039 conductive and therefore removes coincidence from And circuit 3038 which releases the latch.

Operation of cathode follower 3048 causes output terminal 070.11 to go Up. The signal at this output terminal is delivered to circuits not shown to cause the entry of the 17 digit word of Register 2 into the 66 data lines of the transfer bus. Thus the Register 2 word is made available to the CRT storage circuits four microseconds after the V Field code is entered into the CRT storage circuits.

When coincidence is established at And circuit 3049 at N.3 time, a signal also energizes Or circuit 3046 which operates delay circuit 3045 and causes output terminal 070.09 to be Up for one microsecond at N.4 time. The signal developed at this output terminal is fed to the CRT Access Control circuit where it energizes Or circuit 2323 and cathode follower 2324 in order to cause output terminal 060.02 to be Up at the same time interval.

The read in signal developed at output terminal 060.02 is then delivered to the Test Operation CRT Control circuit where it passes through the test-normal switch in order to develop signals at output terminals 662.67–662.69. The signals at these output terminals are then delivered to the Calculator Operation CRT Control circuit Fig. 37 where they set up the conditions which permit the 17 digits discharged from Register 2 to be entered into CRT storage.

Whether the 17 digit word is transferred from CRT storage into Register 2 or from Register 2 into CRT storage, one such transfer only can be made during each depression of the appropriate pushbutton. As many as 3600 17 digit words may be manually transferred into the CRT storage, although it is unlikely that such procedure would ever be required. If neither the Register 2, CRT Address switches nor the Register 2 contents are changed, each new depression of the Transfer CRT to Register 2 pushbutton or the Transfer Register 2 to CRT pushbutton will not affect CRT storage or Register 2.

However, by changing the setting of the Register 2, CRT Address switches each time one of the two pushbuttons is depressed, it is possible to insert a new 17 digit word into Register 2 or transfer the same Register 2 word into different CRT storage addresses. For example, if the Transfer CRT to Register 2 pushbutton is depressed each time that the address is manually changed, the 17 digit word at the new address is entered into Register 2. On the other hand, if the Transfer Register 2 to CRT pushbutton is depressed, the Register 2 word will be stored at a different address each time the pushbutton is depressed.

*Transferring a 17 digit word from CRT storage to Register 1*

The Register, CRT Transfer Control circuit Figs. 70 and 71 is also capable of transferring a 17 digit word from CRT storage into Register 1 in a similar manner to that already explained in the case of transferring such a digit from storage into Register 2. Signals are developed at the same time intervals for transferring a word from CRT storage into Register 2 and Register 1.

The CRT address from which it is desired to procure the 17 digit word for transfer into Register 1 is developed by the proper selection of the Register 1, CRT Address switches similar to those of Fig. 63. Assuming a hypothetical address of 1954, the switch associated with digit position 1 is set in position 4, the switch associated with digit position 2 is set in position 5, the switch associated with digit position 3 is set at 9, and the switch associated with digit position 4 is set at 1. Each of the switches has four wafers corresponding to the four bits 1, 2, 4 and 8, with the terminals of the wafers connected to plus and minus potentials in such a way that signals will be developed by the four wafers according to the setting of a particular switch. For example, if the switch associated with digit position 1 is, as assumed, 4, only the wafer associated with the 4 bit will develop a signal, the terminal "4" of the other three wafers being connected to a negative potential.

The bit lines associated with the output terminals 784.61–784.64 will thus deliver the record of these manually set switches directly to the V Field as indicated in Fig. 72.

Once the CRT address is manually selected, the Register, CRT Transfer Control circuit Figs. 70 and 71 devlops a one microsecond signal at N.7 time at output terminal 070.05 which gates this address into the V Field circuit. The depression of the Transfer CRT to Register 1 pushbutton causes terminal 784.26 to go Up and coincidence established at And circuit 3030 at N.6 time determined by the signal developed at input terminal 770.01 by the Manual Pulse Source Fig. 69. When And circuit 3030 is Up, delay circuit 3028 is energized and output terminal 070.05 goes Up. This signal is fed to the V Field control circuit where it causes output terminal 045.04 to go Up at N.7 time and output terminal 045.10 to go Down at the same time interval. Reference to the V Field circuit will show that when this condition exists the digits developed by the Register 1, CRT Address switches are entered directly into the V Field circuit for storage at the same time that the old address stored in the V Field is erased. It will be recalled in the statement on the operation of the Register 2, CRT Address switches that the digits developed by these switches are first sent to the Test Operation CRT Control circuit before being entered into the V Field.

One microsecond after the manually selected address has been entered into the V Field, a signal is developed at output terminal 070.07 of the Register, CRT Transfer Control circuit which then gates this address into the CRT storage circuits for reading out a 17 digit word. At the time that output terminal 070.05 is Up, Or circuit 3034 and delay circuit 3037 are energized in order that output terminal 070.07 might be Up at an N1.0 time. It has already been explained above how the signal at this output terminal permits the V Field address to be entered into the storage circuits.

At an N.4 time the Register, CRT Transfer Control circuit develops a signal at its output terminal 070.10 for gating the word read out of CRT storage into Register 1. The signal developed at input terminal 784.26 by the depression of the Transfer CRT to Register 1 5312 pushbutton on the console causes the middle input terminal of And circuit 3043 to go Up. The upper input terminal of this And circuit is Up one microsecond after the latch, comprising And circuit 3038, Or circuit 3054 and delay circuit 3055, is energized. When output terminal 070.05 goes Up, Or circuit 3054 is energized and the latch is put into operation. Since Or circuit 3054 is operated at N.7 time, the upper input terminal of And circuit 3043 is caused to go Up at an N1.0 time. Therefore, when the N.4 signal arrives from the Octal Commutator coincidence is established at And circuit 3043 which energizes Or circuit 3040 and cathode follower 3047. Operation of the Or circuit 3040 makes inverter 3039 conductive and therefore releases the latch.

When cathode follower 3047 is operated, output terminal 070.10 goes Up at N.4 time. The signal at this output terminal is delivered to the Register 1 Control circuit where it sets up the conditions which erase the old word in Register 1 at the same time that the new word read out of CRT storage is entered therein. One microsecond after the new word is entered into Register 1, it is placed on the 66 wire parallel bus for a one microsecond interval in order that the 17 digit word might be checked for a modulo 4 and greater-than-9 error.

It is possible to transfer the contents of Register 1 into CRT storage at a manually selected address. The same Register 1, CRT Address switches similar to those illustrated in Fig. 63 are set to the desired CRT address, but now the Transfer Register 1 to CRT pushbutton 5311 on the console must be depressed. The first step is always the transfer of the manually selected address digits into the V Field and from there into CRT storage, as already explained.

The depression of the Transfer Register 1 to CRT pushbutton 5311 causes input terminal 784.25 to go Up. This develops coincidence at And circuit 3029 at N.6 time, as determined by the signal received at input terminal 770.01. After a one microsecond interval introduced by delay circuit 3028, output terminal 070.05 goes Up for one microsecond at N.7 time in order to gate the manually selected address into the V Field. When this output terminal is Up, Or circuit 3034 and delay circuit 3037 are energized and output terminal 070.07 is Up for one microsecond at N1.0 time in order to transfer this newly entered address in the V Field into the CRT storage circuits.

The next step is to enter the word stored in Register 1 into CRT storage. The signal developed at input terminal 784.25 by pushbutton depression develops coincidence at And circuit 3042 when the N.3 signal arrives from the Octal Commutator. The upper input terminal of this And circuit is Up during the operation of the latch which is energized through Or circuit 3034 when output terminal 070.05 is Up. Coincidence having been established at And circuit 3042, a signal is delivered to Or circuit 3040 and cathode follower 3044. The operation of Or circuit 3040 and inverter 3039 removes coincidence from And circuit 3038 and releases the latch. Thus it is seen that And circuit 3042 is Up for only a one microsecond time interval.

Operation of cathode follower 3044 causes output terminal 070.08 to go Up at N.3 time for one microsecond. This signal is then fed to the Register Output Switch Control circuit where it operates to gate the 17 digit word of Register 1 into the 66 wire parallel bus for ultimate transfer to the CRT storage circuits.

The data word from Register 1 present in the bus is gated into the CRT storage circuits by the signal developed at output terminal 070.09 of the Register CRT Transfer Control circuit. When And circuit 3042 is Up, Or circuit 3046 and delay circuit 3045 are energized in order to cause output terminal 070.09 to go Up at N.4 time. From output terminal 070.09 the signal is delivered to the CRT Access Control circuit where it energizes Or circuit 2323 and cathode follower 2324 in order to cause output terminal 060.02 to go Up.

The signal developed at output terminal 060.02 is then fed to the Test Operation CRT Control circuit where it passes through the test-normal switch in order to develop a signal at output terminal 662.67, 662.68, and 662.69. These signals are then fed to the Calculator Operation CRT Control circuit where they develop conditions for inserting the Register 1 word into CRT storage.

As in the transfer between CRT storage and Register 2 explained above, so in the transfer between CRT storage and Register 1, only one such transfer may be made during any continuous depression of the appropriate pushbuttons. This is due to the fact that the signals developed at the different time intervals when the 17 digit word is transferred from Register 1 into CRT storage or from CRT storage into Register 1 is governed by the one microsecond pulse developed at input terminal 770.01 from the Single Pulse Generator of the Manual Pulse Source. Only one such signal is received during any continuous depression of one of the two pushbuttons examined in this section.

Attention is directed to Fig. 72 where the V Field and its control circuit are shown in some detail. Each digital place of the V Field comprises a 4 pole 9 position switch, such as 3240, and a set of four delays, such as 3241, feeding into the output bus (4 wires for the 1, 2, 4 and 8 bits) 445.04. It will be noted that the extreme left hand position of the switch 3240 under the control of the lead 445.10 is normally "on" (due to the Inv 2840) so that information may be latched in this device. It should be noted that a new record may be read in to this V Field from the Address Modifier Control over the bus 032.09 by introducing the four digits of a new address successively and starting with the right hand digit, a shift to the right being made for each. Thus when the digit 2 of the address 3092 is transmitted over the bus 032.09 it is first introduced into the thousands place latch of the V Field. Thereafter this digit is shifted to the hundreds place (over bus 445.04) while the digit 9 is introduced into the thousands place and so on. Thus it will be seen that the V Field may be manipulated in order to examine and repair a reported error.

Attention is directed to Fig. 58 wherein a number of pushbuttons are shown which are mounted on the maintenance panel. This is to be taken as an indication of the grouping of these facilities and to indicate that such means are provided for the purpose of repair and maintenance operations. Many of these switches are shown elsewhere in connection with the specific circuits which they control.

Among the pushbuttons provided on the maintenance panel is one marked sweep failure reset pushbutton. In its normal position this provides a Down condition on the sweep failure detector shown in Fig. 59. It will be noted that this detector is connected to the horizontal deflection circuit terminals by means of which it keeps a constant watch over the output of the horizontal deflection circuit, Fig. 52. Should this circuit fail, then the indicator lamp would be lighted and the terminal 660.40 would be brought Up for alarm purposes, with which we are not here concerned. The detector may be reset by operation of the said pushbutton.

Test operation

Means is provided for making further tests of the cathode ray tubes particularly useful in determining the capabilities of the tubes to withstand spill and which may reveal a particular tube sufficiently defective to cause an error of the nature hereinbefore described. Such tests for spill may be made with the means shown in Figs. 75 to 85 inclusive, arranged as indicated in the block diagram Fig. 74. For this purpose another counter, Fig. 82, is provided together with a relay known as the test-normal relay (Figs. 83 and 84) for making a large number of circuit changes, a set of so-called reference selector switches Fig. 76 and an indicator circuit Fig. 79.

Let us assume that the test switch in Fig. 75 is operated. This will energize the test indicator lamp to notify the attendant that this switch has been moved off normal to the test position and will cause the operation of the test normal relay shown at the bottom of Fig. 84. Thereupon a switching of bit leads indicated at the top right of Fig. 56 will be carried out so that the cathode ray tubes will be held at the specific addresses designated by the test access counters of Fig. 82; that is during that part of the cycle during which a given number of dashes are being simultaneously written in to each and every CRT. This is brought about as follows:

At the end of a normal regeneration cycle, if the CRT Capacity switch is set for 2000 addresses, then at time 1999.5 And circuit 5141 (Fig. 35) will operate through Or circuit 5166 (Fig. 36) to bring the conductor 661.16 Up. Likewise if the CRT Capacity switch is set for 3600 addresses, then at time 3599.4 And circuit 5142 will pass a pulse to Delay circuit 5182 whereby at time 3599.5 Or circuit 5166 will operate to bring conductor 661.16 Up. This is the start conductor for the test access counter of Fig. 82 and the Up condition thereon will cause coincidence in And circuit 5031, the other terminal of which is Up from the output of Inv 5039, so that a latch (Latch B) comprising Delay 5034 and And circuit 5032 will become active and will so remain until the Inv 5035 is made conductive. This occurs at the following N.4 time so that the latch above described will be released after combining with the N.4 pulse to cause coincidence for one microsecond in And circuit 5037. This pulse then passes through Delay 5052 and activates a latch (Latch C) comprising Delay 5052 and And circuit 5038, which latch, it will hereinafter appear,
will remain active until the circuit of Fig. 79 reports that the proper number of dashes and dots have been successfully applied to the cathode ray tubes at the first address to be tested.

At N.0 time, following, the And circuit 5051 will respond to the N.0 pulse and the output of the Delay 5052 and through the heavy duty CF 5050 will bring the terminal 662.16 Up. This may be traced through a front contact of the test-normal relay in Fig. 84 to the terminal 662.64 which may further be traced in Fig. 54 where it will be seen to be the control conductor for the address switch 122 whereby the count produced by the counter of Fig. 84 will be passed on terminals 662.01–662.04 through the back contacts and armatures of the test normal relay (Fig. 83) to the terminals 662.51–662.54, thence through the address switch 122 to the cathode ray address tubes to set them to a particular address, at the start address 0000.

It may be noted at this time that if the reference selector switches of Fig. 76 are set to make 500 references to each address the timing, charted in Fig. 86, is such that one count is lost. In accordance with this chart the start conductor 661.16 is brought Up for one microsecond at time N.5 of octal cycle 1 (corresponding to the octal cycle in which the count 1999 is to be advanced to 2000 or the count 3599 is to be advanced to 3600). It is intended that immediately following this the normal regeneration counter will start to tally the number of references made to the specific address selected by the test access counter of Fig. 82. Hence in the following octal cycle, that marked cycle 2 in Fig. 86, the regeneration counter makes its first count, but the address 0000 selected by the test access counter does not enable that address until octal cycle 3 and hence when the regeneration counter reaches the count of 500 there will in fact have been only 499 references to the address 0000.

It will appear hereafter that when the write switch (Fig. 75) is set to All Dashes and the reference selector switches of Fig. 76 are set to 500, that 499 dashes will be written in to the address 0000 followed by a change to a single dot. This, of course, makes for a good test of the address since the change to a dot after a long series of dashes will prove the capability of the CRT. Moreover it leaves the CRT with a record of a dot in every code place of every address so that in the following regeneration cycles and in the later test when the record therein is read out five hundred times in succession the operation differs from the five hundred read in operations.

Let it now be assumed that the write switch, Fig. 75, has been set for all dashes. The two leads from this switch are arranged to be conditioned as follows:

| Lead | All Dots | Normal | All Dashes |
|---|---|---|---|
| 662.58 | Up | Down | Down |
| 662.59 | Up | Up | Down |

In accordance with this arrangement it will be seen that both of these conductors now carry a Down condition.

The terminal 662.58 enters the Auxiliary Circuit Control 663 in Fig. 60 and emerges as a normally Up condition, broken by a one microsecond Down condition at time N.0 on terminal 663.18 shown as terminal 380 in Fig. 19D of the said Havens and Deerhake application Serial Number 444,253 filed July 19, 1954. This is known as the dash clamp lead and functions when the terminal 662.58 is Down to terminate the dash being written, that is it acts to terminate the prolonged activation of the CRT beam at the second pulse stretcher. If this terminal 662.58 were Up, as when all dots are being written, then the operation of the second pulse stretcher would be terminated earlier. The terminal 662.58 therefore allows all dashes to be written.

When the Write switch in Fig. 75 is set to All Dots, then as set out above, the two leads 662.58 and 662.59 are both Up. As a consequence the dash clamp lead 663.18, normally Up is broken for another one microsecond interval at time N.5 whereby the second pulse stretcher is cut off before the beam of the cathode ray tube starts to move off center to write a dash and therefore only a dot is written.

Likewise the terminal 662.59 enters the Auxiliary Circuit Control 663 in Fig. 60 and emerges as terminal 661.09 known as the Video Sample Pulse terminal and shown as terminal 585 in Fig. 19A of said Havens and Deerhake application. This functions in a later part of the cycle as a read out means.

With these arrangements made and with the counter advance lead 662.66 (see Figs. 54 and 84) now connected to the N.1 lead from the octal commutator the regeneration counter 121 of Fig. 54 will operate continuously and repeatedly and a dash will be written in to each CRT address spot as though the binary number 1111 were being repeatedly entered. Since the indicated bit count of a sixteen digit word each having four bits is 3 (3—Mod 4 of 64) it follows that digit 17 will be expressed as a dash in both its 1 bit and 2 bit places so that all sixty-six spots for an address will have a dash written therein.

Now it should be noted that the output of the 66 cathode ray tubes, Fig. 59, is in the form of 66 data lines 131. One of these is shown as DL1–1 labelled Read-In in Fig. 19D of the said Haven and Deerhake application. There is also shown an Auxiliary Output terminal 601 on which exactly the same information is transmitted, the auxiliary terminal being provided for use in the present arrangement so that the regular data line terminals may be isolated under certain conditions, as when the present test is being made. However, for the purposes of the present invention the Fig. 59 is shown as being associated with Fig. 85 whereby the 66 data lines are shown as entering a plurality of inequality detectors. Since all the inputs to these inequality detectors will be exactly the same, the output of each will be Down, so that normally the terminal 663.01 (output in Fig. 85 and input to Delay 5045A in Fig. 77) will be Down. Any deviation from this pattern as by the failure of a single address spot will result in the terminal 663.01 going Up at N.5 time whereby at N.6 time And circuit 5045 will trigger the latch A consisting of Delay 5047 and And circuit 5046 and the Indicator Amplifier 5048 will be made operative to cause illumination of the test failure lamp situated in the indicator panel.

It is to be noted in Fig. 84 that two terminals 662.93 and 662.94 are known as the read in terminals. These may be traced in Fig. 84 through back contacts of the test normal relay to leads 662.68 and 662.69 respectively and thence in Fig. 37 to Inverters 5162 and 5161 respectively. The output leads of these inverters are leads 661.93 and 661.94 respectively which are read in gates for the cathode ray tubes 127 (Fig. 59) These two leads are equal, one acting for part of the tubes and the other for the remainder. Such a lead may be indentified in Fig. 19D of the said Havens and Deerhake application as the output of the Inv 715 (equivalent to the inverter 5162 of 5161). Since this keeps an Up condition constantly on the Or circuit 714, all dashes will be written. Alternatively, and as will later appear, when the And circuits 5079 and 5078 become active, the read in gates 661.93 and 661.94 (Fig. 37) go Down and consequently all dots are written.

Figure 81:
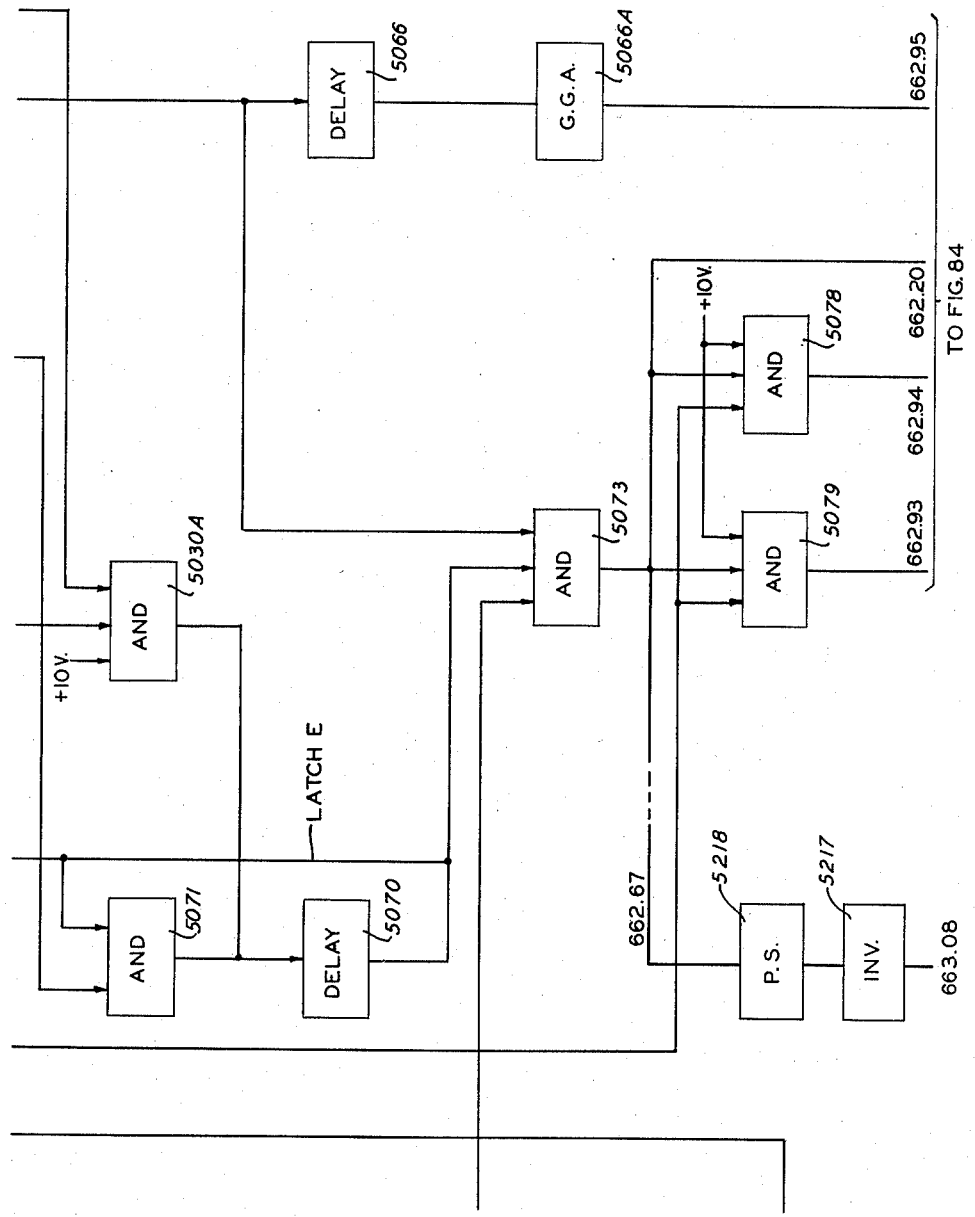

Attention is also directed to the terminal 662.22 in Fig. 81. This is known as the Video Blank Gate and it operates when Up to prevent or blank out the video signal produced when the address spot of a given address is scanned. This lead may be traced from Fig. 81 into Fig. 84 where it is seen to be connected in the now operated position of the test normal relay to write control wire 662.67 which may be found again in Fig. 81 leading in to a pulse stretcher 5218. This pulse stretcher will accept a one microsecond N.4 pulse from And circuit 5073 and produce a Down condition on its output from that time to the following N1.06 time. Therefor the output of the following Inv 5217 will be a positive pulse lasting from N.4 to N1.06 which is used to blank out the video signal coming in to the second pulse stretcher (see Or circuit 605, Fig. 19D of said Deerhake and Haven application). Therefore when the And circuit 5073 is operative the Video Blank Gate will be brought Up at each N.4 octal cycle time and the CRT will be enabled to respond to the read in control pulse undisturbed by the Video signal produced by the scanning of the address spot.

It will appear later herein that the Latch E comprising the And circuit 5071 and Delay 5070 is a binary latch, that is it responds to succeeding incoming pulses to be alternately operative and released. Since in this case the incoming pulses are signals that the test access counter of Fig. 82 has reached the end of its counting operation, it will be seen that the And circuit is conditioned for operation during a first complete count by this test access counter and then rendered ineffective during a second complete count. In a word, when Latch E is "on," the Video signal is blanked and the read in circuit is effective and either dashes or dots will be read in to the address spots in accordance with the position of the write switch and when the Latch E is "off" the Video signal is effective so that the regeneration operation may be carried out. It will be assumed that Latch E is "on" during the first half of the test (an original half cycle in which the Latch E is "off" may be disregarded).

Pausing for a moment and looking at Fig. 85, it may be noted that a plurality of inequality detectors are used all having their outputs leading through Or circuits to a single cathode follower circuit leading to the terminal 663.01. Fig. 85, as indicated, may be placed below Fig. 59 so that the information on the 66 data lines may be continuously compared for equality. The first inequality detector 155 compares the 1 bit of the single digit indicated bit count signal to the 2 bit thereof. Since, when the rest of the spots of the word will be all dots or all dashes, this indicated bit count will be a 3 and since this is expressed by a 1 bit and a 2 bit simultaneously present, the output of this inequality detector will be Down. This digit 17 detector must be separated from detectors for the other digits since the character of the signals leading thereinto is invariably the same, whereas the inputs to the other detectors differ as between dots and dashes. The next inequality detector 156 compares the four bit terminals of digit 16 with the four bit terminals of digit 15. The normal output of this detector is a Down condition. The detectors 155 and 157 operate into Or circuit 158 and this Or circuit as well as other detectors work into Or circuit 159. The output of Or circuit 159 and Or circuit 160 combine into the CF circuit 161 to operate the output terminal 663.01. Thus it will be seen that if any one of the sixty-six address spots fails, an Up condition will be placed on this terminal and the Latch A will be operated.

Looking at Figs. 23, 54 and 84, it may be noted that the normal counter advance conductor 661.12 connected over a back contact of the test normal relay to the advance wire 662.66 is changed during the operation of this relay to a connection directly from the N.1 lead from the Octal Commutator to the wire 662.66. The regeneration counter will therefore advance once each octal cycle during which cycle a dash will be read in to each cathode ray address spot (or a dot of the Write switch of Fig. 75 is set at All Dots). The results may be seen in Figs. 76 and 79. Let it be assumed that both the heavy duty and the light duty switches of Fig. 76 have been set at 500.

First, let us examine the terminal 660.38 in Fig. 48. This is the output of Or circuit 4957 and will be Up continuously if the CRT capacity switch is set for 2000 addresses. However, if this CRT capacity switch is set for 3600 addresses, only the left hand input of Or circircuit 4957 is effective and hence the terminal 660.38 will be Up only while the counter is within the block 0–399, that is while the counter is counting the heavy duty addresses of the 3600 group.

Let us first examine the effect produced when the regeneration counter reaches the count 500 when the CRT capacity switch is set at 2000. The Hundreds leads 660.23 and 660.23Z (the Z stands for inverted), are seen to enter Fig. 76 to go into the two position switches of Fig. 79. The count 500 will be expressed at read out time N.0 by an Up condition on conductors 660.23.1Z
660.23.4Z
660.23.2
660.23.8 and a Down condition on the other four conductors. Also conductor 660.38 will be Up. Therefore the output of all the two position switches 5080 to 5087 inclusive will be Up, the two And circuits 5088 and 5089 will be Up and one microsecond later the left hand inputs of both And circuits 5091 and 5092 will be Up. However, since conductor 660.38 is Up the And circuit 5092 will be effective and will emit a one microsecond pulse over the output conductor 662.22 at time N.1 of the count 500 of the regeneration counter. Also since conductor 660.38 is Up at this time the Inv 5090 will be active and its output will be Down so that And circuit 5091 will not be active.

Now let us assume that the CRT capacity switch is set for 3600 addresses. In that case the conductor 660.38 would be Down and therefor the Inv 5090 will be inactive, its output will be Up and therefor the And circuit 5091 will be operative and the And circuit 5092 will be inactive. Thus, in either case, a one microsecond pulse will be transmitted over conductor 662.62 at count 500 of the regeneration counter.

In some detail, the operation of the two position switch 5080 may be traced. This component is actually a pair of And circuits with a common output. The right hand input of the right hand And circuit of switch 5080 may be traced to conductor 660.23—8 which is Down and the left hand input thereof may be traced over the 8 bit lead to the lowermost switch of the light duty switch and since this has no connection to the 500 point this conductor will also be Down. Therefore the right hand And circuit of the switch 5080 will be Down. In the same manner the right hand input of the left hand And circuit of this switch may be traced to conductor 660.23.8Z which is Up at this time. The left hand input may be traced over the 8Z conductor to the lowermost blade of the light duty switch to its 500 point which will be seen to be Up at this time so that the left hand And circuit of switch 5030 will be Up. In the same manner it will be found that the right hand And circuit of switches 5081, 5083, 5084 and 5086 will be Up and the left hand And circuits of switches 5080, 5082, 5085 and 5087 will be Up.

It is to be noted that the heavy duty and the light duty switches of Fig. 76 may be set at different counts. By way of example, let it be assumed that the heavy duty switch is set at 600 while the light duty switch is set at 500 as before.

Tracing the circuits in the same way it will now be found that when the count 500 is reached the left hand input of And circuit 5091 will be Up so that if the CRT capacity switch is set at 3600 addresses and the conductor 660.38 is consequently Down, the Inv 5090 will be inactive and its output will be Up, whereby And circuit 5091 will emit a pulse one microsecond beyond the pulse at count 500. However, if the CRT capacity switch is set at 2000 addresses the pulse from And circuit 5089 will be ineffective and no output over conductor 662.22 will be provided. At count 600, however, it will be found that the right hand And circuits of switches 5085 and 5087 will be Up and the left hand And circuits of switches 5084 and 5086 will be Up whereby coincidence is provided for And circuit 5088 and at one microsecond later a pulse will be transmitted to the left hand input of And circuit 5092. Since at this time conductor 660.38 is Up, coincidence will be provided in And circuit 5092 and a pulse will be transmitted over the output 662.22 at count 600 of the regeneration counter.

Now, to resume the description of the circuitry of the controls shown in Figs. 77, 78, 80 and 81. The test access counter of Fig. 82 is set at count 0000 and the regeneration counter has been tallying the number of times (references) that dashes are being written in each and every one of the address 0000 spots. When this regeneration counter reaches the count 500 a pulse will be transmitted over the lead 662.22 to terminate this part of the cycle. This will be at time N.1 or one microsecond beyond the read out time of the regeneration counter. Therefore coincidence will be established in And circuit 5053. The left input of this circuit will be Up as the test normal relay is operated and lead 662.73 is now connected to an Up potential. The next lead to the right is lead 662.22 which, as just explained, receives a pulse at N.1 time. The next lead is connected to the N.1 octal commutator terminal and the right hand lead is connected to the output of Latch C which is now Up. Therefore after count 500 by the regeneration counter and at time N.1 a pulse will be delivered to Delay 5049 and one microsecond thereafter Latch D comprising And circuit 5056, Or circuit 5055 and Delay 5077 will be triggered. The output of Latch D will prepare And circuit 5059 so that at time N.6 coincidence will be established therein with the consequence that Inv 5060 will be operated, its output brougth Down and Latch C will be released.

It may be noted that during the operation of Latch C, that is while the regeneration counter is tallying the number of references, And circuit 5051 is operated at each N.0 time, the read out time of the regeneration counter, so that the count 0000 produced by the test access counter of Fig. 82 may be gated through the address switch 122 (see Fig. 54) to hold the beams of the cathode ray tubes on this particular address. Now that the proper number of references have been made and Latch C has been released, the switch 122 is released from this duty and the lead 661.11 (Fig. 54) will be driven Up to allow the regeneration counter to run through a complete regeneration cycle.

As the 500 count is transmitted over the terminal 662.22 at time N.1 so a pulse is transmitted over output terminal 662.15 at time N.2 where in Fig. 35 it will be seen to enter Or circuit 5180 to put a pulse on the terminal 661.14 to release the regeneration counters from the count of 500 to the starting condition. Therefore the regeneration counter will operate normally to go through a complete regeneration cycle. This will differ from a normal regeneration cycle only in that now the count in one case will be from 0 to 1999 inclusive and in the other case from 0 to 3599 inclusive. No repeating of the group 0–399 will be carried out now.

Consider Figures 35, 36 and 37. It will be seen that in the normal regeneration cycle when the count reaches 3599.4 a latch comprising And circuit 5146, Or circuit 5168 and Delay 5169 is triggered and this will cause the clearing of the counters at the count 1999, through coincidence established in And circuit 5144. But this depends on a normal Up condition established on terminal 662.70 (the left hand input to And circuit 5144). However, the test normal relay is now operated so that it may be seen in Fig. 35 and also in Fig. 84 that this terminal is now Down. Therefore And circuit 5144 cannot be operated and since the regeneration counter cannot be cleared at count 1999 despite the operation of the latches of Figs. 35 and 36, it will continue to count until the count 3599 is again reached and the test reference start lead 661.16 is again driven Up.

At the end of this regeneration cycle when the address 1999 or the address 3599 as the case may be has been reached, the test access counter start lead 661.16 will be driven Up again, whereby the test access counter will advance to the next address 0001. Thereafter this cycle of making 500 references (the reading of a given address and the writing of a dash into each address spot thereof) to a given address and then following this with a complete regeneration cycle, will go on step by step until all the addresses have been subjected to this rigorous test. This will complete one half of the test.

The second half of the test starts when the test access counter has reached its count 1999.5 or 3599.5 as the case may be. In one case the And circuit 5067 will be operated at time 1999.5 and in the other case the And circuit 5068 will be operated at time 3599.4 and through the Delay 5069 a pulse will be created at time 3599.5. In either case the input to Latch E will be triggered. If this latch is "off" then the output of And circuit 5063 will trigger the Latch E through And circuit 5039A. As the pulse from Delay 5070 is transmitted to the right input of And circuit at time N.6, the inverter 5072 will be normal and hence the latch will lock into operation and will remain in this condition until the And circuit 5063 is again operated.

It may be noted now, that when the And circuit 5063 is again operated that Inv 5072 is operated at an N.5 time whereby And circuit 5071 is released and the Latch E returned to the "off" condition. Since the Delay 5070 cannot pass a pulse at N.6 time to this And circuit 5071 the Latch E cannot be triggered.

During this first half of the test while the Latch E is "on" the Video Blank Gate terminal 662.20 will be effective so that all dashes will be read in to each address and the test will terminate with a single dot. When the Latch E goes "off" the Video Blank Gate will be ineffective and hence when a dot is sensed it will be regenerated. Hence each address will be subjected to a plurality, 500 by way of example, of regeneration operations in quick succession.

The facilities and the circuits indicated by Fig. 87 provide means whereby the record at any particular address may be examined during the regular operations of the device. It will be understood that the record or the condition at any circuit point at any given interval may be examined if a pulse in exact synchronism therewith is available for control purposes. The present circuits are provided to supply such a synchronizing pulse.

Fig. 88 shows four manual switches marked units, tens, hundreds and thousands, by which any given address may be designated for test. The switches as shown are set for address 0222. These switches supply Up (+10 v.) and Down (−35 v.) potentials to a set of conductors 662.31 to 662.34 leading to the circuitry of Figs. 89 and 90. By way of example the extreme right hand wire is known as terminal 662.31.1, that is the 1 bit wire of the group 662.31. The extreme left hand wire is known as terminal 662.34.2Z, that is the inverse 2 bit wire of the group 662.34.

Now it will be seen that each of these conductors is matched in and And circuit (a 2 position switch is a combination of two And circuits having a common output) with a corresponding conductor from the pulse stretchers 124 and the inverters 125 of Fig. 57 coming from the regeneration counter. By way of example, the right hand And circuit of 2 position switch 5004 has for its input terminal 662.31.1 connected to the top wafer of the Units switch and corresponding terminal 660.01.1 connected to the inverters 125. Also, by way of example, the two inputs to And circuit 4981 are connected to terminals 662.34.2Z and 660.04.2Z. It is believed to be clear that when each of And circuits 4981, 4982, 4983 and 4984 and one of the And circuits of each of the 2 position switches 4985 to 5004 inclusive come Up simultaneously, the three And circuits 4989, 4996 and 5005 will be Up and the And circuit 4997 will be in coincidence along with terminal 661.12, the advance wire of the regeneration counter. The terminal 661.12 is Up at time N.1. The read out time is N.0 but since the terminals 660.01 to 660.04 come from the pulse stretchers 124, they too will be active at time N.1. Therefore a one microsecond pulse will appear on the synchronizing terminal 662.21 at time N.1 of that octal cycle during which the 66 data lines are in communication with the particular address set up on the switches of Fig. 88. Connection of this terminal to a cathode ray testing device for synchronizing purposes will allow a probe to be made at various points in the circuitry of the present device.

Terminals

Throughout the drawings there are shown a number of terminals left unconnected. By way of explanation, these terminals are here listed and a short description of their function is given. The circuits connected to these terminals are circuits leading to and from other parts of the computer in which the device of the present invention is employed but which play no vital role in the operation of the present device. Further, by way of explanation, each of these terminals is designated by a number which has a particular engineering significance though it does not conform to any regular pattern of designations used in the present description.

TERMINAL 023.05 (FIG. 23)

This terminal is Up during time .0 to .1 and is used to interrupt the counting of the decades counters while it functions to apply a Print Address order to the CRT address circuits.

TERMINALS 032.09.1, 032.09.2, 032.09.4 (FIG. 57)

These three terminals together with the control wire 662.65 known as the Print Address Accept Gate and normally connected to and controlled over terminal 023.05 (Fig. 23) are employed to control the 1, 2 and 4 bit pulse stretchers (57) of the Units output of the regeneration Counters upon a Print Address order whereupon the normal regeneration count is interrupted.

TERMINAL 060.01 (FIGS. 23, 54 AND 70)

This terminal is Up during time .0 to .1 and is used to interrupt the counting of the decade counters while it functions to apply the V Field to the CRT address circuits. The V Field is associated with a four digit display means whereby the actual count reached by the decade counters may be displayed in order that an interruption in the working of the computer may be investigated.

TERMINAL 060.02 (FIGS. 37 AND 71)

This terminal is known as the normal write control and is connected in the circuits with which the present circuits are associated. When a read in operation, some information to be registered at a given address, takes place, this terminal is controlled to be Up for one microsecond at N.4 time. In Fig. 37 it is shown as a means to operate the accept gate for the Modulo 2 latches whereby a record may be made in these latches of additional binary 0 bits entered by new words being registered at various addresses.

TERMINAL 070.05 (FIG. 70)

This terminal is employed when either pushbutton 5312 for the transfer of the record in the CRT (at a particular address) to Register 1 or the pushbutton 5311 for the transfer of the record in Register 1 to the CRT (at a particular address) is operated. This provides a signal to the V Field Control circuit in order to gate the manually selected address into the V Field.

TERMINAL 070.06 (FIG. 70)

This terminal is employed when either pushbutton 5316 for the transfer of the record in the CRT (at a particular address) to Register 2 or the pushbutton 5315 for the transfer of the record in Register 2 to the CRT (at a particular address) is operated. This provides a signal to the V Field control circuit in order to gate the manually selected address into the V Field.

TERMINAL 070.07 (FIG. 70)

This terminal is one used in conjunction with terminals 070.05 and 070.06, going Up, one microsecond after these terminals and is employed to transfer the address newly entered into the V Field into the CRT storage circuits for the purpose of driving the beams of the CRT's to this address. When the desired address has thus been reached the record therein may be extracted or a new record entered.

TERMINAL 070.08 (FIG. 71)

This terminal is used when the pushbutton 5311 is operated to transfer the contents of Register 1 to storage. It acts to gate the contents of Register 1 to the 66 data line terminals from which they are then gated by terminal 070.09 into the selected address.

TERMINAL 070.09 (FIG. 71)

This terminal is used when the pushbutton 5315 (Register 2 to CRT storage) or pushbutton 5311 (Register 1 to CRT storage) is operated. In the first case it operates to gate the information in Register 2 into the 66 data lines from which the information is then gated into storage by terminal 070.11. In the second case this terminal 070.09 operates to gate the information in the 66 data lines into CRT storage, such information having been gated from Register 1 to the 66 data lines by terminal 070.08.

TERMINAL 070.10 (FIG. 71)

This terminal is used when pushbutton 5312, CRT storage to Register 1 is operated and it functions to gate the information from a particularly selected address into Register 1.

TERMINAL 070.11 (FIG. 71)

This terminal is used when the pushbutton 5315, Register 2 to CRT storage is operated. It acts to gate the information on the 66 data lines into storage at the particularly selected address, this information having been gated from Register 2 into the 66 data lines by means of terminal 070.09.

TERMINAL 070.12 (FIG. 71)

This terminal is used when pushbutton 5316, CRT storage to Register 2 is operated. It gates the information from the particularly selected address directly into Register 2.

TERMINAL 070.13 (FIG. 70)

This terminal is used when either pushbutton 5315, Register 2 to CRT, or pushbutton 5316, CRT to Register 2 is operated. This terminal controls the operation of the four pole two position switches which brings the record of the particular address set up on the manual switches to the terminals 662.41–662.44 leading in to the V Field. When certain errors have been detected and then routed to Register 2 they may thus be observed.

TERMINALS 445.01.1, 445.01.2, 445.01.4, 445.01.8, 445.02.1, 445.02.2, 445.02.4, 445.02.8, 445.03.1, 445.03.2, 445.03.4, 445.03.8, 445.04.1, 445.04.2 (FIGS. 56, 72 AND 83)

These are the output terminals of the V Field and extend from the V Field (Fig. 56) into the contacts of the test-normal relay from which they are extended by terminals 662.51.1 through 662.54.2 respectively to the address switch Fig. 54 to control the setting of the beams of the CRT on to the particular address expressed by the V Field.

TERMINALS 553.04, 553.09 (FIGS. 56 AND 61)

These terminals extend from a register employed for storing indications of errors, such as a greater than nine error explained in some detail in the application Serial Number 470,570, filed November 23, 1954 by Bland, and as an error discovered by the Modulo 4 circuit explained in some detail in the application Serial Number 434,548, filed June 4, 1954 by Deerhake et al. These terminals entering the console pushbutton control circuit will under given conditions control means whereby an address containing such an error may be entered into the V Field for observation.

TERMINAL 555.08 (FIGS. 56 AND 71)

This is a terminal as indicated in Fig. 56 which will translate either a Modulo 4 error or a greater than 9 error (see Fig. 61) into a control signal delivered to the circuit of Figs. 70 and 71 for the purposes of the control of the V Field. This terminal may be seen entering Fig. 71 where it controls the latch which in turn controls the 070 output leads Figs. 70 and 71, which operate in transferring the records between the CRT and certain registers.

TERMINAL 660.40 (FIG. 59)

This terminal is an output of the sweep failure detector and so long as the horizontal deflection circuit (Fig. 52) is operating properly this terminal will be Down. Should the sweep circuit fail, this terminal will go Up.

TERMINAL 661.71 (FIG. 61)

This terminal is the output of the Modulo 4 Error Latch 149 and the terminal is known as the Word Check Failure terminal. As the Word Check Failure indicator lamp 150 becomes lighted the terminal 661.71 goes Up for purposes with which we are not here concerned.

TERMINALS 662.41.1, 662.41.2, 662.41.4, 662.41.8, 662.42.1, 662.42.2, 662.42.4, 662.42.8, 662.43.1, 662.43.2, 662.43.4, 662.43.8, 662.44.1, 662.44.2, 662.44.4, 662.44.8 (FIG. 56)

These terminals are the four sets of 1, 2, 4 and 8 Bit conductors entering as inputs into the V Field from the two position switch whereby other sources of information to the V Field may be substituted for checking purposes for the normal source. These terminals are used in both positions of the check address pushbutton.

TERMINAL 786.10 (FIGS. 55 AND 56)

This terminal is normally Down by the setting of the CRT check address control pushbutton on the console. When operated, it acts to connect the inputs of the V Field to the address terminals coming from the inverters in line between the regeneration counters and the horizontal and vertical deflection circuits whereby the setting of the regeneration counter (or any other source of information entered into the pulse stretchers and inverters) may be entered into the V Field for observation.

What is claimed is:

1. An electrostatic storage system consisting of a plurality of cathode ray tubes, means for moving the beams of said tubes over the faces thereof in a first standard raster to traverse a first plurality of spots each constituting a memory area, means for moving the beams of said tubes over the faces thereof in a second standard raster to traverse a second plurality of spots each constituting a memory area, and switching means for causing said tubes to operate under control of said first means to trace said first raster alone or alternatively to operate under control of both said first and second means in sequence to trace both said rasters in sequence.

2. An electrostatic storage system consisting of a plurality of cathode ray tubes, means for moving the beams of said tubes over the faces thereof in a first standard raster to traverse a first plurality of spots each constituting a memory area, means for moving the beams of said tubes over the faces thereof in a second standard raster to traverse a second plurality of spots each constituting a memory area, each said raster including two paths, one common to both said rasters and another individual to each said raster, and switching means for causing said tubes to operate under control of said first means to trace said first raster alone or alternatively to operate under control of both said first and second means in sequence to trace both said rasters in sequence.

3. An electrostatic storage system consisting of a plurality of cathode ray tubes, means for moving the beams of said tubes over the faces thereof in a first standard raster to traverse a first plurality of spots each constituting a memory area, means for moving the beams of said tubes over the faces thereof in a second standard raster to traverse a second plurality of spots each constituting a memory area, each said raster including two paths, one common to both said rasters and another individual to each said raster, the said spots traversed by said beams in common under both said rasters being at a given spacing apart and the said spots traversed individually under said two rasters being each likewise spaced but each with respect to the other located halfway between the others, and switching means for causing said tubes to operate under control of said first means to trace said first raster alone or alternatively to operate under control to both said first and second means to trace both said rasters in sequence.

4. An electrostatic storage system consisting of a plurality of cathode ray tubes, means for moving the beams of said tubes over the faces thereof in a first standard raster to traverse a first plurality of spots each constituting a memory area, said spots being spaced apart with regard to the frequency of traverse of said beam to fall between a lower limit under which the memory at a given spot cannot be maintained and an upper limit above which the maintenance of the memory at adjacent spots will adversely affect the memory at a given spot, means for moving the beams of said tubes over the faces thereof in a second standard raster to traverse a second plurality of spots each constituting a memory area, said spots of said second raster being interspersed halfway between said spots of said first raster, means for moving said beams over said first raster or alternatively over said first and second rasters in sequence, the timing of said two rasters being alike, whereby the ratio of the frequency of the traverse of said beams to the spacing between said memory spots is constant.

5. In a cathode ray tube raster control means, a counter for defining the location of a series of spots serially traversed, means controlled by said counter for coding the identity of each said spot, means for translating said codes into other different codes, decoding means for translating said last codes into numerical deflection weights, and means responsive to the numerical addition of one or more such deflection weights for synthesizing total deflection potentials for controlling the beams of said tubes.

6. In a cathode ray tube raster control means, a counter for successively defining the location of a series of spots serially traversed, means controlled by said counter for coding the identity of each said spot, means for translating said codes into other different codes, decoding means for translating said last codes into numerical deflection weights, a cascode amplifier for producing cathode ray beam deflection potentials, said cascode amplifier having a plurality of current adders and means in said decoding means for selectively operating said current adders.

7. In a cathode ray tube raster control means, a counter for successively defining the location of a series of spots serially traversed, means controlled by said counter for coding the identity of each said spot, means for translating said codes into other different codes, decoding means for translating said last codes into numerical deflection weights, a cascode amplifier for producing cathode ray beam deflection potentials, said cascode amplifier having a plurality of current adders each corresponding to one of said numerical deflection weights and means in said decoding means for selectively and combinationally operating said current adders.

8. In a cathode ray tube raster control means, a counter for successively defining the location of a series of spots serially traversed, means controlled by said counter for coding the identity of each said spot, means for translating said codes into other different codes, decoding means for translating said last codes into horizontal deflection weights of ½, 11, 5, 1, 2 and 1 and into vertical deflection weights of 5, 11, 5, 1, 2 and 1, a horizontal cascode amplifier for producing horizontal cathode ray beam deflection potentials, a vertical cascode amplifier for producing vertical cathode ray beam deflection potentials, each said cascode amplifier having a plurality of current adders corresponding in number to said number of deflection weights, and means in said decoding means for selectively operating said current adders.

9. In a cathode ray tube raster control means, a counter for successively defining the location of a series of spots serially traversed, other means for randomly defining the location of selected spots, means operated by said other means for interrupting the operation of said counter during the operation of said other means, means controlled by the said counter and the said other means for coding the identity of each said spot, means for translating said codes into other different codes, decoding means for translating said last codes into numerical deflection weights, a cascode amplifier for producing cathode ray beam deflection potentials, said cascode amplifier having a plurality of current adders and means in said decoding means for selectively and combinationally operating said current adders.

10. In a cathode ray tube raster control means, means for defining the locations of spots serially traversed along said raster whereby any given spot may be reached at will, said spots being identified by decimal numbers of a series of numbers and the location of said spots being a function of a translated code, means for expressing said decimal numbers in a first code, means for translating said codes into other different codes, a decoding means for translating said other codes into a code indicating addend deflection weights and summing means for converting said translated codes into total deflection potentials for directing the beams of said tubes toward the spots corresponding to said decimal numbers.

11. In a cathode ray tube raster control means, means for defining the location of spots serially traversed along said raster, means for traversing said spots with regularity including means for traversing different spots a different number of times during each complete raster traverse, said different spots being differently spaced along said raster, the ratio of the frequency of traverse to the said spacing being constant, said spots being identified by decimal numbers of a series of numbers, the location of each said spot being a function of a translated code, means for expressing said decimal numbers in a first code, a decoding means for translating said decimal number codes into a second code, each of whose elements represents an addend deflection weight, and summing means for converting the said translated codes into total deflection potentials for directing the beams of said tubes toward the spots corresponding to said decimal numbers.

12. In a cathode ray tube raster control means, a counter for successively defining the location of a series of address spots serially traversed, a plurality of tubes having address spots located thereon, means for controlling said tubes to successively and repeatedly point the beams thereof to said defined locations on said tubes in turn, whereby each tube accommodates a different series of address spots numbered in multiples of the number of said tubes, means controlled by said counter for coding the identity of each said spot, means for translating said codes into other different codes, decoding means for translating said last codes into tube identity and numerical deflection weights, said decoding means being arranged to decode each recurring series of said numbers equal to said number of tubes into identical deflection weights, a cascode amplifier for producing cathode ray beam deflection potentials, said cascode amplifier having a plurality of current adders and means in said decoding means for selectively operating said current adders.

13. In a cathode ray tube raster control means, a counter for successively emitting the numbers of a series of numbers in code, means for translating said codes into other different codes, a decoding means responsive thereto for translating said last codes into potentials equal to the ordinates and abscissas of the location of address spots on the faces of said tubes, said tubes being in groups of a given number, said decoding means for translating each succeeding group of said given number of said number codes into identical ordinate and abscissa values, and means in said decoding means for rendering said tubes active in rotation.

14. An electrostatic storage system employing the face of a cathode ray tube for the storage of information in the form of potential gradients created at spots thereon, said spots being coordinately arranged and occupying a square area, there being inequality between the number of ordinates and the number of abscissas, a binary 0 being expressed by a potential gradient produced by a beam directed to a spot at the intersection of an ordinate and an abscissa and a binary 1 being expressed by a potential gradient produced by a beam directed to a spot at the intersection of an ordinate and an abscissa and then moved slightly from said position, and means automatically controlled by the relative numbers of ordinates and abscissas to move said beam in the direction of the greater spacing between said coordinates.

15. An electrostatic storage system employing the face of a cathode ray tube for the storage of information in the form of potential gradients created at spots thereon, said spots being coordinately arranged and occupying a square area, there being inequality between the number of ordinates and abscissas, means for changing said relative number from a normal preponderance of abscissas to an alternative preponderance of ordinates, a binary 0 being expressed by a potential gradient produced by a beam directed to a spot at the intersection of an ordinate and an abscissa and a binary 1 being expressed by a potential gradient produced by a beam directed to a spot at the intersection of an ordinate and an abscissa and then moved slightly from said position and means automatically controlled by the relative numbers of ordinates and abscissas to move said beam in the direction of the greater spacing between said coordinates.

16. An electronic circuit network including an electrostatic storage system consisting of a plurality of cathode ray tubes, means for moving the beams thereof to coordinately arranged spots each constituting an address and identified by the coordinate numbering thereof, an address register, means automatically controlled for transiently charging said address register with the identification of the address at which said beams are located at any given operational interval of said network, means for detecting an error in information handled by said network, said detecting means controlling means for halting further operation of said network whereby said address register steadily holds the identification of a given address at which said error is detected.

17. An electronic circuit network including an electrostatic storage system consisting of a plurality of cathode ray tubes, means for moving the beams thereof to coordinately arranged spots each constituting an address and identified by the coordinate numbering thereof, an address register, an information register, means for charging said address register with the address at which said beams are located at any given operational interval of said network, means for detecting an error in information handled by said network, said detecting means controlling means for halting further operation of said network and holding information in said address register, and means for displaying information in said register.

18. An electronic circuit network including an electrostatic storage system consisting of a plurality of cathode ray tubes, means for moving the beams thereof to coordinately arranged spots each constituting an address and identified by the coordinate numbering thereof, an address register, an information register, means controlled during normal operations of said network for transiently charging said address register with the address at which said beams are located and for charging said information register with the information contained at a given point in said network at any given operational interval of said network, means for detecting an error in information handled by said network, said detecting means controlling means for halting further operation of said network and for displaying a signal indicating the general nature of said error, means for displaying information in said address and said information registers, other means including manually operated numbering switches for charging said address register, pushbuttons for causing information in said information register to be transferred therefrom and for causing information at a given address to be transferred to said information register, means for triggering said network to reperform a given series of operations including that given operational interval in which said detecting means responded to an error, a single pulse generator responsive in its operation to said triggering means for providing a synchronizing signal, said pushbuttons each controlling means for enabling said single pulse generator, and means controlled by each of said pushbuttons for transferring the charge in said address register to said storage system for providing a synchronized access to or from said given address for said information transfer.

19. An electronic circuit network including an electrostatic storage system consisting of a plurality of cathode ray tubes, means for moving the beams thereof to coordinately arranged spots each constituting an address and identified by the coordinate numbering thereof, an address register, means automatically controlled for transiently charging said address register with the identification of the address at which said beams are located at any given operation interval of said network, means for detecting an error in information handled by said network, means for thereafter moving said beams over said address spots in order as such spots appear along the raster of said tubes until the address at which said error has been detected is reached, means for thereupon locking said address in said address register and means for displaying said address.

20. In an electrostatic storage system means for testing cathode ray tube address spots consisting of means for automatically and consecutively working the spots for each address a given number of times at high speed, said means including a means for setting the said number of times at different values said working consisting of subjecting the said spots to electrostatic stresses normally employed to read in and to read out binary code bits and means for indicating the failure of any one of said spots to respond to said working.

21. In an electrostatic storage system, means for testing cathode ray tube address spots consisting of means for subjecting said tubes repeatedly to a cycle of operations comprising reading in to said tubes at one address thereon a predetermined number of bits at high speed, thereafter completely regenerating the spots of all addresses, repeating these two operations over each other address, thereafter reading out of said tubes at one address thereof a predetermined number of times at high speed, thereafter completely regenerating the spots of all addresses and repeating these two operations over each other address, and means for indicating the failure of any one of said spots to respond to said working.

22. In an electrostatic storage system, means for testing cathode ray tube address spots, consisting of a test reference selector for determining the number of successive references to be made to each address spot, a counter for counting off the number of references made to an address spot, another counter for counting off the address spots, means controlled by said first counter responsive to a count achieved equal to said number determined by said test reference selector, for terminating further references to a said spot and for starting a cycle under control of said second counter for sequentially regenerating the record at each said address spot, and a comparing circuit for continuously, through said cycles, comparing the records at certain of said address spots with the records at other certain of said address spots.

23. In an electrostatic storage system wherein means is provided to simultaneously write in a like record to all the code spots of a given address a predetermined number of times at a high frequency, a plurality of inequality detectors each connected transiently and electronically to a plurality of said code spots, an Or circuit having a plurality of input circuits each connected to an output circuit of one of said inequality detectors and signal means connected to the output of said Or circuit for indicating the failure of some one or more of said code spots to properly respond to said write in operation.

24. In an electrostatic storage system wherein coded information is stored in a plurality of addresses on the faces of a plurality of cathode ray tubes by beam control of the electrostatic condition of a plurality of closely spaced address spots, and wherein electronic reaction to the control of each said spot adversely affects the condition of adjacent spots, a means to test the capabilities of a cathode ray tube to withsand said adverse effects consisting of a means to automatically control each said spot at a high rate and over a predetermined number of times to induce said adverse effects, a plurality of comparing circuits each constantly responsive to the electrostatic condition of a plurality of said address spots and signal means responsive to a failure in comparison detected by any one of said comparing circuits.

25. In an electrostatic storage system wherein coded information is stored in a plurality of addresses on the faces of a plurality of cathode ray tubes by beam control of the electrostatic condition of a plurailty of closely spaced address spots, and wherein electronic reaction to the control of each spot adversely affects the condition of adjacent spots, a means to test the capabilities of a cathode ray tube to withstand said adverse effects consisting of a means to automatically control each said spot at a high rate and over a predetermined number of times to induce said adverse effects, said means including means to work said spots said predetermined number of times minus one to a set condition and to automatically work said spots a single and final time to an opposite set condition, a plurality of comparing circuits each constantly responsive to the electrostatic condition of a plurality of said address spots and signal means responsive to a failure in comparison detected by any one of said comparing circuits.

26. In an electrostatic storage system wherein coded information is stored in a plurality of addresses on the faces of a plurality of cathode ray tubes by beam control of the electrostatic condition of a plurality of closely spaced address spots, the said electrostatic condition of a said spot consisting of a negative or positive potential gradient established thereat, means for making a spill test of the said spots consisting of means to repeatedly work a given spot a predetermined number of times to repeatedly establish one of said potential gradients thereat and to terminate said test by working said spot once to establish an opposed potential gradient thereat, and means for constantly observing the effect of such working.

27. In an electrostatic storage system wherein coded information is stored in a plurality of addresses on the faces of a plurality of cathode ray tubes by beam control of the electrostatic condition of a plurality of closely spaced address spots, means for making a spill test of said spots consisting of means to repeatedly work each said spot a predetermined number of times and means to constantly observe the response of each said spot to said working including means to indicate the failure of any one of said spots to respond in a normal manner, said spill test means including a set of manually controlled switches for setting said predetermined number, means being provided to set a plurality of predetermined numbers and means for automatically employing one or another of said predetermined numbers.
nother of said predetermined numbers.

28. An electrostatic storage system consisting of a plurality of cathode ray tubes, means for moving the beam of each said tube over the face thereof in a first standard raster to traverse a first plurality of spots each constituting a memory area, means for moving the beam of each said tube over the face thereof in a second and different standard raster to traverse a second plurality of different spots each constituting a memory area and switching means for rendering said first means effective and for alternatively rendering both said first and said second means alternately effective.

29. In a cathode ray tube raster control means, means for generating vertical and horizontal beam deflecting potentials, a counter for numerically defining the location of a series of spots serially traversed and located along the raster of said tube, said counter having an output connected to said potential generating means and said potential generating means being responsive to the said output of said counter to generate potentials corresponding in magnitude to the numerical value of the output of said counter, a conversion switch, means effective in one position of said switch for causing said counter to repeatedly count a given number of a series of numbers and means effective in another position of said switch for causing said counter to repeatedly count another given number in groups of a series of numbers, said groups each starting with different numbers, each said group containing a different number of numbers.

30. In a cathode ray tube raster control means, means for generating vertical and horizontal beam deflecting potentials, a counter for numerically defining the location of a series of spots serially traversed and located along the raster of said tube, said counter having an output connected to said potential generating means and said potential generating means being responsive to the said output of said counter to generate potentials corresponding in magnitude to the numerical value of the output of said counter, a conversion switch, means effective in one position of said swtich for causing said counter to repeatedly count from 0 to 1999 inclusive and means effective in another position of said switch for causing said counter to repeatedly count in order from 0 to 1999 inclusive, then from 0 to 399 inclusive, and then 2000 to 3599 inclusive.

31. In a cathode ray tube raster control means, means for generating vertical and horizontal beam deflecting potentials, a counter for numerically defining the location of a series of spots serially traversed and located along the raster of said tube, said counter having an output connected to said potential generating means and said potential generating means being responsive to the said output of said counter to generate potentials corresponding in magnitude to the numerical value of the output of said counter, a conversion switch, means effective in one position of said switch for causing said counter to repeatedly count from 0 to 1999 inclusive and means effective in another position of said switch for causing said counter to repeatedly count from 0 to 399 inclusive, from 400 to to 1999 inclusive, from 0 to 399 inclusive, and from 2000 to 3599 inclusive.

32. In a cathode ray tube raster control means, means for generating vertical and horizontal beam deflecting potentials, a counter for numerically defining the location of a series of spots serially traversed and located along the raster of said tube, said counter having an output connected to said potential generating means and said potential generating means being responsive to the said output of said counter to generate potentials corresponding in magnitude to the numerical value of the output of said counter, the numerical value of said spots being included in the numbers 0 to 3599 inclusive, the said spots 0 to 1900 being equally spaced apart and the said spots 2000 to 3599 being spaced between the said spots 400 to 1999, means comprising a conversion switch, means effective in one position of said switch for causing said counter to repeatedly count from 0 to 1999 inclusive and means in another position of said switch for causing said counter to repeatedly count from 0 to 399 inclusive, from 400 to 1999 inclusive, from 0 to 399 inclusive, and from 2000 to 3599 inclusive, whereby the ratio of the frequency of repetition of the counting of each number to the effective spacing between adjacently located spots is constant.

33. In a cathode ray tube raster control means, means for generating vertical and horizontal beam deflecting potentials, a counter for numerically defining the location of a series of spots serially traversed and located along the raster of said tube, said counter having an output connected to said potential generating means and said potential generating means being responsive to the said output of said counter to generate potentials corresponding in magnitude to the numerical value of the output of said counter, a conversion switch, means effective in one position of said switch for causing said counter to repeatedly count from 0 to 1999 inclusive, means effective in another position of said switch for causing said counter to repeatedly count from 0 to 399 inclusive, from 400 to 1999 inclusive, from 0 to 399 inclusive, and from 2000 to 3599 inclusive, means for interrupting the operation of said counter, and means for resuming the operation of said counter at the stage at which its operation was interrupted.

34. In an electrostatic storage system wherein coded information is stored in a plurality of addresses on the faces of a plurality of cathode ray tubes by beam control of the electrostatic condition of a plurality of closely spaced address spots, means being provided to change the closeness of said spacing between said address spots, means for making a spill test of said spots consisting of means to repeatedly work each said spot a predetermined number of times, and means to constantly observe the response of each said spot to said working, including means to indicate the failure of any one of said spots to produce a normal response thereto, said spill test means including a plurality of sets of manually controlled switches each for controlling said spill test over a predetermined number of workings and means for automatically employing different sets of said switches, each said set being adjusted to different predetermined numbers in correspondence with the said closeness of said spacing.

References Cited in the file of this patent

UNITED STATES PATENTS

| | | |
|---|---|---|
| 2,381,901 | Goldsmith | Aug. 14, 1945 |
| 2,402,989 | Dickinson | July 2, 1946 |
| 2,443,634 | Morgan | June 22, 1948 |
| 2,448,762 | Beste | Sept. 7, 1948 |
| 2,459,911 | Munster | Jan. 4, 1949 |
| 2,532,719 | Homrighous | Dec. 5, 1950 |
| 2,579,269 | Mesner | Dec. 18, 1951 |
| 2,589,460 | Tuller | Mar. 18, 1952 |
| 2,591,919 | Collard | Apr. 8, 1952 |
| 2,594,731 | Connolly | Apr. 29, 1952 |
| 2,617,963 | Arditi | Nov. 11, 1952 |
| 2,646,548 | Ville et al. | July 21, 1953 |
| 2,656,485 | Page | Oct. 20, 1953 |
| 2,666,162 | Hollway et al. | Jan. 12, 1954 |
| 2,717,976 | Baker | Sept. 13, 1955 |
| 2,732,493 | Baker | Jan. 24, 1956 |
| 2,733,409 | Kuchinsky | Jan. 31, 1956 |